(12) United States Patent
Takiguchi et al.

(10) Patent No.: US 10,103,607 B2
(45) Date of Patent: Oct. 16, 2018

(54) ROTATION ANGLE DETECTOR, ROTARY ELECTRICAL MACHINE AND ELEVATOR HOISTING MACHINE

(71) Applicant: MITSUBISHI ELECTRIC CORPORATION, Chiyoda-ku (JP)

(72) Inventors: Ryuichi Takiguchi, Chiyoda-ku (JP); Satoru Nakada, Chiyoda-ku (JP); Morishige Minobe, Chiyoda-ku (JP); Shuhei Niikura, Chiyoda-ku (JP); Shunta Kashima, Chiyoda-ku (JP); Takanori Komatsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 50 days.

(21) Appl. No.: 15/507,405

(22) PCT Filed: Oct. 20, 2014

(86) PCT No.: PCT/JP2014/077797
§ 371 (c)(1),
(2) Date: Feb. 28, 2017

(87) PCT Pub. No.: WO2016/063324
PCT Pub. Date: Apr. 28, 2016

(65) Prior Publication Data
US 2017/0288510 A1    Oct. 5, 2017

(51) Int. Cl.
*H02K 11/225* (2016.01)
*H02K 21/16* (2006.01)
(Continued)

(52) U.S. Cl.
CPC .......... *H02K 11/225* (2016.01); *B66B 5/0018* (2013.01); *G01D 5/2046* (2013.01);
(Continued)

(58) Field of Classification Search
CPC .... H02K 21/16; H02K 11/215; B66B 5/0018; B66B 1/28; B66B 11/043
(Continued)

(56) References Cited

U.S. PATENT DOCUMENTS

| 2007/0012506 A1* | 1/2007 | Asada ................ B62D 15/0215 180/446 |
| 2007/0062477 A1* | 3/2007 | Shimazaki ............ F02D 41/062 123/179.16 |

(Continued)

FOREIGN PATENT DOCUMENTS

| EP | 1416254 A1 | 5/2004 |
| JP | 2003-194584 A | 7/2003 |

(Continued)

OTHER PUBLICATIONS

International Search Report dated Jan. 27, 2015, in PCT/JP2014/077797, filed Oct. 20, 2014.

*Primary Examiner* — David Warren
(74) *Attorney, Agent, or Firm* — Xsensus, LLP

(57) ABSTRACT

In a reference state of a rotation angle detector, plural first output coils include first output coils having the number of windings of Ai and Aj, plural second output coils include second output coils having the number of windings Bk and Bm. The rotation angle detector includes at least one configuration from among: a configuration in which the numbers of windings of the first and second output coils are the same numbers of windings as in the reference state, with the exception that the number of windings Ai is the number of windings Ai±a or the number of windings Aj is the number of windings Aj±a; and a configuration in which the number of windings Bk is the number of windings Bk±b or the number of windings Bm is the number of windings Bm±b.

17 Claims, 25 Drawing Sheets

(51) Int. Cl.
  *G01D 5/20* (2006.01)
  *B66B 5/00* (2006.01)
  *H02K 11/215* (2016.01)
  *B66B 11/04* (2006.01)
  *B66B 1/28* (2006.01)

(52) U.S. Cl.
  CPC ............... *H02K 21/16* (2013.01); *B66B 1/28* (2013.01); *B66B 11/043* (2013.01); *H02K 11/215* (2016.01)

(58) Field of Classification Search
  USPC .......................................... 187/391; 310/40 R
  See application file for complete search history.

(56) References Cited

U.S. PATENT DOCUMENTS

| | | | | |
|---|---|---|---|---|
| 2007/0132423 A1* | 6/2007 | Ajima | ...................... | H02P 6/10 318/719 |
| 2007/0247092 A1* | 10/2007 | Komatsu | ................... | H02P 6/06 318/400.04 |
| 2007/0284888 A1* | 12/2007 | Shimazaki | .............. | F02N 11/00 290/38 C |
| 2008/0258585 A1* | 10/2008 | Kataoka | ................... | H02K 1/24 310/68 B |
| 2009/0134739 A1* | 5/2009 | Akita | ...................... | H02K 1/148 310/216.004 |
| 2009/0184598 A1* | 7/2009 | Nakano | ................ | G01D 5/2046 310/156.78 |
| 2009/0206827 A1* | 8/2009 | Aimuta | .................. | G01D 5/145 324/207.25 |
| 2010/0071644 A1* | 3/2010 | Noda | .................. | F01L 13/0015 123/90.16 |
| 2010/0134053 A1* | 6/2010 | Yamada | ............ | H02M 7/53875 318/162 |
| 2010/0295403 A1* | 11/2010 | Morita | .................. | H02K 1/146 310/156.78 |
| 2011/0074400 A1* | 3/2011 | Nakano | ................ | G01D 5/2046 324/207.25 |
| 2011/0095658 A1* | 4/2011 | Takeuchi | ............. | G01D 5/2458 310/68 B |
| 2011/0127938 A1* | 6/2011 | Kawakami | .............. | G01P 3/481 318/400.13 |
| 2011/0163708 A1* | 7/2011 | Mukai | ................. | B62D 5/0403 318/722 |
| 2012/0139372 A1* | 6/2012 | Nakano | ................... | H02K 1/148 310/83 |
| 2012/0139532 A1* | 6/2012 | Ueda | .................... | G01D 5/2448 324/207.22 |
| 2012/0139533 A1* | 6/2012 | Manabe | ................ | G01D 5/2073 324/207.25 |
| 2012/0158340 A1* | 6/2012 | Ueda | ..................... | G01D 5/244 702/94 |
| 2012/0223703 A1* | 9/2012 | Ludwig | ................. | G01D 5/147 324/207.25 |
| 2012/0227514 A1* | 9/2012 | Ueda | .................... | G01D 5/2457 73/862.325 |
| 2012/0229126 A1* | 9/2012 | Maeda | ................ | G01D 5/24485 324/207.25 |
| 2012/0232839 A1* | 9/2012 | Ueda | .................. | G01D 5/24471 702/151 |
| 2012/0249127 A1* | 10/2012 | Sakamoto | .......... | G01D 5/24471 324/207.21 |
| 2012/0262161 A1 | 10/2012 | Kinashi | | |
| 2012/0278033 A1* | 11/2012 | Bucher | ................ | G01D 5/2415 702/151 |
| 2013/0009631 A1* | 1/2013 | Tsuge | ................... | G01D 5/2046 324/207.18 |
| 2013/0033210 A1* | 2/2013 | Suzuki | ................ | H02P 29/0055 318/400.22 |
| 2013/0049653 A1* | 2/2013 | Katou | ..................... | H02P 21/05 318/400.02 |
| 2013/0249356 A1* | 9/2013 | Nakano | ..................... | H02K 5/24 310/68 D |
| 2014/0002001 A1* | 1/2014 | Kinashi | ................... | H02P 25/22 318/724 |
| 2014/0009093 A1* | 1/2014 | Suzuki | ................. | H02P 21/0096 318/400.02 |
| 2014/0163922 A1* | 6/2014 | Takaki | ..................... | G01B 7/30 702/151 |
| 2014/0163923 A1* | 6/2014 | Takaki | ................... | G01D 5/244 702/151 |
| 2014/0236520 A1* | 8/2014 | Engel | ................ | G01D 5/24452 702/95 |
| 2014/0300306 A1* | 10/2014 | Kato | ...................... | G01D 5/208 318/490 |
| 2015/0345937 A1* | 12/2015 | Seitz | .................... | G01B 21/042 250/231.13 |
| 2015/0345995 A1* | 12/2015 | Ookawara | ........... | G01D 5/2046 324/207.15 |
| 2015/0349617 A1* | 12/2015 | Roos | ...................... | H02K 23/04 318/400.32 |
| 2015/0365025 A1* | 12/2015 | Semura | ................... | H02P 29/50 318/400.2 |
| 2016/0294235 A1* | 10/2016 | Takizawa | ............... | H02K 21/14 |
| 2016/0352269 A1* | 12/2016 | Takahashi | ............. | H02P 27/085 |
| 2017/0005549 A1* | 1/2017 | Ohira | .................... | H02K 37/04 |
| 2017/0038228 A1* | 2/2017 | Mikkelson | ......... | G01D 5/34707 |
| 2017/0077792 A1* | 3/2017 | Ueda | ................... | H02K 1/145 |
| 2017/0085138 A1* | 3/2017 | Nakano | ................... | H02K 1/14 |
| 2017/0093242 A1* | 3/2017 | Hirotani | .................. | H02K 3/28 |
| 2017/0093257 A1* | 3/2017 | Hirata | .................. | H02K 19/103 |
| 2017/0288510 A1* | 10/2017 | Takiguchi | ............ | H02K 11/225 |
| 2017/0373549 A1* | 12/2017 | Takizawa | ................ | H02K 1/278 |
| 2018/0031369 A1* | 2/2018 | Seitz | .................... | G01B 11/26 |
| 2018/0087926 A1* | 3/2018 | Ausserlechner | ....... | G01D 5/145 |
| 2018/0091081 A1* | 3/2018 | Suzuki | .................. | H02P 6/28 |
| 2018/0115202 A1* | 4/2018 | Hirotani | ................. | H02K 1/16 |

FOREIGN PATENT DOCUMENTS

| | | |
|---|---|---|
| JP | 2004-151040 A | 5/2004 |
| JP | 2011-122878 A | 6/2011 |
| JP | 2012-117862 A | 6/2012 |
| JP | 2012-227985 A | 11/2012 |
| JP | WO 2016174796 A1 * | 11/2016 ............... B66B 1/34 |

* cited by examiner

FIG. 6

| TOOTH NUMBER | 1 | 2 | 3 | 4 | 5 | 6 | 7 | 8 | 9 |
|---|---|---|---|---|---|---|---|---|---|
| EXCITATION COIL | C | -C | C | -C | C | -C | C | -C | C |
| FIRST OUTPUT COIL (cos COIL) | A1 | 0 | -A2 | 0 | -A2 | 0 | A1 | 0 | -A2 |
| SECOND OUTPUT COIL (sin COIL) | 0 | B1 | 0 | B2 | 0 | -B1 | 0 | B1 | 0 |
| TOOTH NUMBER | 10 | 11 | 12 | 13 | 14 | 15 | 16 | 17 | 18 |
| EXCITATION COIL | -C | C | -C | C | -C | C | -C | C | -C |
| FIRST OUTPUT COIL (cos COIL) | 0 | -A2 | 0 | A1 | 0 | -A2 | 0 | -A2 | 0 |
| SECOND OUTPUT COIL (sin COIL) | B2 | 0 | -B1 | 0 | B1 | 0 | B2 | 0 | -B1 |

Y MAXIMUM

UNIT (Wb)
- 8.40E-08–8.50E-08
- 8.30E-08–8.40E-08
- 8.20E-08–8.30E-08
- 8.10E-08–8.20E-08
- 8.00E-08–8.10E-08
- 7.90E-08–8.00E-08
- 7.80E-08–7.90E-08
- 7.70E-08–7.80E-08
- 7.60E-08–7.70E-08
- 7.50E-08–7.60E-08

Y=0    X=0    X MAXIMUM

| TOOTH NUMBER | 1 | 2 | 3 | 4 | 5 | 6 | 7 | 8 | 9 |
|---|---|---|---|---|---|---|---|---|---|
| EXCITATION COIL | C | -C | C | -C | C | -C | C | -C | C |
| FIRST OUTPUT COIL (cos COIL) | A1 | 0 | -(A2+a) | 0 | -(A2+a) | 0 | A1 | 0 | -(A2+a) |
| SECOND OUTPUT COIL (sin COIL) | 0 | B1+b | 0 | B2 | 0 | -B1 | 0 | B1+b | 0 |
| TOOTH NUMBER | 10 | 11 | 12 | 13 | 14 | 15 | 16 | 17 | 18 |
| EXCITATION COIL | -C | C | -C | C | -C | C | -C | C | -C |
| FIRST OUTPUT COIL (cos COIL) | 0 | -(A2+a) | 0 | A1 | 0 | -(A2+a) | 0 | -(A2+a) | 0 |
| SECOND OUTPUT COIL (sin COIL) | B2 | 0 | -B1 | 0 | B1+b | 0 | B2 | 0 | -B1 |

| TOOTH NUMBER | 1 | 2 | 3 | 4 | 5 | 6 | 7 | 8 | 9 |
|---|---|---|---|---|---|---|---|---|---|
| EXCITATION COIL | C | −C | C | −C | C | −C | C | −C | C |
| FIRST OUTPUT COIL (cos COIL) | A1+a | 0 | −A2 | 0 | −A2 | 0 | A1+a | 0 | −A2 |
| SECOND OUTPUT COIL (sin COIL) | 0 | B1+b | 0 | B2 | 0 | −B1 | 0 | B1+b | 0 |
| TOOTH NUMBER | 10 | 11 | 12 | 13 | 14 | 15 | 16 | 17 | 18 |
| EXCITATION COIL | −C | C | −C | C | −C | C | −C | C | −C |
| FIRST OUTPUT COIL (cos COIL) | 0 | −A2 | 0 | A1+a | 0 | −A2 | 0 | −A2 | 0 |
| SECOND OUTPUT COIL (sin COIL) | B2 | 0 | −B1 | 0 | B1+b | 0 | B2 | 0 | −B1 |

| TOOTH NUMBER | 1 | 2 | 3 | 4 | 5 | 6 | 7 | 8 | 9 |
|---|---|---|---|---|---|---|---|---|---|
| EXCITATION COIL | C | -C | C | -C | C | -C | C | -C | C |
| FIRST OUTPUT COIL (cos COIL) | A1 | 0 | -A2 | 0 | -A3 | 0 | A1 | 0 | -A2 |
| SECOND OUTPUT COIL (sin COIL) | 0 | B1 | 0 | B2 | 0 | -B3 | 0 | B1 | 0 |
| TOOTH NUMBER | 10 | 11 | 12 | 13 | 14 | 15 | 16 | 17 | 18 |
| EXCITATION COIL | -C | C | -C | C | -C | C | -C | C | -C |
| FIRST OUTPUT COIL (cos COIL) | 0 | -A3 | 0 | A1 | 0 | -A2 | 0 | -A3 | 0 |
| SECOND OUTPUT COIL (sin COIL) | B2 | 0 | -B3 | 0 | B1 | 0 | B2 | 0 | -B3 |

FIG. 16

| TOOTH NUMBER | 1 | 2 | 3 | 4 | 5 | 6 | 7 | 8 | 9 |
|---|---|---|---|---|---|---|---|---|---|
| EXCITATION COIL | C | -C | C | -C | C | -C | C | -C | C |
| FIRST OUTPUT COIL (cos COIL) | A1 | 0 | -(A2+a) | 0 | -A3 | 0 | A1 | 0 | -(A2+a) |
| SECOND OUTPUT COIL (sin COIL) | 0 | B1+b | 0 | B2 | 0 | -B3 | 0 | B1+b | 0 |
| TOOTH NUMBER | 10 | 11 | 12 | 13 | 14 | 15 | 16 | 17 | 18 |
| EXCITATION COIL | -C | C | -C | C | -C | C | -C | C | -C |
| FIRST OUTPUT COIL (cos COIL) | 0 | -A3 | 0 | A1 | 0 | -(A2+a) | 0 | -A3 | 0 |
| SECOND OUTPUT COIL (sin COIL) | B2 | 0 | -B3 | 0 | B1+b | 0 | B2 | 0 | -B3 |

FIG. 17

| TOOTH NUMBER | 1 | 2 | 3 | 4 | 5 | 6 | 7 | 8 | 9 |
|---|---|---|---|---|---|---|---|---|---|
| EXCITATION COIL | C | -C | C | -C | C | -C | C | -C | C |
| FIRST OUTPUT COIL (cos COIL) | A1+a | 0 | -A2 | 0 | -A3 | 0 | A1+a | 0 | -A2 |
| SECOND OUTPUT COIL (sin COIL) | 0 | B1+b | 0 | B2 | 0 | -B3 | 0 | B1+b | 0 |
| TOOTH NUMBER | 10 | 11 | 12 | 13 | 14 | 15 | 16 | 17 | 18 |
| EXCITATION COIL | -C | C | -C | C | -C | C | -C | C | -C |
| FIRST OUTPUT COIL (cos COIL) | 0 | -A3 | 0 | A1+a | 0 | -A2 | 0 | -A3 | 0 |
| SECOND OUTPUT COIL (sin COIL) | B2 | 0 | -B3 | 0 | B1+b | 0 | B2 | 0 | -B3 |

| TOOTH NUMBER | 1 | 2 | 3 | 4 | 5 | 6 | 7 | 8 | 9 |
|---|---|---|---|---|---|---|---|---|---|
| EXCITATION COIL | C | -C | C | -C | C | -C | C | -C | C |
| FIRST OUTPUT COIL (cos COIL) | A1 | 0 | -(A2+a) | 0 | -(A2+a) | 0 | A1 | 0 | -(A2+a) |
| SECOND OUTPUT COIL (sin COIL) | 0 | B1 | 0 | B2 | 0 | -B1 | 0 | B1 | 0 |
| TOOTH NUMBER | 10 | 11 | 12 | 13 | 14 | 15 | 16 | 17 | 18 |
| EXCITATION COIL | -C | C | -C | C | -C | C | -C | C | -C |
| FIRST OUTPUT COIL (cos COIL) | 0 | -(A2+a) | 0 | A1 | 0 | -(A2+a) | 0 | -(A2+a) | 0 |
| SECOND OUTPUT COIL (sin COIL) | B2 | 0 | -B1 | 0 | B1 | 0 | B2 | 0 | -B1 |

| TOOTH NUMBER | 1 | 2 | 3 | 4 | 5 | 6 | 7 | 8 | 9 |
|---|---|---|---|---|---|---|---|---|---|
| EXCITATION COIL | C | −C | C | −C | C | −C | C | −C | C |
| FIRST OUTPUT COIL (cos COIL) | A1 | 0 | −A2 | 0 | −A2 | 0 | A1 | 0 | −A2 |
| SECOND OUTPUT COIL (sin COIL) | 0 | B1 | 0 | B2+b | 0 | −B1 | 0 | B1 | 0 |
| TOOTH NUMBER | 10 | 11 | 12 | 13 | 14 | 15 | 16 | 17 | 18 |
| EXCITATION COIL | −C | C | −C | C | −C | C | −C | C | −C |
| FIRST OUTPUT COIL (cos COIL) | 0 | −A2 | 0 | A1 | 0 | −A2 | 0 | −A2 | 0 |
| SECOND OUTPUT COIL (sin COIL) | B2+b | 0 | −B1 | 0 | B1 | 0 | B2+b | 0 | −B1 |

| TOOTH NUMBER | 1 | 2 | 3 | 4 | 5 | 6 | 7 | 8 | 9 |
|---|---|---|---|---|---|---|---|---|---|
| EXCITATION COIL | C | -C | C | -C | C | -C | C | -C | C |
| FIRST OUTPUT COIL (cos COIL) | A1+a | 0 | -A2 | 0 | -A2 | 0 | A1 | 0 | -A2 |
| SECOND OUTPUT COIL (sin COIL) | 0 | B1 | 0 | B2 | 0 | -B1 | 0 | B1 | 0 |
| TOOTH NUMBER | 10 | 11 | 12 | 13 | 14 | 15 | 16 | 17 | 18 |
| EXCITATION COIL | -C | C | -C | C | -C | C | -C | C | -C |
| FIRST OUTPUT COIL (cos COIL) | 0 | -A2 | 0 | A1 | 0 | -A2 | 0 | -A2 | 0 |
| SECOND OUTPUT COIL (sin COIL) | B2 | 0 | -B1 | 0 | B1 | 0 | B2 | 0 | -B1 |

FIG. 34

| TOOTH NUMBER | SHAFT ANGLE MULTIPLIER N | NO. OF TEETH 2M | ORDER OF EXCITATION COILS M | ORDER OF EXCITATION COILS \|M±N\| | δ =\|M-\|M±N\|\| | ε =\|δ-M\| |
|---|---|---|---|---|---|---|
| EXAMPLE 10-1 | 15 | 18 | 9 | 24(6),6 | 15,3 | 6 |
| EXAMPLE 10-2 | 24 | 18 | 9 | 33(3),15(3) | 24,6 | 15,3 |
| EXAMPLE 10-3 | 30 | 18 | 9 | 39(3),21(3) | 30,12 | 21,3 |

FIG. 35

| TOOTH NUMBER | SHAFT ANGLE MULTIPLIER N | NO. OF TEETH 2M | ORDER OF EXCITATION COILS M | ORDER OF EXCITATION COILS \|M±N\| | δ =\|M-\|M±N\|\| | ε =\|δ-M\| |
|---|---|---|---|---|---|---|
| EXAMPLE 11-1 | 20 | 30 | 15 | 35(5),5 | 20,10 | 5 |
| EXAMPLE 11-2 | 10 | 30 | 15 | 25(5),5 | 10 | 5 |
| EXAMPLE 11-3 | 24 | 30 | 15 | 39(9),9 | 24,6 | 9 |

ROTATION ANGLE DETECTOR, ROTARY ELECTRICAL MACHINE AND ELEVATOR HOISTING MACHINE

TECHNICAL FIELD

This invention relates to a rotation angle detector having a detecting stator and a detecting rotor capable of rotating with respect to the detecting stator, and to a rotary electrical machine, and an elevator hoisting machine.

BACKGROUND ART

Known in the prior art is a rotation angle detector wherein, in order to detect the rotation position of a rotor, single-phase excitation coils are wound respectively around each of a plurality of teeth of a stator, and furthermore, two-phase output coils are wound alternately around the teeth where the excitation coils are wound, the total number of windings of the two-phase output coils is the same value of N (where N is a positive integer).

However, in a conventional rotation angle detector of this kind, error in detection of the rotation position occurs due to manufacturing errors in the stator, and the like. In the prior art, a rotation angle detector has been proposed in which, in order to reduce detection errors in the rotation position of the rotor, the number of windings of an output coil of one phase, among two-phase output coils, is kept at N, and the number of windings of the output coil of the other phase is adjusted to N±m (where m is a positive integer and N>m) (see, for example, PTL1).

CITATION LIST

Patent Literature

[PTL1] Japanese Patent Application Publication No. 2003-194584

SUMMARY OF INVENTION

Technical Problem

However, in the conventional rotation angle detector disclosed in PTL1, there is only one number of windings of each output coil before adjustment of the number of windings (in other words, only N), and therefore the option of the number of windings of the coil that can be adjusted in order to reduce the shaft angle multiplier component of the detection error of the rotation angle of the rotor is limited to only one option. Consequently, it is difficult to effectively reduce the shaft angle multiplier component of the detection error of the rotation angle of the rotor.

The present invention was devised in order to resolve the problem described above, an object thereof being to provide a rotation angle detector, a rotary electrical machine and an elevator hoisting machine, whereby detection error in the rotation angle of a detecting rotor can be reduced effectively.

Solution to Problem

The rotation angle detector according this invention is a rotation angle detector including: a detecting stator having a detecting stator core, a plurality of excitation coils, a plurality of first output coils and a plurality second output coils, which are provided respectively on the detecting stator core; and a detecting rotor which has a plurality of salient poles arranged in a circumferential direction of the rotor and is capable of rotating with respect to the detecting stator while the salient poles face the detecting stator in a radial direction of the rotor, wherein the first output coils and the second output coils are output coils of mutually different phases; the detecting stator core has a plurality of teeth arranged in the circumferential direction; the excitation coils are wound respectively about the teeth; the first output coils and the second output coils are wound about mutually different teeth so that winding of output coils of the same phase is avoided in two teeth that are mutually adjacent in the circumferential direction; the number of pole pairs of the excitation coils is set to M, which is an integer no less than 1; the number of salient poles is set to N, which is an integer no less than 1; and when a reference state is a state where the plurality of first output coils include at least first output coils having the number of windings of $Ai$, which is an integer no less than 1, and first output coils having the number of windings of $Aj$, which is an integer no less than 1 that is smaller than $Ai$, and where the plurality of second output coils include at least second output coils having the number of windings of $Bk$, which is an integer no less than 1, and second output coils having the number of windings of $Bm$, which is an integer no less than 1 that is smaller than $Bk$, and moreover where a spatial distribution of the numbers of windings of the first output coils and the second output coils is obtained by a sum of a function expressed by a sine wave of spatial order $|M \pm N|$ and a function expressed by a sine wave of spatial order $|M-|M \pm N||$ having an amplitude equal to an amplitude of the sine wave of spatial order $|M \pm N|$, and when $a$ is an integer no less than 1 that is smaller than $Aj$ and $b$ is an integer no less than 1 that is smaller than $Bm$; then at least one configuration is provided from among: a configuration in which the numbers of windings of the first and second output coils are respectively the same numbers of windings as in the reference state, with the exception that a first output coil having the number of windings of $Ai \pm a$ which is greater than $Aj$ is wound about at least any of the teeth where a first output coil having the number of windings of $Ai$ is wound in the reference state, or a first output coil having the number of windings of $Aj \pm a$ which is smaller than $Ai$ is wound about at least any of the teeth where a first output coil having the number of windings of $Aj$ is wound in the reference state; and a configuration in which the numbers of windings of the first and second output coils are respectively the same numbers of windings as in the reference state, with the exception that a second output coil having the number of windings of $Bk \pm b$ which is greater than $Bm$ is wound about at least any of the teeth where a second output coil having the number of windings of $Bk$ is wound in the reference state, or a second output coil having the number of windings of $Bm \pm b$ which is smaller than $Bk$ is wound about at least any of the teeth where a second output coil having the number of windings of $Bm$ is wound in the reference state.

Advantageous Effects of Invention

According to the rotation angle detector, the rotary electrical machine and the elevator hoisting machine of the present invention, it is possible to set at least two different numbers of windings for each of the first output coils and the second output coils before adjusting the number of windings, and it is possible to increase the options of the respective numbers of windings of the first and second output coils that enable adjustment of the detection error of the detecting rotor. Consequently, it is difficult to effectively reduce the shaft angle multiplier component of the detection error of the rotation angle of the detecting rotor.

BRIEF DESCRIPTION OF DRAWINGS

FIG. 6 is a table showing the number of windings of the conductive wires of the excitation coils, the first output coils and the second output coils in a reference state.

FIG. 16 is a table showing the number of windings of the conductive wires of the excitation coils, the first output coils and the second output coils in FIG. 4, according to Example 2-1.

FIG. 17 is a table showing the number of windings of the conductive wires of the excitation coils, the first output coils and the second output coils in FIG. 4, according to Example 2-2.

FIG. 34 is a chart showing, as Example 10-1, the number of salient poles (shaft angle multiplier), the number of teeth, the spatial order of the excitation coils, and the spatial orders of the first and second output coils, of the rotation angle detector in FIG. 3.

FIG. 35 is a chart showing, as Example 11-1, the number of salient poles (shaft angle multiplier), the number of teeth, the spatial order of the excitation coils, and the spatial orders of the first and second output coils, of the rotation angle detector according to the eleventh embodiment of the invention.

DESCRIPTION OF EMBODIMENTS

A preferred embodiment of this invention is described below with reference to the drawings.

First Embodiment

Figure 1:
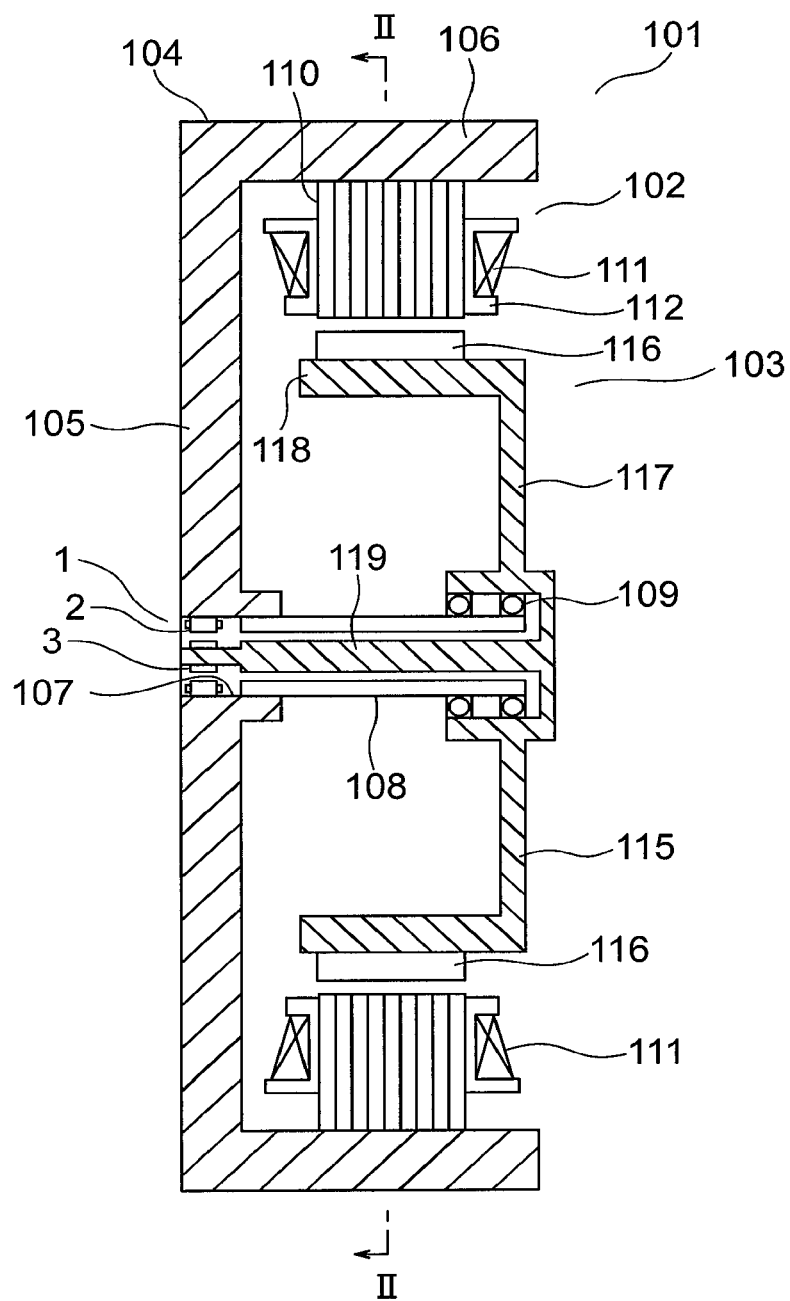
FIG. 1 is a vertical cross-sectional diagram showing a rotary electrical machine according to a first embodiment of this invention.
Figure 2:
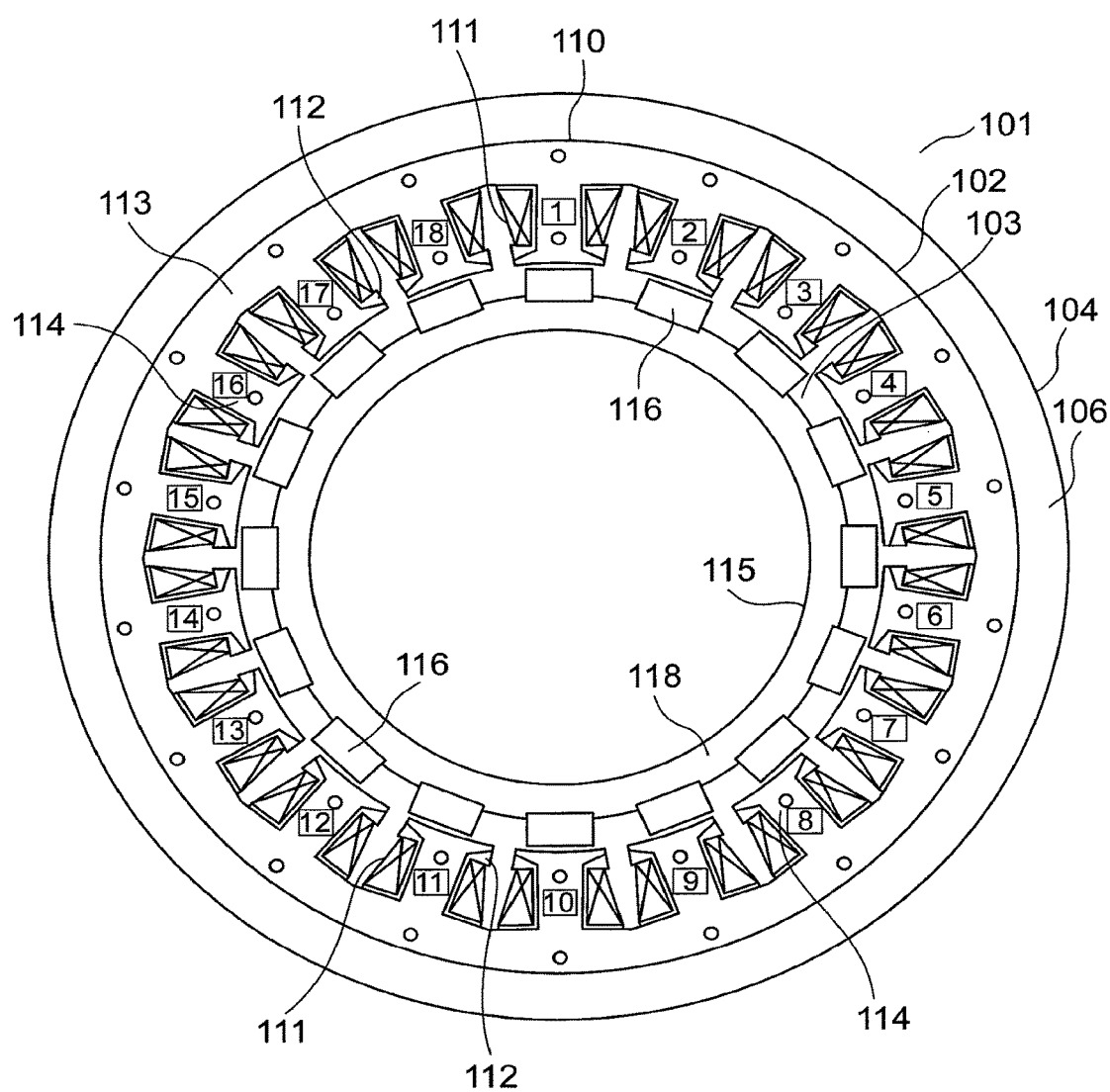
FIG. 2 is a cross-sectional diagram along line II-II in FIG. 1.

FIG. 1 is a vertical cross-sectional diagram showing a rotary electrical machine according to a first embodiment of this invention. Furthermore, FIG. 2 is a cross-sectional diagram along line II-II in FIG. 1. In the drawing, a rotary electrical machine 101 has a circular ring-shaped stator 102, a rotor 103 which is disposed to the inside of the stator 102 and is capable of rotating with respect to the stator 102, and a housing 104 which supports the stator 102 and the rotor 103.

The housing 104 has a plate-shaped housing main body 105 and a cylindrical housing cylinder section 106 which is fixed to the outer peripheral portion of the housing main body 105. A through hole 107 is provided in the central portion of the housing main body 105. As illustrated in FIG. 1, a support shaft 108 which is fixed to the housing main body 105 and is disposed on the central axis line of the housing cylinder section 106 is fixed to the housing 104. The support shaft 108 is a hollow (cylindrical) axle through the inside of which a through hole 107 is formed. The rotor 103 is installed rotatably on the support shaft 108 via a bearing 109. Furthermore, the rotor 103 is supported on the housing 104 via the support shaft 108.

The stator 102 is disposed coaxially with the rotor 103. Furthermore, the stator 102 includes a circular ring-shaped stator core 110 which surrounds the outer periphery of the rotor 103, a plurality of stator coils 111 which are provided respectively on the stator core 110 and are arranged in the circumferential direction of the stator core 110, and an insulator 112 which is provided on the stator core 110 and is interposed between the stator core 110 and the stator coils 111. The stator 102 is supported on a housing 104 in a state where the stator core 110 is fitted inside the housing cylinder section 106. An insulated state is maintained between the stator coils 111 and the stator core 110 by means of the insulator 112.

The stator core 110 is constituted by a plurality of iron plates (magnetic bodies) which are stacked in the axial direction of the support shaft 108. Furthermore, the stator core 110 has a circular ring-shaped back yoke section 113 that follows the inner circumferential surface of the housing cylinder section 106, and a plurality of magnetic pole teeth sections 114 which project respectively in an inward radial direction from the back yoke section 113 and which are disposed at intervals apart from each other in the circumferential direction of the stator core 110. The magnetic pole teeth sections 114 are disposed at even intervals apart in the circumferential direction of the stator core 110.

The stator coils 111 are provided individually on each of the magnetic pole teeth sections 114. Consequently, the stator coils 111 are disposed at even intervals apart in the circumferential direction of the stator core 110. A rotating magnetic field is generated in the stator 102 by passing current through the stator coils 111. The rotor 103 is made to rotate about the axis of the support shaft 108 by the generation of a rotating magnetic field in the stator 102.

The rotor 103 has a rotor yoke 115 and a plurality of permanent magnets (rotor magnetic pole sections) 116 which are provided respectively on the rotor yoke 115.

The rotor yoke 115 is a cast object made from cast iron. Furthermore, as illustrated in FIG. 1, the rotor yoke 115 has a rotor yoke main body 117 on which a bearing 109 is installed, a cylindrical rotor cylinder section 118 which is fixed to the outer peripheral portion of the rotor yoke main body 117 and which is arranged coaxially with the support shaft 108, and a detector shaft 119 which is fixed to the central portion of the rotor yoke main body 117 and reaches inside the through hole 107 by passing through the interior of the support shaft 108.

The rotor yoke 115 is disposed inside the stator 102, in a state where the outer peripheral surface of the rotor cylinder section 118 faces the stator 102 in the radial direction of the rotor 103. Consequently, the outer peripheral surface of the rotor cylinder section 118 faces the front end faces of the magnetic pole teeth sections 114 in the radial direction.

The permanent magnets 116 are provided respectively on the outer peripheral surface of the rotor cylinder section 118. Furthermore, the permanent magnets 116 are disposed at intervals apart from each other in the circumferential direction of the rotor 103 (the direction of rotation of the rotor 103), in the space between the rotor cylinder section 118 and the stator 102. In this example, the permanent magnets 116 are disposed at even intervals apart in the circumferential direction of the rotor 103.

A rotation angle detector 1 which detects the rotation angle of the rotor 103 is provided inside the through hole 107 of the housing main body 105. The rotation angle detector 1 has a detecting stator 2 which is fixed to the housing main body 105 inside the through hole 107 and a detecting rotor 3 which is a magnetic body that faces the detecting stator 2 in the radial direction and is capable of rotating with respect to the detecting stator 2. In this example, the shape of the detecting stator 2 is a circular ring shape, and the detecting rotor 3 is disposed to the inside of the detecting stator 2 in the radial direction. Furthermore, in this example, the detecting rotor 3 is fixed to the detector shaft 119.

Figure 3:
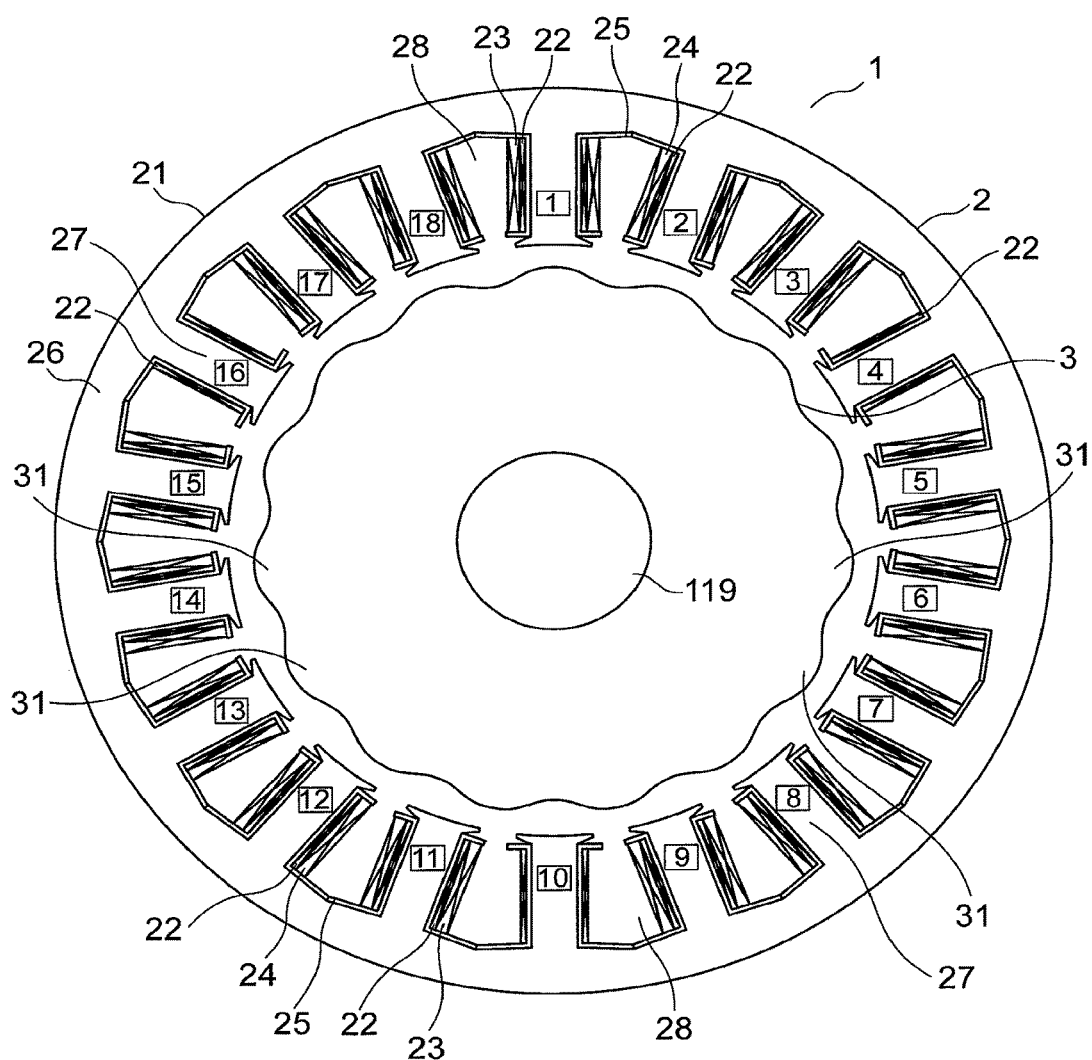
FIG. 3 is a cross-sectional diagram showing the rotation angle detector in FIG. 1.

FIG. 3 is a cross-sectional diagram showing the rotation angle detector 1 in FIG. 1. In FIG. 3, numbers are assigned consecutively to the teeth 27 in the circumferential direction for the sake of convenience (the numbers inside the square boxes in FIG. 3). The detecting stator 2 has a detecting stator core 21, which is a magnetic body, a plurality of excitation coils 22, a plurality of first output coils 23 and a plurality of second output coils 24, which are provided respectively on the detecting stator core 21, and insulating bodies 25 which are provided on the detecting stator core 21 and are interposed between the excitation coils 22, the first output coils 23, and the second output coils 24, and the detecting stator core 21. The state of insulation between the detecting stator core 21 and the excitation coils 22, the first output coils 23 and the second output coils 24 is maintained by the insulating bodies 25.

The detecting stator core 21 has a circular ring-shaped core back 26, and a plurality of teeth 27 which project respectively in an inward radial direction from the core back 26 and are arranged in the circumferential direction of the detecting stator core 21. In this example, 18 teeth 27 are arranged at even intervals apart in the circumferential direction of the detecting stator core 21. Slots 28 in which at least one of an excitation coil 22 and first and second output coils 23, 24 is arranged are formed between each of the teeth 27.

The excitation coils 22 are wound respectively about each of the teeth 27. The excitation coils 22 are electrically connected to each other in series.

The first output coils (COS coils) 23 and second output coils (SIN coils) 24 are output coils of mutually different phases. The first output coils 23 are electrically connected to each other in series and the second output coils 24 are electrically connected to each other in series. Furthermore, the first output coils 23 and the second output coils 24 are respectively wound about mutually different teeth 27, while avoiding winding of output coils 23, 24 of the same phase about two teeth 27 which are adjacent to each other in the circumferential direction of the detecting stator core 21. In this example, the first output coils 23 are wound respectively about a plurality of teeth 27 selected in alternation in the circumferential direction, from among the plurality of teeth 27, and the second output coils 24 are wound respectively about the plurality of teeth 27 which are not the teeth 27 about which the first output coils 23 are wound. Furthermore, in this example, the first and second output coils 23, 24 are wound respectively about the teeth 27 in a state where the first output coils 23 cover the outer periphery of the excitation coils 22, and the second output coils 24 cover the outer periphery of the excitation coils 22.

The central portion of the detecting rotor 3 is fitted (fixed) to the detector shaft 119. Consequently, the detecting rotor 3 is rotated in an integrated fashion with the detector shaft 119 about the axis of the detector shaft 119.

The detecting rotor 3 has a plurality of salient poles 31 which are arranged in the circumferential direction of the detecting rotor 3. Furthermore, the detecting rotor 3 is rotatable with respect to the detecting stator 2 with the salient poles 31 facing the inner circumferential surface of the detecting stator 2 in the radial direction. When the detecting rotor 3 rotates with respect to the detecting stator 2, the pulsation of the permeance between the detecting rotor 3 and the detecting stator 2 changes in a sinusoidal fashion due to the presence of the salient poles 31.

A magnetomotive force is generated in the excitation coils 22 by the supply of an AC current to the excitation coils 22. Consequently, a magnetic flux passing through the detecting rotor 3 and the detecting stator core 21 is generated. A voltage is generated in the first and second output coils 23, 24 due to interlinking of this magnetic flux in the first and second output coils 23, 24. Since the permeance between the detecting rotor 3 and the detecting stator 2 changes in a sinusoidal fashion in accordance with the rotation angle of the detecting rotor 3, then the rotation angle of the detecting rotor 3 is detected by measuring the voltages output respectively from the first output coils 23 and the second output coils 24.

Figure 4:
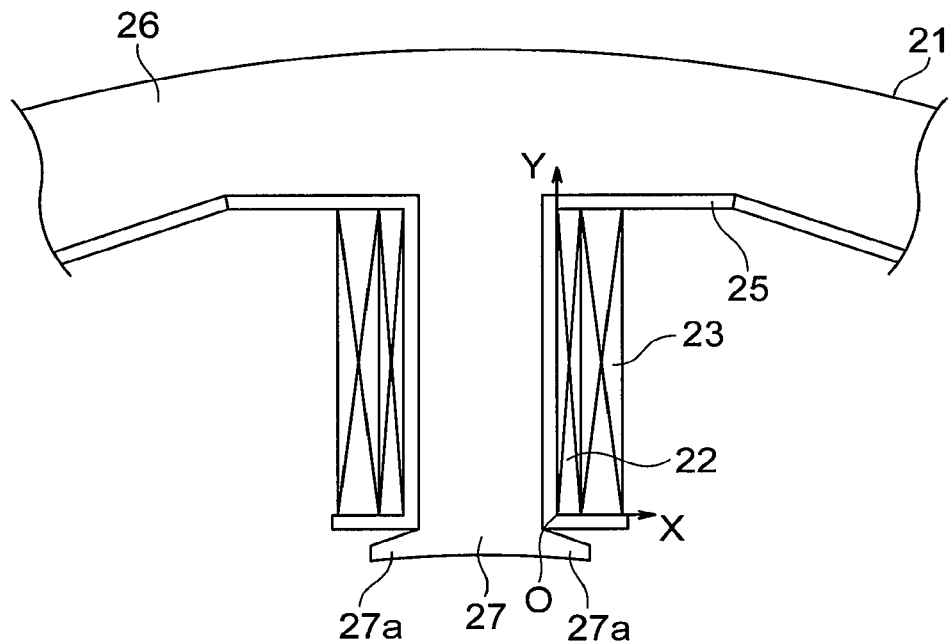
FIG. 4 is an enlarged diagram illustrating an excitation coil and a first output coil which are wound about the tooth having tooth number 1 in FIG. 3.

FIG. 4 is an enlarged diagram illustrating an excitation coil 22 and a first output coil 23 which are wound about the tooth 27 having tooth number 1 in FIG. 3. A pair of projections 27a which project in mutually opposite directions in the circumferential direction of the detecting rotor 3 are provided on the front end portions of the tooth 27. The conductive wires of the excitation coil 22 and the first output coil 23 are wound about the tooth 27 via the insulating body 25, in the space between the projections 27a and the core back 26. Consequently, the magnetic flux passing between the detecting rotor 3 and the tooth 27 passes efficiently through the detecting stator core 21, the magnetic flux that interlinks with the first output coil 23 is made larger, and the value of the output voltage of the first output coil 23 becomes larger.

The excitation coil 22 is provided along the tooth 27 in the range between the projections 27a and the core back 26. The first output coil 23 is provided on the tooth 27 in a state of covering the outer periphery of the excitation coil 22. In other words, an excitation coil 22 and a first output coil 23 which is wound about the outer periphery of the excitation coil 22 are provided on the tooth 27.

The first output coils 23 provided on the other teeth 27 are similarly wound about the outer periphery of the excitation coils 22. Furthermore, the second output coils 24 provided on the other teeth 27 are similarly wound about the outer periphery of the excitation coils 22. In other words, the conductive wires of the first output coils 23 and the second output coils 24 are each wound onto the teeth 27 so as to cover the teeth 27 and the excitation coils 22, after the conductive wires of the excitation coils 22 have been wound about the teeth 27.

Figure 5:
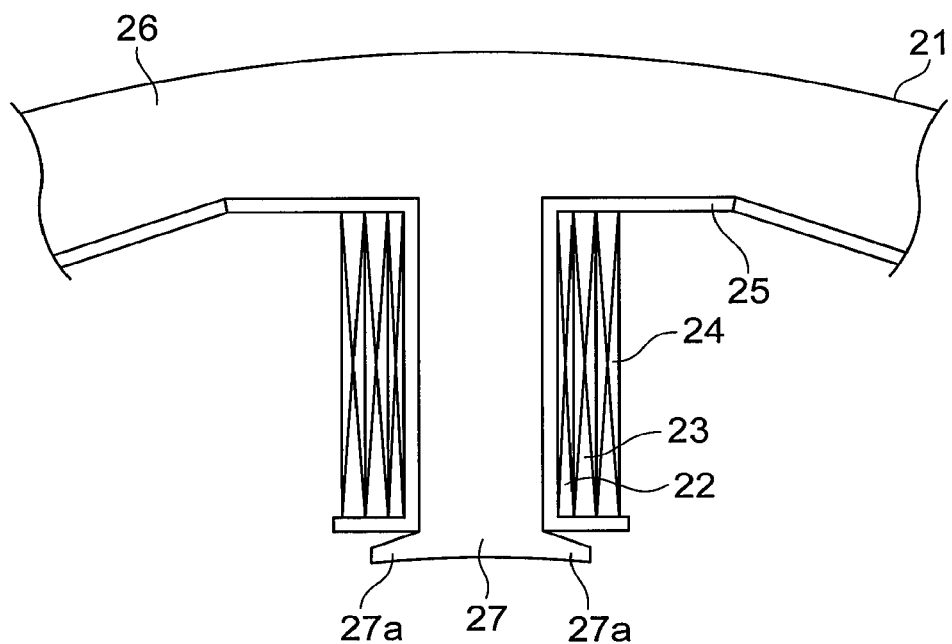
FIG. 5 is a schematic drawing illustrating the principal part of a comparative example for comparison with the rotation angle detector of the first embodiment of the invention.

Here, FIG. 5 is a schematic drawing illustrating the principal part of a comparative example for comparison with the rotation angle detector 1 of the first embodiment of the invention. In the comparative example, excitation coils 22, first output coils 23 and second output coils 24 are wound respectively about each of the teeth 27. Furthermore, in the comparative example, the excitation coils 22 are provided along the teeth 27 in the range between the projections 27a and the core back 26. Furthermore, in the comparative example, the conductive wires of the first output coils 23 are wound about the outer periphery of the excitation coils 22, and the conductive wires of the second output coils 24 are wound about the outer periphery of the first output coils 23. In other words, in the comparative example, the conductive wires of the excitation coils 22 are wound about the teeth 27, whereupon the conductive wires of the first output coils 23 are wound over the outer periphery of the excitation coils 22, and after winding the conductive wires of the first output coils 23, the conductive wires of the second output coils 24 are wound over the outer periphery of the first output coils 23.

When the first embodiment and the comparative example are compared, in the first embodiment, only one of a first or a second output coil 23, 24 is provided on any one tooth 27, whereas in the comparative example, both a first and a second output coil 23, 24 are provided on each tooth 27. Therefore, it can be seen that, in the first embodiment, the number of windings of the conductive wires of the first and second output coils 23, 24 provided on the teeth 27 can be made greater than in the comparative example. Furthermore, in the first embodiment, it is possible to reduce the number of coil wires provided on each tooth 27, and therefore the work of providing the excitation coils 22, first output coils 23 and second output coils 24 on the detecting stator core 21 can be reduced. Moreover, in the comparative example, the conductive wires of the first and second output coils 23, 24 each have a winding start and end point, and therefore winding deviations are liable to occur, whereas in the first embodiment, a winding start and end point occurs in only one of the first and second output coils 23, 24, and therefore winding deviations are less liable to occur.

Furthermore, the number of windings in each of the excitation coils 22, first output coils 23 and second output coils 24 in the present embodiment is determined on the basis of the number of windings of each of the excitation coils 22, first output coils 23 and second output coils 24 in a reference state. The configuration of the rotation angle detector in a reference state is similar to the configuration illustrated in FIG. 3, apart from the configuration relating to the number of windings of the first output coils 23 and the second output coils 24. Firstly, the number of windings of the conductive wires of the excitation coils 22, the first output coils 23 and the second output coils 24 in a reference state will be explained.

FIG. 6 is a table showing the number of windings of the conductive wires of the excitation coils 22, the first output coils 23 and the second output coils 24 in a reference state. The numbers below the tooth number in FIG. 6 indicate the number of windings of the conductive wires that are wound about the tooth 27 corresponding to that tooth number. Moreover, the positive or negative sign of the number of windings in FIG. 6 indicates the mutually opposite winding directions of the conductive wires.

In the reference state, the conductive wires of the excitation coils 22 are wound in opposite winding directions in mutually adjacent teeth 27, and are wound C=40 times on all of the teeth 27.

Furthermore, the conductive wires of the first output coils 23 in the reference state are wound A1=460 times on each of the teeth 27 having tooth numbers 1, 7 and 13, and A2=230 times on each of the teeth 27 having tooth numbers 3, 5, 9, 11, 15 and 17. The conductive wires of the first output coils 23 wound about the teeth 27 having tooth numbers 1, 7 and 13 are each wound in the same direction. Furthermore, the conductive wires of the first output coils 23 wound about the teeth 27 having tooth numbers 3, 5, 9, 11, 15 and 17 are wound in the opposite direction to the direction of winding of the conductive wires of the first output coils 23 wound about the teeth 27 having tooth numbers 1, 7 and 13.

The conductive wires of the second output coils 24 in the reference state are wound B1=398 times about each of the teeth 27 having tooth numbers 2, 6, 8, 12, 14, 18. The conductive wires of the second output coils 24 wound about the teeth 27 having tooth numbers 2, 8 and 14 are wound in the same direction as the direction of winding of the conductive wires of the first output coils 23 wound about the teeth 27 having tooth numbers 1, 7 and 13. Furthermore, the conductive wires of the second output coils 24 wound about the teeth 27 having tooth numbers 6, 12 and 18 are wound in the opposite direction to the direction of winding of the conductive wires of the second output coils 24 wound about the teeth 27 having tooth numbers 2, 8 and 14. On the teeth 27 having tooth numbers 4, 10 and 16, B2 is set to B2=0, and no first and second output coils 23, 24 are wound, in order that the output coils are distributed in a sinusoidal fashion. Consequently, in the reference state, of the numbers of windings of each of the plurality of first output coils 23, A1 is the largest number of windings, A2 is the smallest number of windings, and of the numbers of windings of each of the plurality of second output coils 24, B1 is the largest number of windings and B2 is the smallest number of windings.

If the number of pairs of poles of the excitation coils 22 is M when the number of teeth 27 on the detecting stator core 21 is 2M (where M is an integer no less than 1), and the number of salient poles 31 of the detecting rotor 3 (in other words, the shaft angle multiplier) is N (where N is an integer no less than 1), and the numbers of windings of the first output coils 23 and the second putpu coils 24 on each of the teeth 27 are $w_{sin,i}$, $w_{cos,i}$ (where i is 1, 2, ..., 2M), and the maximum number of windings of each of the first output coils 23 and second output coils 24, per tooth 27, is $w_{max}$, then the spatial distribution of the numbers of windings of the first output coils 23 and the second output coils 24 in the reference state is as indicated by the respective formulas below. The double signs in Equations (1) to (6) are the same sequence.

[Math. 1]

$$w_{cos,i} = \frac{1}{2}\left\{w_{max}\cos\left[\frac{2\pi i}{2M}|M \pm N|\right] + \begin{cases} w_{max}\cos\left[\frac{2\pi i}{2M}(M - |M \pm N|)\right], \\ \text{with double signs} \quad (1) \\ i = 1, 2, \cdots, 2M, \text{ being the same} \\ \text{sequence)} \end{cases}\right.$$

$$= \begin{cases} w_{max}\cos\left[\frac{2\pi i}{2M}|M \pm N|\right], (i = 1, 3, \cdots, 2M - 1, \text{ with double signs} \quad (2) \\ \text{being the same sequence)} \quad (3) \\ 0, (i = 2, 4, \cdots, 2M) \end{cases}$$

[Math. 2]

$$w_{sin,i} = \frac{1}{2}\left\{w_{max}\sin\left[\frac{2\pi i}{2M}|M \pm N|\right] + \begin{cases} w_{max}\cos\left[\frac{2\pi i}{2M}(M - |M \pm N|)\right], \\ \text{with double signs} \quad (4) \\ i = 1, 2, \cdots, 2M, \text{ being the same} \\ \text{sequence)} \end{cases}\right.$$

-continued $$= \begin{cases} 0, (i = 2, 3, \cdots, 2M - 1) & (5) \\ w_{max} \sin\left[\frac{2\pi i}{2M} |M \pm N|\right], (i = 2, 4, \cdots, 2M, \text{ being the same sequence}) & (6) \end{cases}$$

with double signs

From Equation (1) to Equation (6), it can be seen that, in the reference state, the first output coils (COS coils) 23 and the second output coils (SIN coils) 24 are wound alternately, one phase at a time, on each of the teeth 27, and the number of windings of the first and second output coils 23, 24 is obtained by a function expressed as a sine wave of spatial order $|M \pm N|$. Furthermore, from Equation (1) and Equation (4), it can be seen that, in the reference state, the spatial distribution of the number of windings of the first output coils 23 and the second output coils 24 includes a function expressed as a sine wave of spatial order $|M - |M \pm N||$. Furthermore, it can also be seen that, in the reference state, the amplitude of the sine wave of spatial order $|M \pm N|$ and the amplitude of the sine wave of spatial order $|M - M \pm N||$ are equal.

Figure 7:
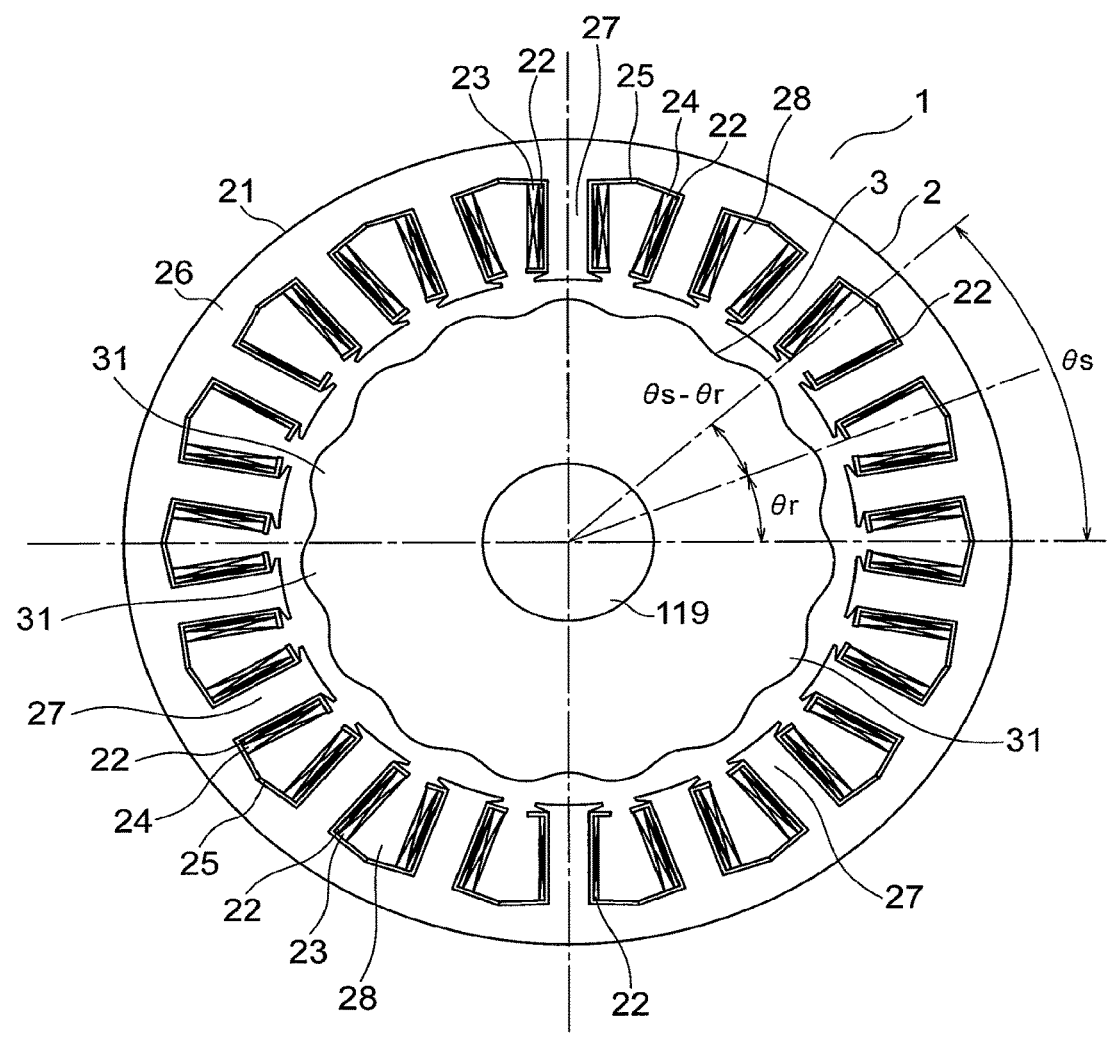
FIG. 7 is a schematic drawing illustrating the coordinate relationship between the angle $\theta_s$ of the detecting stator and the rotation angle $\theta_r$ of the detecting rotor in the rotation angle detector in FIG. 3.

FIG. 7 is a schematic drawing illustrating the coordinate relationship between the angle $\theta_s$ of the detecting stator 2 and the rotation angle $\theta_r$ of the detecting rotor 3 in the rotation angle detector 1 in FIG. 3. When the magnetic flux density in the gap (space) between the detecting stator 2 and the detecting rotor 3 is $B_g(\theta_s)$, the magnetomotive force of the excitation coils 22 is $F(\theta_s)$, the permeance which indicates the ease with which the magnetic flux can pass through the gap between the detecting stator 2 and the detecting rotor 3 is $P(\theta_s)$, the permeance component that is not dependent on the angle is $P_O$, the amplitude of the permeance component that varies with the shaft angle multiplier of the detecting rotor 3 is $P_N$, the amplitude and the spatial order of the permeance component which varies with error other than the shaft angle multiplier of the detecting rotor 3 are respectively $P_r$ and r, the amplitude and the spatial order of the permeance component which varies with error in the detecting stator 2 are respectively $P_s$ and s, and the amplitude of the magnetomotive force of the excitation coils 22 is $F_M$, then the magnetic flux density $B_g(\theta_s)$ is expressed by the following equations.

[Math. 3]

$$P(\theta_s) = P_0 + P_N \cos[N(\theta_s - \theta_r)] + P_r \cos[r(\theta_s - \theta_r)] + P_s \cos[s\theta_s] \qquad (7)$$

[Math. 4]

$$F(\theta_s) = F_M \cos[M\theta_s] \qquad (8)$$

[Math. 5]

$$\begin{aligned} B_g(\theta_s) &= P(\theta_s)F(\theta_s) \qquad (9) \\ &= \{P_0 + P_N \cos[N(\theta_s - \theta_r)] + P_r \cos[r(\theta_s - \theta_r)] + P_s \cos[s\theta_s]\}F_M \cos[M\theta_s] \\ &= \frac{F_M}{2}\{2P_0 \cos[M\theta_s] + \\ &\quad P_N \cos[(M+N)\theta_s - N\theta_r] + P_N \cos[(M-N)\theta_s + N\theta_r] + \\ &\quad P_r \cos[(M+r)\theta_s - r\theta_r] + P_r \cos[(M-r)\theta_s + r\theta_r] + \\ &\quad P_s \cos[(M+s)\theta_s] + P_s \cos[(M-s)\theta_s]\} \qquad (10) \end{aligned}$$

Furthermore, if the interlinkage magnetic flux per winding detected by the first output coil 23 and the second output coil 24 in the i-th tooth 27 is $\phi i$, the length of the detecting stator core 21 in the axial direction is L, the radius of the inner circumferential surface of the detecting stator core 21 is R, the voltage detected by the first output coil 23 is $V_{cos}$, and the voltage detected by the second output coil 24 is $V_{sin}$, then the angle error e ($\theta r$) of the rotation angle detector 1 is expressed by the following equation.

[Math. 6]

$$\phi_i = \int_{\frac{(2i-1)\pi}{2M}}^{\frac{(2i+1)\pi}{2M}} B_g(\theta_s)LRd\theta_s, (i = 1, 2, \cdots, 2M) \qquad (11)$$

[Math. 7]

$$V_{cos} = \frac{d\phi_{cos}}{dt} = \frac{d}{dt}(w_{cos,1}\phi_1 + w_{cos,3}\phi_3 + \cdots + w_{cos,2M-1}\phi_{2M-1}) \qquad (12)$$

[Math. 8]

$$V_{sin} = \frac{d\phi_{sin}}{dt} = \frac{d}{dt}(w_{sin,2}\phi_2 + w_{sin,4}\phi_4 + \cdots + w_{sin,2M}\phi_{2M}) \qquad (13)$$

[Math. 9]

$$e(\theta_r) = \theta_r - \tan^{-1}\left(\frac{V_{sin}}{V_{cos}}\right) \qquad (14)$$

As shown in Equation (1) to Equation (6), the spatial distribution of the number of windings of the first and second output coils 23, 24 is obtained from a function expressed by a sine wave of spatial order $|M \pm N|$, and therefore if Equation (2) and Equation (6) are multiplied by Equation (10) and integrated by the angle $\theta_s$ of the detecting stator 2 for each tooth 27, as in Equation (11), then the coefficient of the angle of rotation $\theta_r$ of the detecting rotor 3 included in the phase component of the COS function at which the coefficient of the angle $\theta_s$ becomes equal to $|M \pm N|$ is an order of the waveform, in one revolution of the detecting rotor 3, of the interlinkage magnetic flux $\phi_i$ per winding which is detected by the first output coils 23 and the second output coils 24.

Furthermore, since the angle error e ($\theta_r$) is obtained from Equation (14), then when only the phase component of the second term and third terms is detected as shown in Equation (10), the coefficient of $\theta_r$ in Equation (14) is 0, and angle error does not occur.

On the other hand, if the coefficient of the angle $\theta_s$ of the detecting stator 2 included in the phase components of the first, fourth, fifth, sixth and seventh terms, which are the phase components other than the phase components of the second and third terms in Equation (10), is equal to |M±N|, then the first output coils 23 and second output coils 24 detect the phase components of the first, fourth, fifth, sixth and seventh terms, the coefficient of $\theta_r$ in Equation (14) is a value other than 0, and angle error occurs. Moreover, from Equation (1) and Equation (4), since the spatial distribution of the number of windings of the first and second output coils 23, 24 includes a function expressed by a sine wave of spatial order |M−|M±N||, then even if the coefficient of the angle $\theta_s$ of the detecting stator 2 included in the phase components of the first, fourth, fifth, sixth and seventh terms is equal to |M-|M±N||, an angle error occurs in a similar fashion, according to Equation (14).

Consequently, it is necessary to set the number of pole pairs M of the excitation coils 22 and the number (shaft angle multiplier) N of salient poles 31 of the detecting rotor 3 in such a manner that both the |M±N|-th order and the |M-|M±N|-th order included in the first output coils 23 and the second output coils 24 do not detect phase components that produce error. In this example, the shaft angle multiplier is N=15, as illustrated in FIG. 3.

Furthermore, if the first and second output coils 23, 24 detect the voltage of the N·θr component, which is the phase component of the second and third terms in Equation (10) and the voltage of the 0·θr component in the sixth and seventh terms in Equation (10), then an N(=N+0)-th order shaft angle multiplier component is generated as an angle error e($\theta_r$). Therefore, it is possible to reduce the shaft angle multiplier component that is an angle error by adjusting the spatial distribution of the number of windings of the first and second output coils 23, 24 to generate a zero-order component of the voltage, and using same to cancel out the zero-order component of the voltage constituted by the 0·θr component described above. In the present embodiment, it is sought to reduce the shaft angle multiplier component which is a detection error in the rotation angle of the detecting rotor 3, by adjusting the numbers of windings of the first and second output coils 23, 24 in the reference state.

Here, the distribution of the interlinkage magnetic flux in the region of the excitation coil 22 and the first output coil 23 which are wound about the tooth 27 in FIG. 4 is derived by calculation. The distribution of the interlinkage magnetic flux in the region of the excitation coil 22 and the second output coil 24 is similar to the case of the excitation coil 22 and the first output coil 23.

Figures 8, 9:
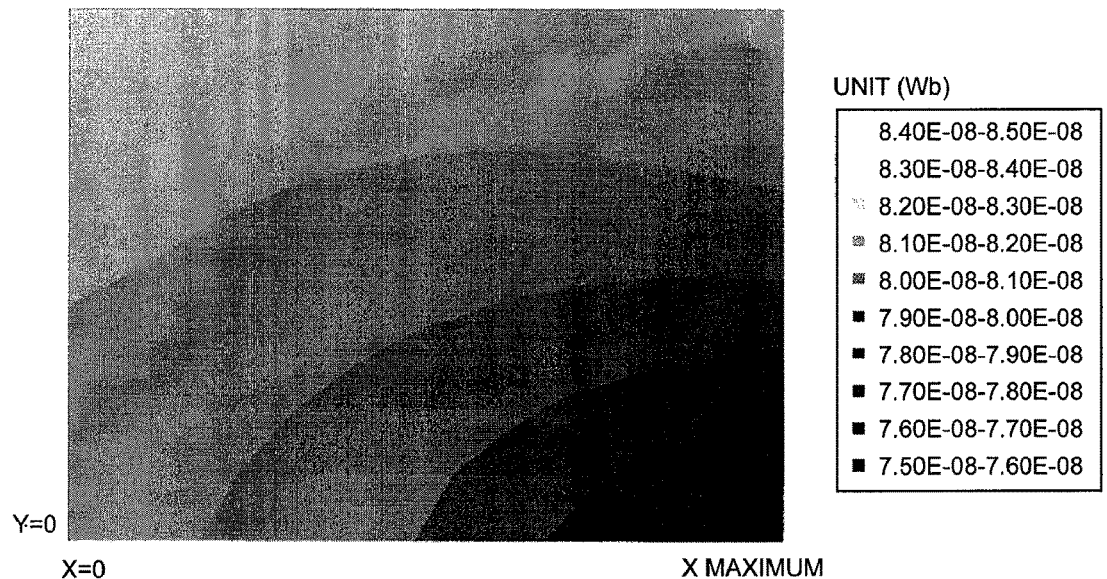
FIG. 8 is an enlarged diagram illustrating the distribution of the interlinkage magnetic flux per winding in the region of the excitation coil and the first output coil in FIG. 4.
FIG. 9 is a table showing the number of windings of the conductive wires of the excitation coils, the first output coils and the second output coils in FIG. 4, according to Example 1-1.

FIG. 8 is an enlarged diagram illustrating the distribution of the interlinkage magnetic flux per winding in the region of the excitation coil 22 and the first output coil 23 in FIG. 4. In FIG. 8, the interlinkage magnetic flux distribution per winding is calculated by setting the point of origin O of the XY coordinates illustrated in FIG. 4 to the position nearest to the front end portion of the tooth 27 and nearest to the tooth 27 in the circumferential direction, in the region of the excitation coil 22 and the first output coil 23 in FIG. 5.

In the present embodiment, example 1-1 and example 1-2 described below are given as specific examples of the numbers of windings of the excitation coils 22, first output coils 23 and second output coils 24 in FIG. 4.

FIG. 9 is a table showing the number of windings of the conductive wires of the excitation coils 22, the first output coils 23 and the second output coils 24 in FIG. 4, according to example 1-1. As illustrated in FIG. 9, Example 1-1 differs from the reference state illustrated in FIG. 6 in that the conductive wires of the first output coils 23 are wound A2+a=231 times (a=1) about each of the teeth 27 having tooth numbers 3, 5, 9, 11, 15 and 17, and in that the conductive wires of the second output coils 24 are wound B1+b=399 times (b=1) about each of the teeth 27 having tooth numbers 2, 8 and 14. Here, the following relationships are established: A1>A2+a, A1>A2>a>0, B1+b>B2, B1>b>0, B2=0. In this way, in Example 1-1, the number of windings A2 of the first output coils 23 and the number of windings B1 of the second output coils 24 in the reference state are adjusted to numbers of windings that differ from the reference state.

In other words, in Example 1-1 illustrated in FIG. 9, if A1=Ai, and A2=Aj, then first output coils 23 having the number of windings Aj+a which is smaller than Ai (Ai>Aj+a) are wound about each of the teeth 27 where first output coils 23 having the number of windings Aj are wound in the reference state. Furthermore, in Example 1-1 illustrated in FIG. 9, if B1=Bk, and B2=Bm, then second output coils 24 having the number of windings Bk+b which is greater than Bm (Bk+b>Bm) are wound about a portion of the teeth 27 where second output coils 24 having the number of windings Bk are wound in the reference state. Incidentally, Ai, Aj, Bk, a and b are integers no less than 1, and the following relationships are established: Ai>Aj>a>0, Bk>b>0, Bm=0. The remaining configuration of Example 1-1 is the same as the reference state.

Figures 10, 11:
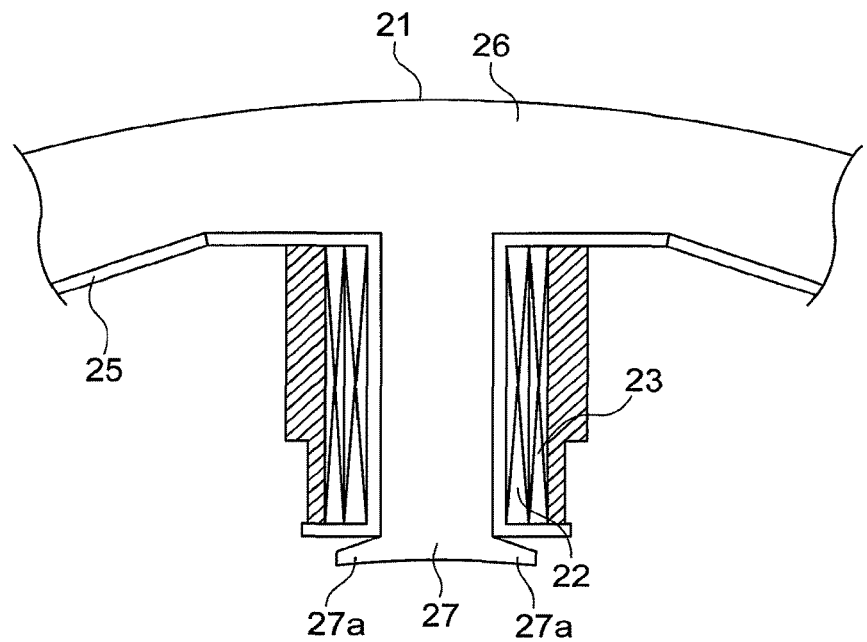
FIG. 10 is an enlarged diagram illustrating an excitation coil and a first output coil which are wound about the tooth having tooth number 3 in FIG. 3, with the number of windings in FIG. 9.
FIG. 11 is a table showing the number of windings of the conductive wires of the excitation coils, the first output coils and the second output coils in FIG. 4, according to Example 1-2.

FIG. 10 is an enlarged diagram illustrating an excitation coil 22 and a first output coil 23 which are wound about the tooth 27 having tooth number 3 in FIG. 3, with the numbers of windings indicated in FIG. 9. In FIG. 10, the region where it is possible to arrange conductive wire that is wound additionally a=1 times in order to adjust the number of windings of the first output coil 23 is indicated by the diagonal hatching. The first output coil 23 is provided on the tooth 27 in a state of covering the outer periphery of the excitation coil 22. Furthermore, the number of windings of the first output coil 23 wound about the teeth 27 having tooth number 3 is the smallest number of windings among the numbers of windings of the plurality of first output coils 23. In the first output coil 23 which is wound about the tooth 27 with the smallest number of windings, the region occupied by the portion of the first output coil 23 in the reference state is small, and therefore, as illustrated in FIG. 10, it is possible to achieve a broader region in the slot in which to arrange additional conductive wire for adjustment of the number of windings. Therefore, the range of the distribution of the interlinkage magnetic flux illustrated in FIG. 8 is large, and hence the range in which the number of windings can be adjusted in one tooth 27 is large and the options for adjustment of the rotation angle error are increased.

FIG. 11 is a table showing the number of windings of the conductive wires of the excitation coils 22, the first output coils 23 and the second output coils 24 in FIG. 4 according to example 1-2. As illustrated in FIG. 11, Example 1-2 differs from the reference state illustrated in FIG. 6 in that the conductive wires of the first output coils 23 are wound A1+a=461 times (a=1) about each of the teeth 27 having tooth numbers 1, 7 and 13, and in that the conductive wires of the second output coils 24 are wound B1+b=399 times (b=1) about each of the teeth 27 having tooth numbers 2, 8 and 14. Here, the following relationships are established: A1+a>A2, A1>A2>a>0, B1+b>B2, B1>b>0, B2=0. In this way, in Example 1-2, the number of windings A1 of the first output coils 23 and the number of windings B1 of the second output coils 24 in the reference state are adjusted to numbers of windings that differ from the reference state.

In other words, in Example 1-2 illustrated in FIG. 11, if A1=Ai, and A2=Aj, then first output coils 23 having the number of windings Ai+a which is smaller than Aj (Ai+a>Aj) are wound about each of the teeth 27 where first output coils 23 having the number of windings Ai are wound in the reference state. Furthermore, in Example 1-2 illustrated in FIG. 11, if B1=Bk, and B2=Bm, then second output coils 24 having the number of windings Bk+b which is greater than Bm (Bk+b>Bm) are wound about a portion of the teeth 27 where second output coils 23 having the number of windings Bk are wound in the reference state. Incidentally, Ai, Aj, Bk, a and b are integers no less than 1, and the following relationships are established: Ai>Aj>a>0, Bk>b>0, Bm=0. The remaining configuration of Example 1-2 is the same as the reference state.

Figure 12:
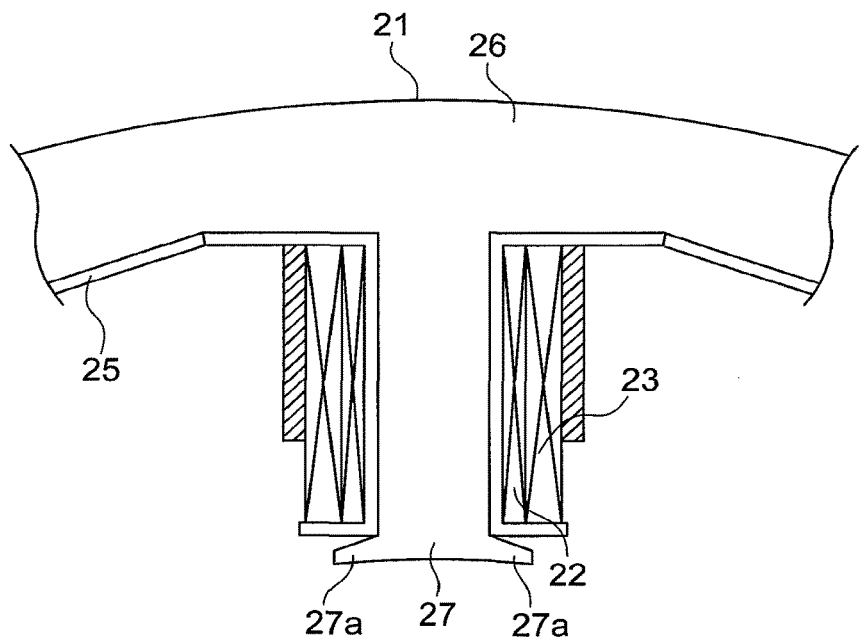
FIG. 12 is an enlarged diagram illustrating an excitation coil and a first output coil which are wound about the tooth having tooth number 1 in FIG. 3, with the number of windings in FIG. 11.

FIG. 12 is an enlarged diagram illustrating an excitation coil 22 and a first output coil 23 which are wound about the tooth 27 having tooth number 1 in FIG. 3, with the numbers of windings indicated in FIG. 11. In FIG. 12, similarly to FIG. 10, the region where it is possible to arrange conductive wire that is wound additionally a=1 times in order to adjust the number of windings in the first output coil 23 is indicated by the diagonal hatching. In the reference state, the number of windings of the first output coil 23 wound about the tooth 27 having tooth number 1 is the largest number of windings among the numbers of windings of the plurality of first output coils 23. Therefore, in the first output coil 23 which is wound about the tooth 27 with the largest number of windings, the region occupied by the portion of the first output coil 23 in the reference state is larger than in FIG. 10, and therefore, as illustrated in FIG. 12, the region in the slot for arranging additional conductive wire for adjustment of the number of windings is more restricted than in FIG. 10. Consequently, in Example 1-2 illustrated in FIG. 11, the range of possible adjustment of the number of windings on one tooth 27 is narrower than in Example 1-1 illustrated in FIG. 9.

Figure 13:
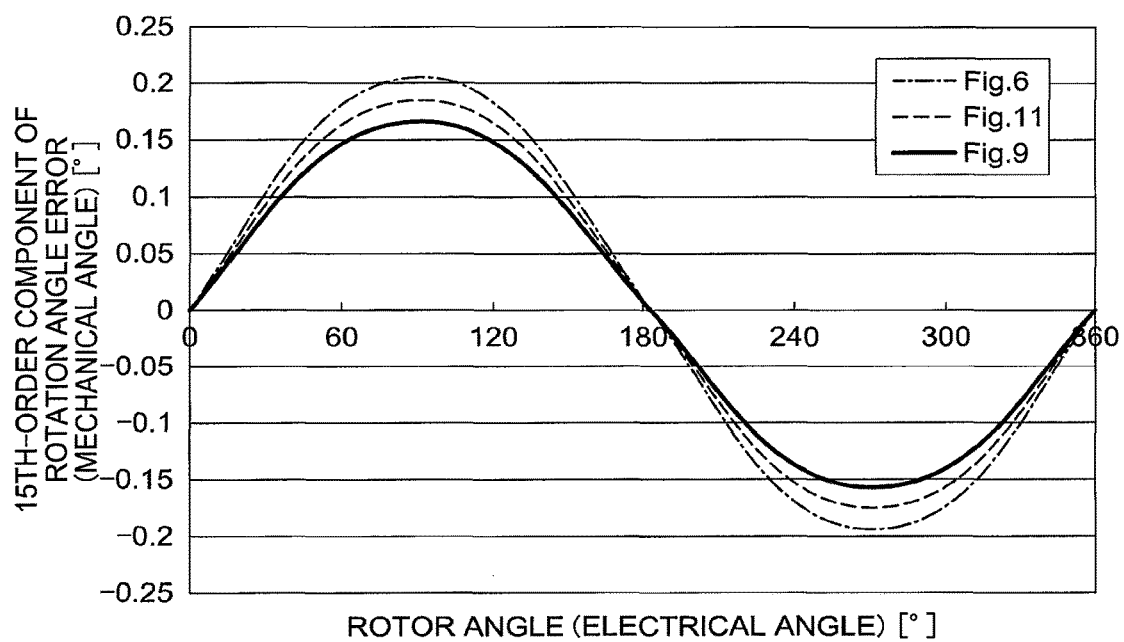
FIG. 13 is a graph comparing the reference state illustrated in FIG. 6, Example 1-1 illustrated in FIG. 9 and Example 1-2 illustrated in FIG. 11, in respect of the 15th-order component (in other words, the shaft angle multiplier component) of the rotation angle error of the detecting rotor in FIG. 3.

FIG. 13 is a graph comparing the reference state illustrated in FIG. 6, Example 1-1 illustrated in FIG. 9 and Example 1-2 illustrated in FIG. 11, in respect of the 15th-order component (in other words, the shaft angle multiplier component) of the rotation angle error of the detecting rotor 3 in FIG. 3. In FIG. 13, the 15th-order component of the rotation angle error of the detecting rotor 3 according to Example 1-1 illustrated in FIG. 9 is indicated by the solid line, the 15th-order component of the rotation angle error of the detecting rotor 3 according to Example 1-2 illustrated in FIG. 11 is indicated by the dashed line, and the 15th-order component of the rotation angle error of the detecting rotor 3 according to the reference state illustrated in FIG. 6 is indicated by the dot-dashed line. As illustrated in FIG. 13, it can be seen that the amount of reduction in the 15th-order component of the rotation angle error of the detecting rotor 3 with respect to the reference state illustrated in FIG. 6 is greater in the case of Example 1-1 illustrated in FIG. 9 than in Example 1-2 illustrated in FIG. 11.

Furthermore, if the 15th-order component of the rotation angle error of the detecting rotor 3 in the reference state illustrated in FIG. 6 is $\eta 0$, then the 15th-order component of the rotation angle error of the detecting rotor 3 in Example 1-1 illustrated in FIG. 9, $\eta 9$, and the 15th-order component of the rotation angle error of the detecting rotor 3 in Example 1-2 illustrated in FIG. 11, $\eta 11$, are respectively expressed by Equations (15) and (16) indicated below.

$$\eta 9 = \eta 0 + \eta c9 + \eta s9 \tag{15}$$

$$\eta 11 = \eta 0 + \eta c11 + \eta s9 \tag{16}$$

Here, $\eta c9$ is the component due to adjustment of the number of windings of the first output coils 23, in $\eta 9$, and $\eta s9$ is the component due to adjustment of the number of windings of the second output coils 24, in $\eta 9$. Furthermore, $\eta c11$ is the component due to adjustment of the number of windings of the first output coils 23, in $\eta 11$, and $\eta s11$ is the component due to adjustment of the number of windings of the second output coils 24, in $\eta 11$.

Figures 14, 15:
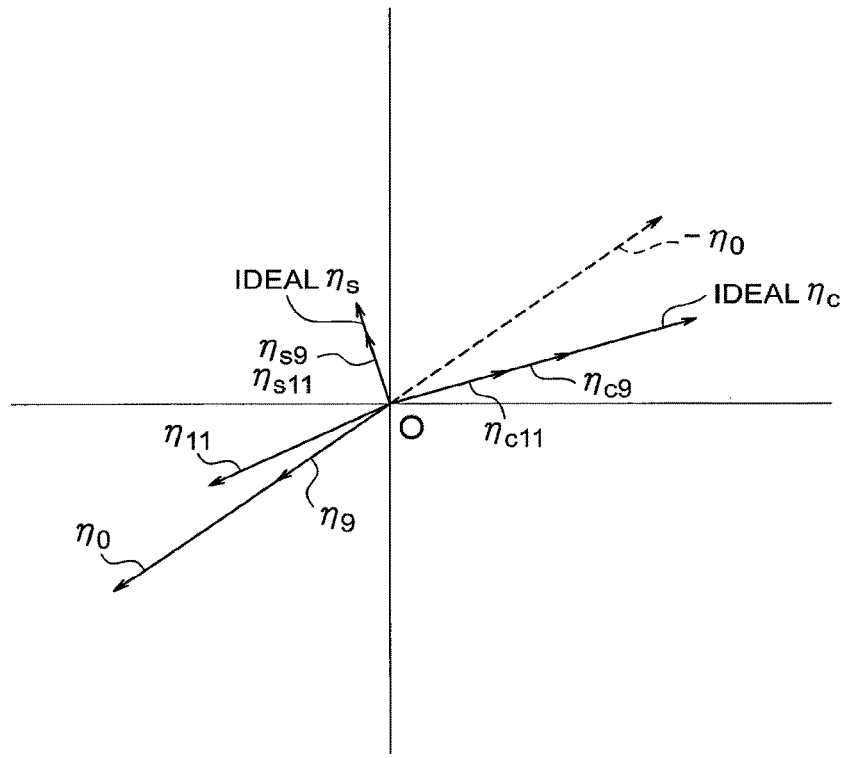
FIG. 14 is a phasor diagram which compares the values of the 15th-order component of the rotation angle error of the detecting rotor in each of the reference state illustrated in FIG. 6, Example 1-1 illustrated in FIG. 9 and Example 1-2 illustrated in FIG. 11.
FIG. 15 is a table indicating the number of windings of the conductive wires of the excitation coils, the first output coils and the second output coils in a reference state which is the reference for adjustment of the number of windings according to the second embodiment of the invention.

FIG. 14 is a phasor diagram which compares the values $\eta 0$, $\eta 9$ and $\eta 11$ of the 15th-order component of the rotation angle error of the detecting rotor 3 in each of the reference state illustrated in FIG. 6, Example 1-1 illustrated in FIG. 9 and Example 1-2 illustrated in FIG. 11. In FIG. 14, $\eta c9$, $\eta s9$, $\eta c11$ and $\eta s11$, and the ideal components $\eta c$, $\eta s$ based on adjustment of the number of windings of each of the first and second output coils 23, 24, are indicated by the solid arrows, together with $\eta 0$, $\eta 9$ and $\eta 11$. As illustrated in FIG. 14, it can be seen that the component $\eta c9$ due to the adjustment of the number of windings of the first output coils 23 in Example 1-1 illustrated in FIG. 9 has a greater effect in reducing the value $\eta 0$ of the 15th-order component of the rotation angle error of the detecting rotor 3 in the reference state illustrated in FIG. 6, than the component $\eta c11$ due to the adjustment of the number of windings of the first output coils 23 in Example 1-2 illustrated in FIG. 11. Furthermore, from FIG. 14, it can also be seen that the effects of $\eta s9$ and $\eta s11$ in reducing the 15th-order component of the rotation angle error of the detecting rotor 3 are equal.

Therefore, since the effect in reducing the rotation angle error of Example 1-1 illustrated in FIG. 9 is greater than Example 1-2 illustrated in FIG. 11, and the options for possible adjustment of the rotation angle error are greater, then when Example 1-1 and Example 1-2 are compared, the adjustment of the number of windings according to Example 1-1 is desirable. Although the effect of reducing the rotation angle error based on Example 1-2 illustrated in FIG. 11 is smaller than in Example 1-1, if the rotation angle error that is to be reduced is smaller than the extent of error that can be reduced by Example 1-2, then Example 1-2 is adequate as an option for adjusting the rotation angle error, and hence the rotation angle error can also be reduced by adjustment of the number of windings based on Example 1-2 illustrated in FIG. 11. In this way, the options for adjustment of the conductive wires whereby the rotation angle error can be adjusted are increased, in the rotation angle detector as a whole, in both Example 1-1 and Example 1-2.

In a rotation angle detector 1 of this kind, since there are two or more different numbers of windings of the first output coils 23 which are wound about the teeth 27, then it is possible to change the amplitude of the component $\eta c$ based on adjustment of the number of windings of the first output coils 23, in the 15th-order component of the rotation angle error of the detecting rotor 3. Consequently, it is possible to increase the options that enable adjustment of the 15th-order component of the rotation angle error of the detecting rotor 3, in other words, the shaft angle multiplier component, and hence the rotation angle error of the detecting rotor 3 can be reduced effectively.

Furthermore, in Example 1-1 illustrated in FIG. 9 and Example 1-2 illustrated in FIG. 11, the spatial distribution before adjustment of the number of windings in the first output coils 23 and the second output coils 24 is tertiary, whereas the spatial distribution after adjustment of the number of windings in each of the first output coils 23 and the second output coils 24 has a three-turn rotational symmetry for groups of six teeth 27 arranged consecutively in the circumferential direction, and therefore a thirtieth-order component of the rotation angle error of the detecting rotor 3, in other words, a component of two times the shaft angle multiplier, does not occur. Consequently, it is possible to reduce the rotation angle error of the detecting rotor 3, without giving rise to a component of two times the shaft angle multiplier, due to the adjustment of the number of windings.

Depending on the phase of the 15th-order component η0 of the error in the reference state illustrated in FIG. 6, the number of windings A2+a of the first output coil 23 in Example 1-1 illustrated in FIG. 9 may be set to the number of windings A2-a (A1>A2-a, A1>A2>a>0), and the number of windings A1+a of the first output coils 23 in Example 1-2 illustrated in FIG. 11 may be set to the number of windings A1-a (A1-a>A2, A1>A2>a>0). Furthermore, the number of windings B1+b of the second output coils 24 in both Example 1-1 illustrated in FIG. 9 and Example 1-2 illustrated in FIG. 11 may be set to the number of windings B1-b (B1-b>B2, B1>b>0, B2=0).

In other words, if the number of windings of the first output coils 23 in the reference state includes Ai, which is an integer no less than 1, and Aj, which is an integer no less than 1 that is smaller than Ai, then it is possible to achieve an effect in reducing the rotation angle error of the detecting rotor 3, by adjusting the number of windings of the first output coils 23 in the reference state, either by winding first output coils 23 with the number of windings of Aj±a which is smaller than Ai (Ai>Aj±a, Ai>Aj>a>0, where a is an integer no less 1) about each of the teeth 27 where a first output coil 23 having the number of windings of Aj is wound in the reference state, or by winding first output coils 23 having the number of windings of Ai±a which is greater than Aj (Ai±a>Aj, Ai>Aj>a>0, where a is an integer no less than 1) about each of the teeth 27 where a first output coil 23 having the number of windings of Ai is wound in the reference state, and if the number of windings of the second output coils 24 in the reference state includes Bk, which is an integer no less than 1, and Bm=0, which is smaller than Bk, by adjusting the number of windings of the second output coils 24 in the reference state by winding second output coils 24 having the number of windings of Bk±b which is greater than Bm (Bk±b>Bm, Bk>b>0, Bm=0, where b is an integer no less than 1) about each of the teeth 27 where an second output coil 24 having the number of windings of Bk is wound in the reference state.

Furthermore, in the present embodiment, the 15th-order component of the rotation angle error which can be adjusted by one winding is 0.02°, at minimum, from FIG. 13. The 15th-order component η0 of the rotation angle error of the detecting rotor in the rotation angle detector of FIG. 6 is 0.2°, according to FIG. 13, and therefore the number of windings a of the first output coils 23 to be added or deleted by adjustment of the number of windings per tooth is a=1 to 10 times. The value of a/A1 when a=10 times is 10/460≅2%, and if a is an integer no less than 1 and a configuration is adopted in which the relationship a/A1≤2% is adopted, then it is possible to reduce the rotation angle error of the detecting rotor 3 by a smaller number of windings, and hence the work input involved in adjustment of the number of windings can be reduced. Furthermore, with regard to the number of windings b of the second output coils 24 which are added or deleted by adjustment of the number of windings per tooth, similarly, if b is an integer no less than 1 and a configuration is adopted in which the relationship b/B 1≤2% is adopted, then it is possible to reduce the rotation angle error of the detecting rotor 3 by a smaller number of windings, and hence the work input involved in adjustment of the number of windings can be reduced.

Second Embodiment

In the present embodiment, a state where the phase of the spatial distribution of the respective numbers of windings of the first and second output coils 23, 24 is staggered by an electrical angle of 10° with respect to the reference state illustrated in FIG. 6 is taken as the reference state before adjustment of the number of windings.

FIG. 15 is a table indicating the number of windings of the conductive wires of the excitation coils 22, the first output coils 23 and the second output coils 24 in a reference state which is the reference for adjustment of the number of windings according to the second embodiment of the invention. In the reference state, the conductive wires of the excitation coils 22 are wound in opposite winding directions in mutually adjacent teeth 27, and are wound C=40 times on all of the teeth 27.

Furthermore, the conductive wires of the first output coils 23 in the reference state are wound A1=453 times on each of the teeth 27 having tooth numbers 1, 7 and 13, A2=157 times on each of the teeth 27 having tooth numbers 3, 9 and 15, and A3=296 times on each of the teeth 27 having tooth numbers 5, 11 and 17. The conductive wires of the first output coils 23 wound about the teeth 27 having tooth numbers 1, 7 and 13 are each wound in the same direction. Furthermore, the conductive wires of the first output coils 23 wound about the teeth 27 having tooth numbers 3, 5, 9, 11, 15 and 17 are wound in the opposite direction to the direction of winding of the conductive wires of the first output coils 23 wound about the teeth 27 having tooth numbers 1, 7 and 13.

Furthermore, the conductive wires of the second output coils 24 in the reference state are wound B1=352 times on each of the teeth 27 having tooth numbers 2, 8 and 14, B2=80 times on each of the teeth 27 having tooth numbers 4, 10 and 16, and B3=432 times on each of the teeth 27 having tooth numbers 6, 12 and 18. The conductive wires of the second output coils 24 wound about the teeth 27 having tooth numbers 2, 4, 8, 10, 14 and 16 are wound in the same direction as the direction of winding of the conductive wires of the first output coils 23 wound about the teeth 27 having tooth numbers 1, 7 and 13. Furthermore, the conductive wires of the second output coils 24 wound about the teeth 27 having tooth numbers 6, 12 and 18 are wound in the opposite direction to the direction of winding of the conductive wires of the second output coils 24 wound about the teeth 27 having tooth numbers 2, 4, 8, 10, 14 and 16. The remainder of the configuration of the reference state illustrated in FIG. 15 is the same as the reference state illustrated in FIG. 6. In the reference state illustrated in FIG. 15, similarly to the reference state illustrated in FIG. 6, the spatial distribution of the number of windings of the first output coils 23 and the second output coils 24 is obtained by the sum of a function expressed by a sine wave of spatial order |M±N| and a function expressed by a sine wave of spatial order

|M−|M±N||. Furthermore, in the reference state illustrated in FIG. 15, the amplitude of the sine wave of spatial order |M±N| and the amplitude of the sine wave of spatial order |M−|M±N|| are equal.

In the present embodiment, Example 2-1 and Example 2-2 described below are given as specific examples of the numbers of windings of the excitation coils 22, first output coils 23 and second output coils 24 in FIG. 4.

FIG. 16 is a table showing the number of windings of the conductive wires of the excitation coils 22, the first output coils 23 and the second output coils 24 in FIG. 4, according to Example 2-1. As illustrated in FIG. 16, Example 2-1 differs from the reference state illustrated in FIG. 15 in that the conductive wires of the first output coils 23 are wound A2+a=158 times (a=1) about each of the teeth 27 having tooth numbers 3, 9 and 15, and in that the conductive wires of the second output coils 24 are wound B1+b=353 times (b=1) about each of the teeth 27 having tooth numbers 2, 8 and 14. Here, the following relationships are established: A1 >A2+a, A3>A2+a, A1>A3>A2>a>0, B1+b>B2, B3>B1+b, B3>B1>B2>b>0. In this way, in Example 2-1, the number of windings A2 of the first output coils 23 and the number of windings B1 of the second output coils 24 in the reference state illustrated in FIG. 15 are adjusted to numbers of windings that differ from the reference state illustrated in FIG. 15.

In other words, in Example 2-1 illustrated in FIG. 16, if A1=Ai, and A2=Aj, then first output coils 23 having the number of windings Aj+a which is smaller than Ai (Ai>Aj+a) are wound about each of the teeth 27 where first output coils 23 having the number of windings Aj are wound in the reference state. Furthermore, in Example 2-1 illustrated in FIG. 16, if B3=Bk, and B1=Bm, then second output coils 24 having the number of windings Bm+b which is smaller than Bk (Bk>Bm+b) are wound about the teeth 27 where second output coils 23 having the number of windings Bm are wound in the reference state. Incidentally, Ai, Aj, Bk, Bm, a and b are integers no less than 1, and the following relationships are established: Ai>Aj>a>0, Bk>Bm>b>0. The remaining configuration of Example 2-1 is the same as the reference state illustrated in FIG. 15. Furthermore, the configuration wherein the first output coil 23 is provided on the tooth 27 having tooth number 3 in Example 2-1 is the same as the configuration illustrated in FIG. 10.

Moreover, FIG. 17 is a table showing the number of windings of the conductive wires of the excitation coils 22, the first output coils 23 and the second output coils 24 in FIG. 4, according to Example 2-2. As illustrated in FIG. 17, Example 2-2 differs from the reference state illustrated in FIG. 15 in that the conductive wires of the first output coils 23 are wound A1+a=454 times (a=1) about each of the teeth 27 having tooth numbers 1, 7 and 13, and in that the conductive wires of the second output coils 24 are wound B1+b=353 times (b=1) about each of the teeth 27 having tooth numbers 2, 8 and 14. Here, the following relationships are established: A1+a>A2, A1+a>A3, A1>A3>A2>a>0, B1+b>B2, B3>B1+b, B3>B1>B2>b>0. In this way, in Example 2-2, the number of windings A1 of the first output coils 23 in the reference state illustrated in FIG. 15 and the number of windings B1 of the second output coils 24 in the reference state illustrated in FIG. 15 are adjusted to numbers of windings that differ from the reference state.

In other words, in Example 2-2 illustrated in FIG. 17, if A1=Ai, and A2=Aj, then first output coils 23 having the number of windings Ai+a which is smaller than Aj (Ai+a>Aj) are wound about each of the teeth 27 where first output coils 23 having the number of windings Ai are wound in the reference state. Furthermore, in Example 2-2 illustrated in FIG. 17, if B3=Bk, and B1=Bm, then second output coils 24 having the number of windings Bm+b which is smaller than Bk (Bk>Bm+b) are wound about the teeth 27 where second output coils 23 having the number of windings Bm are wound in the reference state. Incidentally, Ai, Aj, Bk, Bm, a and b are integers no less than 1, and the following relationships are established: Ai>Aj>a>0, Bk>Bm>b>0. The remaining configuration of Example 2-2 is the same as the reference state illustrated in FIG. 15. Furthermore, the configuration wherein the first output coil 23 is provided on the tooth 27 having tooth number 1 in Example 2-2 is the same as the configuration illustrated in FIG. 12.

A phasor diagram comparing the values η0, η16 and η17 of the 15th-order component of the rotation angle error of the detecting rotor 3 in the reference state illustrated in FIG. 15, Example 2-1 illustrated in FIG. 16 and Example 2-2 illustrated in FIG. 17 is the same as that illustrated in FIG. 14, if η9 is substituted with η16, ηc9 is substituted with ηc16, ηs9 is substituted with ηs16, η11 is substituted with η17, ηc11 is substituted with ηc17, and ηs11 is substituted with ηs17.

Therefore, it can be seen that the component ηc16 due to the adjustment of the number of windings of the first output coils 23 in Example 2-1 illustrated in FIG. 16 has a greater effect in reducing the value η0 of the 15th-order component of the rotation angle error of the detecting rotor 3 in the reference state illustrated in FIG. 15, than the component ηc17 due to the adjustment of the number of windings of the first output coils 23 in Example 2-2 illustrated in FIG. 17. Furthermore, it can also be seen that the effects of ηs16 and ηs17 in reducing the 15th-order component of the rotation angle error of the detecting rotor 3 are equal.

In this way, since the effect in reducing the rotation angle error of Example 2-1 illustrated in FIG. 16 is greater than Example 2-2 illustrated in FIG. 17, and the options for possible adjustment of the rotation angle error are greater, then when Example 2-1 and Example 2-2 are compared, the adjustment of the number of windings according to Example 2-1 is desirable. Although the effect of reducing the rotation angle error based on Example 2-2 illustrated in FIG. 17 is smaller than in Example 2-1, if the rotation angle error that is to be reduced is small, then Example 2-2 is adequate as an option for adjusting the rotation angle error, and hence the rotation angle error can also be reduced by adjustment of the number of windings based on Example 2-2 illustrated in FIG. 17. In this way, the options for adjustment of the conductive wires that enable adjustment of the rotation angle error are increased, in the rotation angle detector as a whole, in both Example 2-1 and Example 2-2.

Furthermore, even in the case of Example 2-1 and Example 2-2 in which the number of windings is adjusted with reference to a reference state in which the phase of the spatial distribution of the numbers of windings of the first and second output coils 23, 24 is staggered by an electrical angle of 10° with respect to the reference state illustrated in FIG. 6, it is still possible to increase the options that enable adjustment of the 15th-order component of the rotation angle error of the detecting rotor 3, in other words, the shaft angle multiplier component, and hence the rotation angle error of the detecting rotor 3 can be reduced effectively.

Furthermore, in Example 2-1 illustrated in FIG. 16 and Example 2-2 illustrated in FIG. 17, the spatial distribution before adjustment of the number of windings in the first output coils 23 and the second output coils 24 is tertiary, whereas the spatial distribution after adjustment of the number of windings in each of the first output coils 23 and the second output coils 24 has a three-turn rotational symmetry for groups of six teeth 27 arranged consecutively in the circumferential direction, and therefore a thirtieth-order component of the rotation angle error of the detecting rotor 3, in order words, a component of two times the shaft angle multiplier, does not occur. Consequently, it is possible to reduce the rotation angle error of the detecting rotor 3, without giving rise to a component of two times the shaft angle multiplier, due to the adjustment of the number of windings.

Depending on the phase of the 15th-order component η0 of the error in the reference state illustrated in FIG. 15, the number of windings A2+a of the first output coils 23 in Example 2-1 illustrated in FIG. 16 may be set to the number of windings A2−a (A1>A2−a, A3>A2−a, A1>A3>A2>a>0), and the number of windings A1+a of the first output coils 23 in Example 2-2 illustrated in FIG. 17 may be set to the number of windings A1-a (A1-a>A2, A1-a>A3, A1>A3>A2>a>0). Furthermore, the number of windings B1+b of the second output coils 24 in both Example 2-1 illustrated in FIG. 16 and Example 2-2 illustrated in FIG. 17 may be set to the number of windings B1-b (B1-b>B2, B3>B1-b, B3>B1>B2>b>0). Furthermore, the number of windings B1+b of the second output coils 24 in both Example 2-1 illustrated in FIG. 16 and Example 2-2 illustrated in FIG. 17 may be set to the number of windings B1, and the number of windings B3 may be set to the number of windings B3±b (B3±b>B1, B3>B1>B2>b>0).

In other words, if the number of windings of the first output coils 23 in the reference state includes Ai, which is an integer no less than 1, and Aj, which is an integer no less than 1 that is smaller than Ai, then it is possible to achieve an effect in reducing the rotation angle error of the detecting rotor 3, by adjusting the number of windings of the first output coils 23 in the reference state, either by winding first output coils 23 with the number of windings of Aj±a which is smaller than Ai (Ai>Aj±a, Ai>Aj>a>0, where a is an integer no less 1) about each of the teeth 27 where a first output coil 23 having the number of windings of Aj is wound in the reference state, or by winding first output coils 23 having the number of windings of Ai±a which is greater than Aj (Ai±a>Aj, Ai>Aj>a>0, where a is an integer no less than 1) about each of the teeth 27 where a first output coil 23 having the number of windings of Ai is wound in the reference state, and if the number of windings of the second output coils 24 in the reference state includes Bk, which is an integer no less than 1, and Bm which is an integer no less than 1 and which is smaller than Bk, by adjusting the number of windings of the second output coils 24 in the reference state by winding second output coils 24 having the number of windings of Bm±b which is smaller than Bk (Bk>Bm±b, Bk>Bm>b>0, where b is an integer no less than 1) about each of the teeth 27 where a second output coil 24 having the number of windings of Bm is wound in the reference state, or by winding second output coils 24 having the number of windings of Bk±b which is greater than Bm (Bk±b>Bm, Bk>Bm>b>0, where b is an integer no less than 1) about each of the teeth 27 where a second output coil 24 having the number of windings of Bk is wound in the reference state.

Furthermore, similarly to the first embodiment, if the number of windings a of the first output coils 23 which are added or deleted in adjustment of the number of windings per tooth is an integer no less than 1 and a configuration is adopted in which the relationship a/A1≤2% is adopted, then it is possible to reduce the rotation angle error of the detecting rotor 3 by a smaller number of windings, and hence the work input involved in adjustment of the numbers of windings can be reduced. Furthermore, with regard to the number of windings b of the second output coils 24 which are added or deleted in adjustment of the number of windings per tooth, similarly, if b is an integer no less than 1 and a configuration is adopted in which the relationship b/B3≤2% is adopted, then it is possible to reduce the rotation angle error of the detecting rotor 3 by a smaller number of windings, and hence the work input involved in adjustment of the numbers of windings can be reduced.

Third Embodiment

Figure 18:
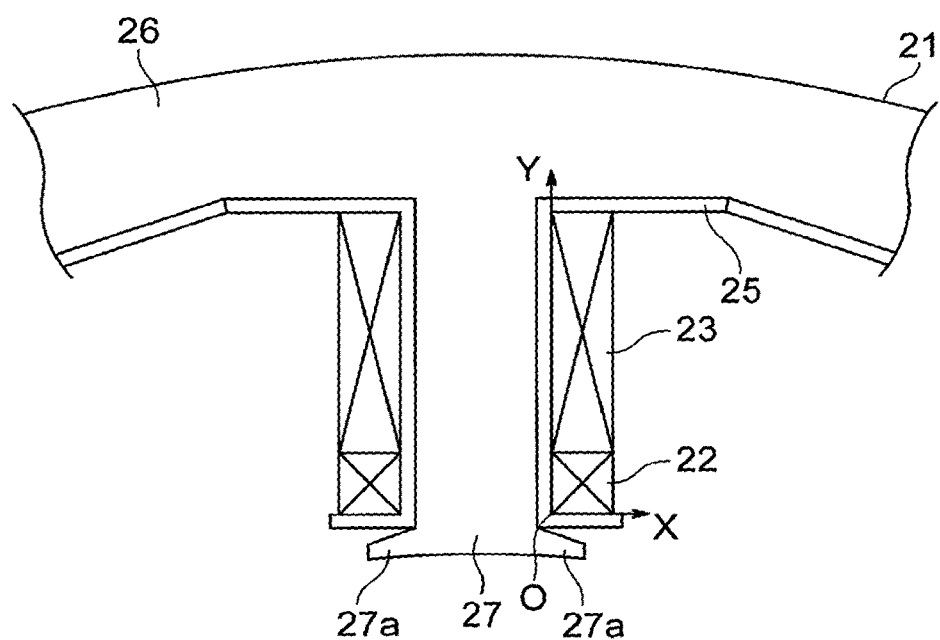
FIG. 18 is an enlarged drawing showing the principal part of a rotation angle detector according to a third embodiment of this invention.

FIG. 18 is an enlarged drawing showing the principal part of a rotation angle detector 1 according to a third embodiment of this invention. FIG. 18 is a diagram showing a state where an excitation coil 22 and a first output coil 23 are provided on a tooth 27. In the third embodiment, the positional relationship of the first and second output coils 23, 24 and the excitation coil 22 differs from the first and second embodiments.

In other words, the excitation coil 22 and the first output coil 23 provided on the same tooth 27 are aligned in the radial direction of the detecting rotor 3. Furthermore, the excitation coil 22 is provided at a position nearer to the detecting rotor 3 than the first output coil 23 in the radial direction of the detecting rotor 3. In other words, the conductive wire of the excitation coil 22 is wound about the front end portion of the tooth 27 near the detecting rotor 3, and the conductive wire of the first output coil 23 is wound about the portion of the tooth 27 that is nearer to the core back 26 than the excitation coil 22.

The first output coils 23 provided on the other teeth 27 are similarly wound to the outside of the excitation coil 22 in the radial direction of the detecting rotor 3. Furthermore, the second output coils 24 provided on each of the teeth 27 are similarly wound to the outside of the excitation coil 22 in the radial direction of the detecting rotor 3. The remaining configuration is similar to the first embodiment.

Here, the distribution of the interlinkage magnetic flux in the region of the excitation coil 22 and the first output coil 23 which are wound about the tooth 27 in FIG. 18 is derived by calculation. In the third embodiment, the distribution of the interlinkage magnetic flux in the region of the excitation coils 22 and the second output coils 24 is similar to the case of the first output coils 23.

Figure 19:
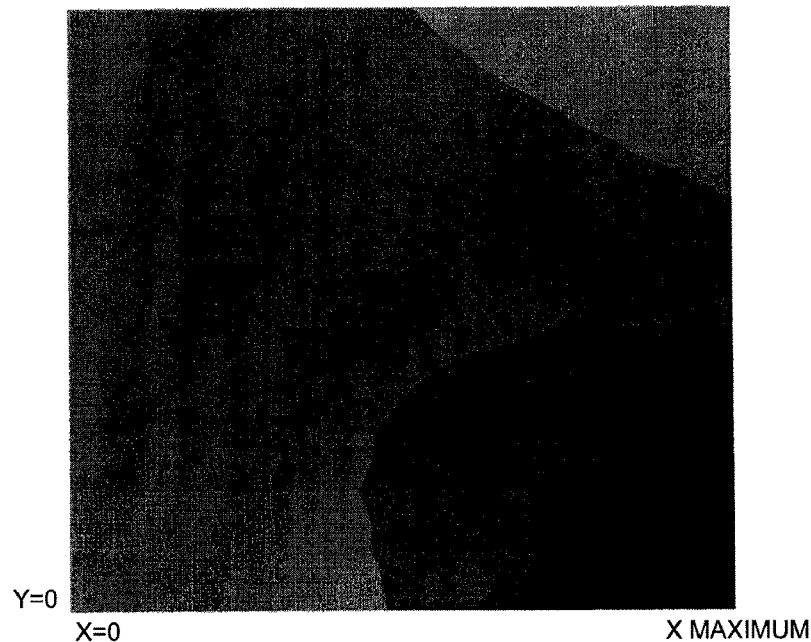
FIG. 19 is an enlarged diagram illustrating the distribution of the interlinkage magnetic flux per winding in the region of the excitation coil and the first output coil in FIG. 18.

FIG. 19 is an enlarged diagram illustrating the distribution of the interlinkage magnetic flux per winding in the region of the excitation coil 22 and the first output coil 23 in FIG. 18. In FIG. 19, the interlinkage magnetic flux distribution per winding is calculated by setting the point of origin O of the XY coordinates illustrated in FIG. 18 to the position nearest to the front end portion of the tooth 27 and nearest to the tooth 27 in the circumferential direction in the region of the excitation coil 22 and the first output coil 23 in FIG. 18. From FIG. 19, it can be seen that in the portion of the region of the excitation coil 22 and the first output coil 23 which is near the tooth 27 in the circumferential direction, the change, in the circumferential direction, of the interlinkage magnetic flux per winding is smaller than in FIG. 8.

In the present embodiment, Example 3-1 which has the same numbers of windings as Example 1-1 illustrated in FIG. 9 and Example 3-2 which has the same numbers of windings as Example 1-2 are given as specific examples of the numbers of windings of the excitation coils 22, the first output coils 23 and the second output coils 24.

Figure 20:
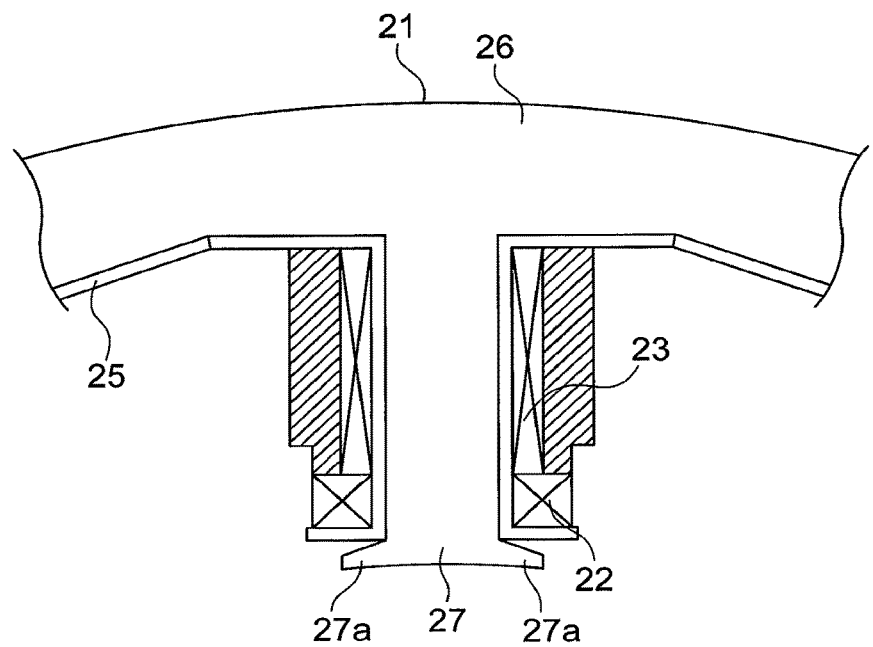
FIG. 20 is an enlarged diagram showing a state where an excitation coil and a first output coil according to the third embodiment of the invention are provided on the tooth having tooth number 3, with the number of windings in Example 3-1.

FIG. 20 is an enlarged diagram showing a state where the excitation coil 22 and the first output coil 23 according to the third embodiment of the invention are provided on the tooth 27 having tooth number 3, with the numbers of windings in Example 3-1. In FIG. 20, the region for arranging conductive wire that is wound additionally a=1 times in order to adjust the number of windings in the first output coil 23 is indicated by the diagonal hatching. The first output coil 23 is provided in a portion of the teeth 27 located at a position further from the detecting rotor 3 than the excitation coil 22 in the radial direction of the detecting rotor 3, and the number of windings of the first output coil 23 wound about the tooth 27 having tooth number 3 is the smallest number of windings among the numbers of windings of the plurality of first output coils 23. Therefore, in the first output coil 23 which is wound about the tooth 27 with the smallest number of windings, as illustrated in FIG. 20, it is possible to achieve a broad region in the slot for arranging additional conductive wires for adjustment of the number of windings. Therefore, the range of the distribution of the interlinkage magnetic flux is large, and hence the range in which the number of windings can be adjusted in one tooth 27 is large and the options for adjustment of the rotation angle error are increased.

Figures 21, 22:
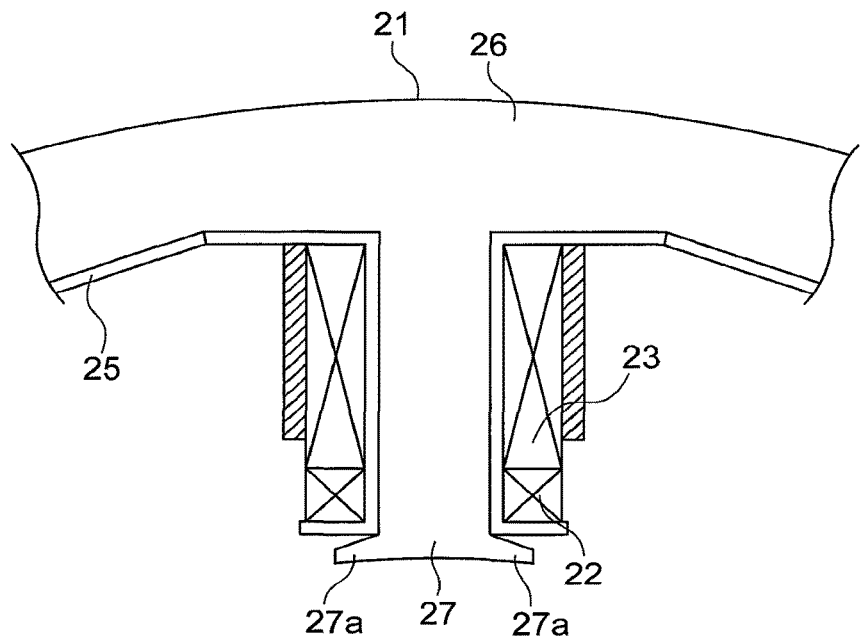
FIG. 21 is an enlarged diagram showing a state where an excitation coil and a first output coil according to the third embodiment of the invention are provided on the tooth having tooth number 1, with the number of windings in Example 3-2.
FIG. 22 is a table showing the number of windings of the conductive wires of the excitation coils, the first output coils and the second output coils in a fourth embodiment of this invention.

FIG. 21 is an enlarged diagram showing a state where the excitation coil 22 and the first output coil 23 according to the third embodiment of the invention are provided on the tooth 27 having tooth number 1, with the number of windings in Example 3-2. In FIG. 21, similarly to FIG. 20, the region for arranging conductive wire that is wound additionally a=1 times in order to adjust the number of windings in the first output coil 23 is indicated by the diagonal hatching. The number of windings of the first output coil 23 wound about the tooth 27 having tooth number 1 is the largest number of windings among the numbers of windings of the plurality of first output coils 23. Therefore, in the first output coil 23 which is wound about the tooth 27 with the largest number of windings, the conductive wire that is added for adjustment of the number of windings is arranged in the diagonally hatched portion in FIG. 21. In this case, as illustrated in FIG. 21, the region in the slot for arranging conductive wire that is added for adjustment of the number of windings is more restricted than in FIG. 20, and the range of distribution of the interlinkage magnetic flux illustrated in FIG. 19 is narrower than in the case of FIG. 20. Consequently, in FIG. 21, the range of possible adjustment of the number of windings in one tooth 27 is narrower than in FIG. 20.

The 15th-order component of the rotation angle error of the detecting rotor 3 in Example 3-1 displays the same variation as the solid line in FIG. 13 in accordance with the angle of rotation of the detecting rotor 3, and the 15th-order component of the rotation angle error of the detecting rotor 3 in Example 3-2 displays the same variation as the dashed line in FIG. 13 in accordance with the rotation angle of the detecting rotor 3. Therefore, it can be seen that the amount of reduction of the 15th-order component of the rotation angle error of the detecting rotor 3 with respect to the reference state illustrated in FIG. 6 is greater in the case of Example 3-1 than in Example 3-2.

Furthermore, if the components based on the adjustment of the number of windings of the first output coils 23, in the 15th-order component of the rotation angle error of the detecting rotor 3 in each of Example 3-1 and Example 3-2, are taken respectively to be $\eta c20$ and $\eta c21$, the components thereof due to adjustment of the number of windings of the second output coils 24 are taken respectively to be $\eta s20$ and $\eta s21$, and the values of $\eta c20$, $\eta c21$, $\eta s20$ and $\eta s21$ are depicted on a phasor diagram, then $\eta c20$ and $\eta c21$ are the same as $\eta c9$ and $\eta c11$ in FIG. 14, and $\eta s20$ and $\eta s21$ are the same as $\eta s9$ and $\eta s11$ in FIG. 14. Therefore, it can be seen that $\eta c20$ has a greater effect in reducing the rotation angle error than $\eta c21$, and the effect of reducing the rotation angle error according to Example 3-1 is greater than in Example 3-2.

In this way, by making the numbers of windings of the first output coils 23 wound about the teeth 27 different with respect to the detecting stator 2 in which either one of the first and second output coils 23, 24 and the excitation coil 22 are arranged in alignment in the radial direction of the detecting rotor 3, then it is possible to change the amplitude of the component $\eta c$ due to adjustment of the number of windings of the first output coil 23, in the 15th-order component of the rotation angle error of the detecting rotor 3, and therefore the options enabling reduction of the 15th-order component of the rotation angle error of the detecting rotor 3, in other words, the shaft angle multiplier component, can be increased and the rotation angle error of the detecting rotor 3 can be reduced by fine adjustment.

Fourth Embodiment

FIG. 22 is a table showing the number of windings of the conductive wires of the excitation coils 22, the first output coils 23 and the second output coils 24 in a fourth embodiment of this invention. FIG. 22 shows the number of windings of the conductive wires of the coils 22, 23, 24 in a state where the excitation coils 22, first output coils 23 and second output coils 24 are respectively provided on the teeth 27 in the positional relationship illustrated in FIG. 4. As illustrated in FIG. 22, the present embodiment differs from the reference state illustrated in FIG. 6 in that the conductive wires of the first output coils 23 are wound A2+a=231 times (a=1) about each of the teeth 27 having tooth numbers 3, 5, 9, 11, 15 and 17. Still, the relationships A1>A2+a, A1>A2>a>0 are established. In this way, in the present embodiment, only the number of windings A2 of the first output coils 23 is adjusted to the number of windings that is different to the reference state illustrated in FIG. 6.

In other words, in the present embodiment, if A1=Ai and A2=Aj, then first output coils 23 having the number of windings Aj+a which is smaller than Ai (Ai>Aj+a) are wound about each of the teeth 27 where first output coils 23 having the number of windings Aj are wound in the reference state. Here, Ai, Aj and a are integers no less than 1, and the relationship Ai>Aj>a>0 is established. The remaining configuration of the present embodiment is the same as the reference state illustrated in FIG. 6.

Figures 23, 24:
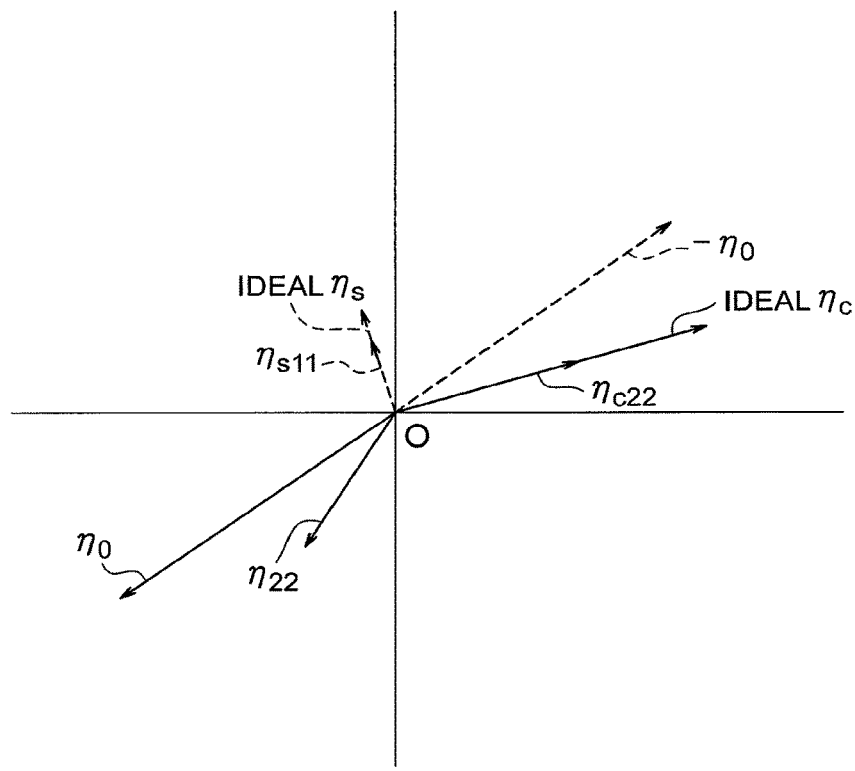
FIG. 23 is a phasor diagram comparing the 15th-order component of the rotation angle error of the detecting rotor in the reference state illustrated in FIG. 6 and the 15th-order component of the rotation angle error of the detecting rotor in the fourth embodiment illustrated in FIG. 22.
FIG. 24 is a table showing the number of windings of the conductive wires of the excitation coils, the first output coils and the second output coils in a fifth embodiment of this invention.

FIG. 23 is a phasor diagram comparing the value $\eta 0$ of the 15th-order component of the rotation angle error of the detecting rotor 3 in the reference state illustrated in FIG. 6 and the value $\eta 22$ of the 15th-order component of the rotation angle error of the detecting rotor 3 in the fourth embodiment illustrated in FIG. 22. $\eta 22$ is expressed by the sum of the 15th-order component $\eta 0$ of the error in the reference state illustrated in FIG. 6, and the component $\eta c22$ due to adjustment of the number of windings of the first output coils 23, in the 15th-order component of the error illustrated in FIG. 22 (in other words, $\eta 22=\eta 0+\eta c22$). In FIG. 23, $\eta c22$ is depicted by a solid arrow, together with $\eta 0$ and $\eta 22$. Furthermore, although the number of windings of the second output coils 24 illustrated in FIG. 22 is not adjusted, in FIG. 23, the component $\eta s11$ due to adjustment of the number of windings of the second output coils 24 in Example 1-2 illustrated in FIG. 11 is depicted by the dotted arrow.

As illustrated in FIG. 23, it can be seen that the value $\eta 0$ of the 15th-order component of the rotation angle error of the detecting rotor 3 in the reference state illustrated in FIG. 6 is reduced only by the component $\eta c22$ due to the adjustment of the number of windings of the first output coils 23 illustrated in FIG. 22. However, in the present embodiment, there is no component ηs11 due to adjustment of the number of windings of the second output coils 24, and therefore the effect of reducing the angle error is correspondingly smaller than in the first to third embodiments.

Even if, in this way, only the number of windings of the first output coils 23 is adjusted, among the first and second output coils 23, 24 it is still possible to change the amplitude of the component ηc due to adjustment of the number of windings of the first output coils 23, in the 15th-order component of rotation angle error of detecting rotor 3, and therefore it is possible to increase the options that enable adjustment of the 15th-order component of the rotation angle error of the detecting rotor 3, in other words, the shaft angle multiplier component, and hence the rotation angle error of the detecting rotor 3 can be reduced effectively.

Furthermore, since the number of windings is only adjusted in the first output coils 23, then the number of teeth 27 subjected to adjustment of the number of windings can be reduced, and the efficiency of the winding work can be improved.

Moreover, since adjustment is made to the number of windings of the first output coil 23 having the smallest number of windings, among the numbers of windings of the plurality of first output coils 23 in the reference state before adjustment of the number of windings, then it is possible to improve the efficiency of the winding work, as well as reducing the angle error. Furthermore, since the number of windings of the first output coils 23 on the other teeth 27 is set to a maximum, then it is possible to improve the transformation ratio, which is given by (amplitude of voltage detected by first output coils 23)/(amplitude of voltage detected by excitation coils 22), and the angle error can be reduced.

Depending on the phase of the 15th-order component η0 of the error in the reference state illustrated in FIG. 6, the number of windings A2+a of the first output coils 23 in the fourth embodiment illustrated in FIG. 22 can be set to the number of windings A2−a (A1>A2−a, A1>A2>a>0, where a is an integer no less than 1). Furthermore, the number of windings A1 and A2+a of the first output coils 23 in the fourth embodiment illustrated in FIG. 22 may be respectively set to the number of windings A1±a (A1±2>A2, A1>A2>a>0, where a is an integer no less than 1) and to A2.

In other words, if the number of windings of the first output coils 23 in the reference state includes Ai, which is an integer no less than 1, and Aj, which is an integer no less than 1 that is smaller than Ai, it is possible to obtain an effect of reducing the rotation angle error of the detecting rotor 3, by adjusting the number of windings of the first output coils 23 in the reference state, either by winding first output coils 23 having the number of windings of Aj±a which is smaller than Ai (Ai>Aj±a, Ai>Aj>a>0, where a is an integer no less than 1) about each of the teeth 27 where first output coils 23 having the number of windings of Aj are wound in the reference state, or by winding first output coils 23 having the number of windings of Ai±a which is greater than Aj (Ai±a>Aj, Ai>Aj>a>0, where a is an integer no less than 1) about each of the teeth 27 where first output coils 23 having the number of windings of Ai are wound in the reference state, while keeping the number of windings of the second output coils the same as in the reference state illustrated in FIG. 6.

Furthermore, similarly to the first embodiment, if the number of windings a of the first output coils 23 which are added or deleted by adjustment of the number of windings per tooth is an integer no less than 1 and a configuration is adopted in which the relationship a/A1≤2% is adopted, then it is possible to reduce the rotation angle error of the detecting rotor 3 by a smaller number of windings, and hence the work input involved in adjustment of the number of windings can be reduced.

Furthermore, in the example described above, the positional relationship between the excitation coils 22, the first output coils 23 and the second output coils 24 is the positional relationship in FIG. 4, but similar effects can also be obtained if the positional relationship between the excitation coils 22, the first output coils 23 and the second output coils 24 is that illustrated in FIG. 18.

Moreover, needless to say, similar effects are also displayed if the first output coils 23 and the second output coils 24 are interchanged in the example described above and the number of windings is adjusted in the second output coils 24.

Fifth Embodiment

FIG. 24 is a table showing the number of windings of the conductive wires of the excitation coils 22, the first output coils 23 and the second output coils 24 in a fifth embodiment of this invention. FIG. 24 shows the number of windings of the conductive wires of the coils 22, 23, 24 in a state where the excitation coils 22, first output coils 23 and second output coils 24 are respectively provided on the teeth 27 in the positional relationship illustrated in FIG. 4. As illustrated in FIG. 24, the present embodiment differs from the reference state illustrated in FIG. 6 in that the conductive wires of the second output coils 24 are wound B2+b=1 times (B2=0, b=1) about each of the teeth 27 having tooth numbers 4, 10 and 16. Still, the relationships B1>B2+b, B1>b>0, B2=0 are established. In this way, in the present embodiment, only the number of windings B2 of the second output coils 24 in the reference state illustrated in FIG. 6 is adjusted to the number of windings that is different to the reference state illustrated in FIG. 6.

In other words, in the present embodiment, if B1=Bk and B2=Bm=0, then second output coils 24 having the number of windings Bm+b=b (Bk>b) which is smaller than Bk (Bk>b) are wound about each of the teeth 27 where second output coils 24 having the number of windings of Bm are wound in the reference state. Here, Bk and b are integers no less than 1, and the relationship Bk>b>0 is established. The remaining configuration of the present embodiment is the same as in the reference state illustrated in FIG. 6.

Figures 25, 26:
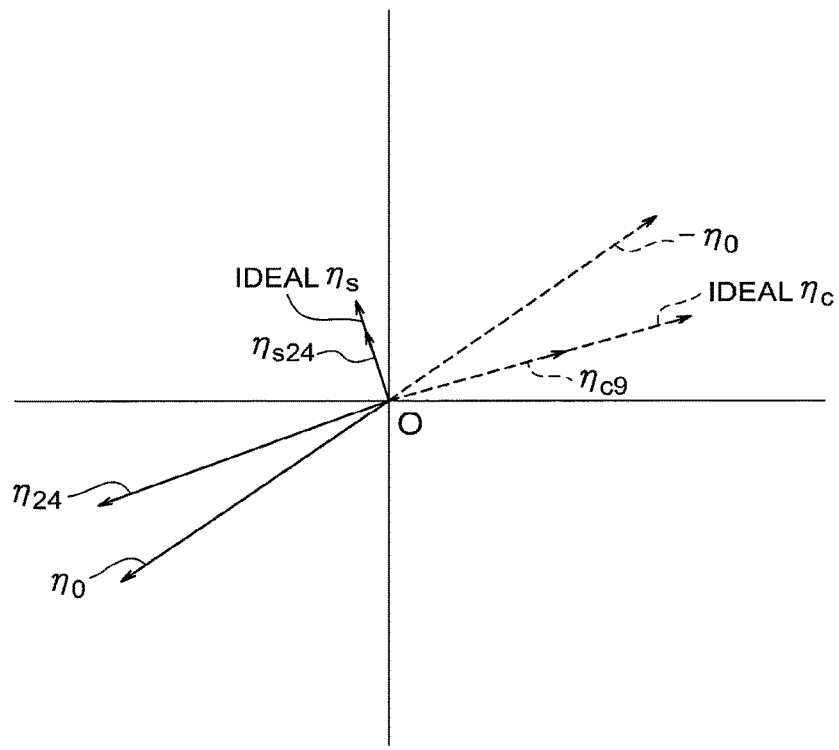
FIG. 25 is a phasor diagram comparing the 15th-order component of the rotation angle error of the detecting rotor in the reference state illustrated in FIG. 6 and the 15th-order component of the rotation angle error of the detecting rotor in the fifth embodiment illustrated in FIG. 24.
FIG. 26 is a table showing the number of windings of the conductive wires of the excitation coils, the first output coils and the second output coils in a sixth embodiment of this invention.

FIG. 25 is a phasor diagram comparing the value ηO of the 15th-order component of rotation angle error of detecting rotor 3 in the reference state illustrated in FIG. 6 and the value η24 of the 15th-order component of rotation angle error of detecting rotor 3 in the fifth embodiment illustrated in FIG. 24. η24 is expressed by the sum of the 15th-order component η0 of the error in the reference state illustrated in FIG. 6, and the component ηs24 due to adjustment of the number of windings of the second output coils 24, in the 15th-order component of the error illustrated in FIG. 24 (in other words, η24=η0+ηs24). In FIG. 23, ηs24 is depicted by a solid arrow, together with η0 and η24. Furthermore, although the number of windings of the first output coils 23 illustrated in FIG. 24 is not adjusted, in FIG. 25, the component ηc9 due to adjustment of the number of windings of the first output coils 23 in Example 1-1 illustrated in FIG. 9 is depicted by the dotted arrow.

As illustrated in FIG. 25, it can be seen that the value η0 of the 15th-order component of rotation angle error of detecting rotor 3 in the reference state illustrated in FIG. 6 is reduced only by the component 1624 due to the adjustment of the number of windings of the second output coils 24 illustrated in FIG. 24. However, in the present embodiment, there is no component ηc9 due to adjustment of the number of windings of the first output coils 23, and therefore the effect of reducing the angle error is correspondingly smaller than in the first to third embodiments.

Even if, in this way, only the number of windings of the second output coils 24 is adjusted, among the first and second output coils 23, 24, it is possible to change the amplitude of the component ηs due to adjustment of the number of windings of the second output coils 24, in the 15th-order component of rotation angle error of detecting rotor 3, and therefore it is possible to increase the options that enable adjustment of the 15th-order component of the rotation angle error of the detecting rotor 3, in other words, the shaft angle multiplier component, and the rotation angle error of the detecting rotor 3 can be reduced greatly.

Furthermore, since the number of windings is only adjusted in the second output coils 24, then the number of teeth 27 subjected to adjustment of the number of windings can be reduced, and the efficiency of the winding work can be improved.

Moreover, since adjustment is made to the number of windings of the second output coil 24 having the smallest number, which is 0, of windings, among the numbers of windings of the plurality of second output coils 24 in the reference state before adjustment of the number of windings, then it is possible to improve the efficiency of the winding work, as well as reducing the angular error. Furthermore, since the number of windings of the second output coils 24 on the other teeth 27 is set to a maximum, then it is possible to improve the transformation ratio, which is given by (amplitude of voltage detected by second output coils 24)/(amplitude of voltage detected by excitation coils 22), and the angle error can be reduced.

Depending on the phase of the value η0 of the 15th-order component of the error in the reference state illustrated in FIG. 6, the number of windings B1 and B2+b of the second output coils 24 in the fifth embodiment illustrated in FIG. 24 may be set respectively to the number of windings B1±b (B1±b>B2, B1>b>0, where b is an integer no less than 1) and to B2=0.

In other words, if the number of windings of the second output coils 24 in the reference state includes Bk, which is an integer no less than 1, and Bm=0, which is an integer smaller than Bk, it is possible to obtain an effect of reducing the rotation angle error of the detecting rotor 3, by adjusting the number of windings of the second output coils 24 in the reference state, either by winding second output coils 24 having the number of windings of Bm+b=b which is smaller than Bk (Bk>b>0, Bm=0, where b is an integer no less than 1) about each of the teeth 27 where second output coils 24 having the number of windings of Bm are wound in the reference state, or by winding second output coils 24 having the number of windings of Bk±b which is greater than Bm (Bk±b>Bm, Bk>b>0, Bm=1, where b is an integer no less than 1) about each of the teeth 27 where second output coils 24 having the number of windings of Bk are wound in the reference state, while keeping the number of windings of the first output coils 23 the same as in the reference state illustrated in FIG. 6.

Furthermore, similarly to the first embodiment, if the number of windings b of the second output coils 24 which are added or deleted by adjustment of the number of windings per tooth is an integer no less than 1 and a configuration is adopted in which the relationship b/B1≤2% is adopted, then it is possible to reduce the rotation angle error of the detecting rotor 3 by a smaller number of windings, and hence the work input involved in adjustment of the number of windings can be reduced.

Furthermore, in the example described above, the positional relationship between the excitation coils 22, the first output coils 23 and the second output coils 24 is the positional relationship in FIG. 4, but similar effects can also be obtained if the positional relationship between the excitation coils 22, the first output coils 23 and the second output coils 24 is that illustrated in FIG. 18.

Furthermore, if the number of windings of the first output coils 23 in the reference state includes Ai, which is an integer no less than 1, and Aj=0 which is smaller than Ai, it is possible to obtain an effect of reducing the rotation angle error of the detecting rotor 3, either by winding first output coils 23 having the number of windings of Aj±a=a which is smaller than Ai (Ai>a>0, Aj=0, where a is an integer no less than 1) about each of the teeth 27 where first output coils 23 having the number of windings of Aj are wound in the reference state, or by winding first output coils 23 having the number of windings of Ai±a which is greater than Aj (Ai±a>Aj, Ai>a>0, Aj=0, where a is an integer no less than 1) about each of the teeth 27 where first output coils 23 having the number of windings of Ai are wound in the reference state, while keeping the number of windings of the second output coils 24 the same as the reference state.

Sixth Embodiment

FIG. 26 is a table showing the number of windings of the conductive wires of the excitation coils 22, the first output coils 23 and the second output coils 24 in a sixth embodiment of this invention. FIG. 26 shows the number of windings of the conductive wires of the coils 22, 23, 24 in a state where the excitation coils 22, first output coils 23 and second output coils 24 are respectively provided on the teeth 27 in the positional relationship illustrated in FIG. 4. As illustrated in FIG. 26, the present embodiment differs from the reference state illustrated in FIG. 6 in that the conductive wires of the first output coils 23 are wound A1+a=461 times (a=1) about only the tooth 27 having tooth number 1. Still, the relationships A1+a>A2, A1>A2>a>0 are established. In this way, in the present embodiment, only the number of windings A1 of a portion of the first output coils 23 in the reference state illustrated in FIG. 6 is adjusted to the number of windings that is different to the reference state.

In other words, in the present embodiment, if A1=Ai and A2=Aj, then first output coils 23 having the number of windings Ai+a which is greater than Aj (Ai+a>Aj) are wound about only one tooth 27, of the plurality of teeth 27 where first output coils 23 having the number of windings Ai are wound in the reference state. Here, Ai, Aj and a are integers no less than 1, and the relationship Ai>Aj>a>0 is established. The remaining configuration of the present embodiment is the same as the reference state illustrated in FIG. 6.

Figure 27:
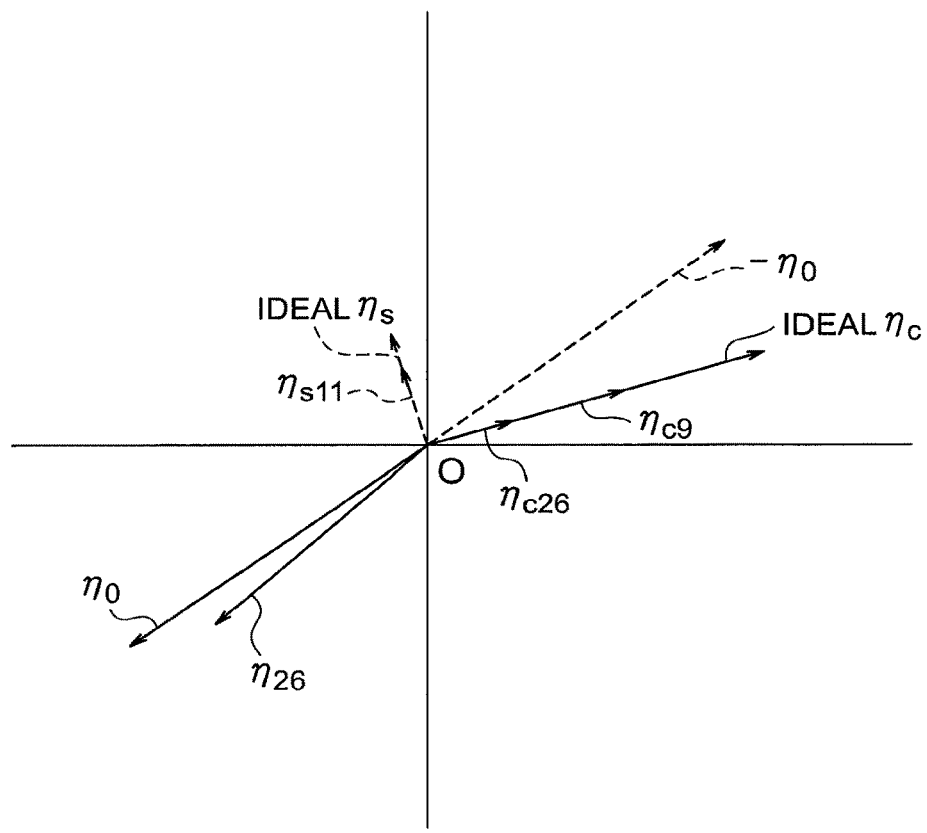
FIG. 27 is a phasor diagram comparing the 15th-order component of the rotation angle error of the detecting rotor in the reference state illustrated in FIG. 6 and the 15th-order component of the rotation angle error of the detecting rotor in the sixth embodiment illustrated in FIG. 26.

FIG. 27 is a phasor diagram comparing the value ηO of the 15th-order component of rotation angle error of detecting rotor 3 in the reference state illustrated in FIG. 6 and the value η26 of the 15th-order component of rotation angle error of detecting rotor 3 in the sixth embodiment illustrated in FIG. 26. η26 is expressed by the sum of the 15th-order component η0 of the error in the reference state illustrated in FIG. 6, and the component ηc26 due to adjustment of the number of windings of the first output coils 23, in the 15th-order component of the error illustrated in FIG. 26 (in other words, η26=η0+ηc26). In FIG. 27, ηc26 is depicted by a solid arrow, together with η0 and η26. Furthermore, although the number of windings of the second output coils 24 illustrated in FIG. 26 is not adjusted, in FIG. 27, the component ηs11 due to adjustment of the number of windings of the second output coils 24 in Example 1-2 illustrated in FIG. 11 is depicted by the dotted arrow.

As illustrated in FIG. 27, it can be seen that the value η0 of the 15th-order component of rotation angle error of detecting rotor 3 in the reference state illustrated in FIG. 6 is reduced only by the component ηc26 due to the adjustment of the number of windings of the first output coils 23 illustrated in FIG. 26. However, in the present embodiment, since there is no component ηs11 due to the adjustment of the number of windings of the second output coils 24, and since the component ηc26 due to the adjustment of the number of windings of the first output coils 23 is smaller than the component ηc9 due to the adjustment of the number of windings of the first output coils 23 in Example 1-1 illustrated in FIG. 9 (in this example, ηc26 is ⅓ of ηc/9), then the effect of reducing the angle error is correspondingly smaller than the first to third embodiments.

Even if, in this way, only the number of windings of a portion of the first output coils 23 is adjusted, among the first and second output coils 23, 24, it is possible to change the amplitude of the component ηc due to adjustment of the number of windings of the first output coils 23, in the 15th-order component of rotation angle error of detecting rotor 3, and therefore it is possible to increase the options that enable adjustment of the 15th-order component of the rotation angle error of the detecting rotor 3, in other words, the shaft angle multiplier component, and the rotation angle error of the detecting rotor 3 can be reduced by fine adjustment. Furthermore, since the number of windings is only adjusted in the first output coils 23, then the number of teeth 27 subjected to adjustment of the number of windings can be reduced, and the efficiency of the winding work can be improved.

Depending on the phase of the 15th-order component η0 of the error in the reference state illustrated in FIG. 6, the number of windings A1+a of the first output coils 23 in the sixth embodiment illustrated in FIG. 22 can be set to the number of windings A1−a (A1−a>A2, A1>A2>a>0, where a is an integer no less than 1). Furthermore, it is also possible to set the number of windings A1+a of the first output coils 23 in the sixth embodiment illustrated in FIG. 26 to A1, and to set only the number of windings of any one first output coil 23 of the plurality of first output coils 23 having the number of windings of A2, to A2±a (A1>A2±a, A1>A2>a>0, where a is an integer no less than 1).

In other words, if the number of windings of the first output coils 23 in the reference state includes Ai, which is an integer no less than 1, and Aj, which is an integer no less than 1 which is smaller than Ai, it is possible to obtain an effect of reducing the rotation angle error of the detecting rotor 3, by adjusting the number of windings of the first output coils 23 in the reference state, either by winding first output coils 23 having the number of windings of Aj±a which is smaller than Ai (Ai>Aj±a, Ai>Aj>a>0, where a is an integer no less than 1) about only any one of the plurality of teeth 27 where first output coils 23 having the number of windings of Aj are wound in the reference state, or by winding first output coils 23 having the number of windings of Ai±a which is greater than Aj (Ai±a>Aj, Ai>Aj>a>0, where a is an integer no less than 1) about only any one of the plurality of teeth 27 where first output coils 23 having the number of windings of Ai are wound in the reference state, while keeping the number of windings of the second output coils the same as the reference state illustrated in FIG. 6.

Furthermore, similarly to the first embodiment, if the number of windings a of the first output coils 23 which are added or deleted by adjustment of the number of windings per tooth is an integer no less than 1 and a configuration is adopted in which the relationship a/A1≤2% is adopted, then it is possible to reduce the rotation angle error of the detecting rotor 3 by a smaller number of windings, and hence the work input involved in adjustment of the number of windings can be reduced.

Furthermore, in the example described above, the positional relationship between the excitation coils 22, the first output coils 23 and the second output coils 24 is the positional relationship in FIG. 4, but similar effects can also be obtained if the positional relationship between the excitation coils 22, the first output coils 23 and the second output coils 24 is that illustrated in FIG. 18.

Moreover, needless to say, similar effects are also displayed if the first output coils 23 and the second output coils 24 are interchanged in the example described above and the number of windings is adjusted in the second output coils 24.

Seventh Embodiment

Figure 28:
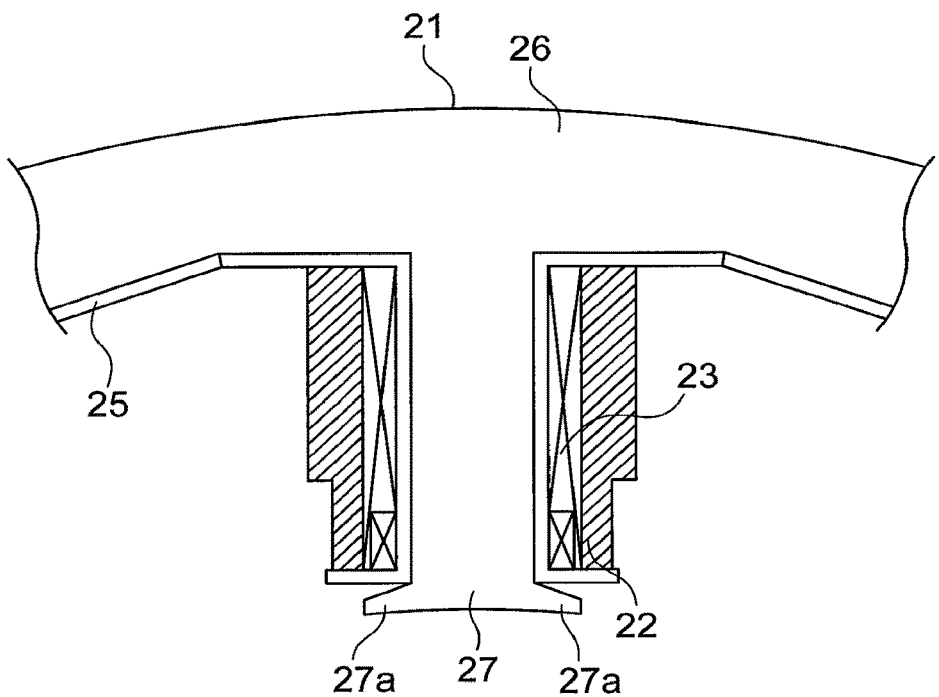
FIG. 28 is an enlarged diagram showing a state where an excitation coil and a first output coil of a rotation angle detector according to a seventh embodiment of the invention are provided on a tooth.

FIG. 28 is an enlarged diagram showing a state where an excitation coil 22 and a first output coil 23 of a rotation angle detector 1 according to a seventh embodiment of the invention are provided on a tooth 27. In the seventh embodiment, the positional relationship of the first and second output coils 23, 24 and the excitation coil 22 differs from the first embodiment.

More specifically, of the excitation coil 22 and first output coil 23 which are provided on the same tooth 27, the first output coil 23 is provided throughout the range of the tooth 27 in the radial direction of the detecting rotor 3, and the excitation coil 22 is provided only in a portion of the range of the tooth 27 in the radial direction of the detecting rotor 3. In this example, the excitation coil 22 is provided only in the front end portion of the tooth 27 which is near the detecting rotor 3. The first output coil 23 is provided in a state of covering the outer periphery of the excitation coil 22, and is also provided in a portion of the tooth 27 nearer to the core back 26 than the excitation coil 22 (in other words, the portion of the tooth 27 situated at a position further from the detecting rotor 3 than the excitation coil 22 in the radial direction of the detecting rotor 3).

The first output coils 23 provided on the other teeth 27 are each similarly provided in a state of covering the outer periphery of the excitation coil 22 and in a portion of the tooth 27 that is nearer to the core back 26 than the excitation coil 22. Furthermore, the second output coils 24 provided on each of the teeth 27 are each similarly provided in a state of covering the outer periphery of the excitation coil 22 and in a portion of the tooth 27 that is nearer to the core back 26 than the excitation coil 22.

The conductive wires of the first output coils 23 and the second output coils 24 are each wound onto the teeth 27 so as to cover the teeth 27 and the excitation coils 22, after the conductive wires of the excitation coils 22 have been wound about the teeth 27. The remaining configuration is similar to the first embodiment.

In the present embodiment, Example 7-1 which has the same numbers of windings as Example 1-1 illustrated in FIG. 9 and Example 7-2 which has the same numbers of windings as Example 1-2 illustrated in FIG. 11 are given as specific examples of the numbers of windings of the excitation coils 22, the first output coils 23 and the second output coils 24.

FIG. 28 shows a state where a first output coil 23 and an excitation coil 22 that have been subjected to adjustment of the number of windings according to Example 7-1 are provided on a tooth 27. Furthermore, in FIG. 28, the region where it is possible to arrange a first output coil 23 in which the conductive wire is wound additionally in order to adjust the number of windings is indicated by the diagonal hatching. In the first output coil 23 according to Example 7-1, as illustrated in FIG. 28, it is possible to achieve a broad region in the slot where adjustment of the number of windings is possible. Therefore, the range of the distribution of the interlinkage magnetic flux is large, and hence the range in which the number of windings can be adjusted is large and the options that enable adjustment of the rotation angle error are increased.

Figure 29:
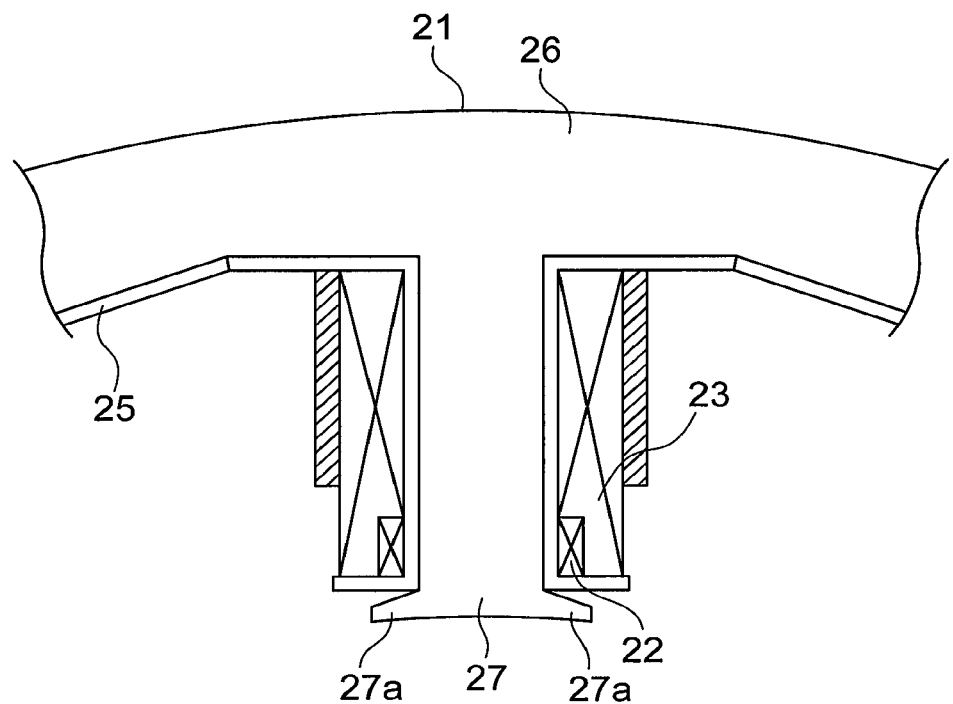
FIG. 29 shows an enlarged diagram where a first output coil and an excitation coil that have been subjected to adjustment of the number of windings according to Example 7-2 are provided on a tooth.

FIG. 29 shows an enlarged diagram where a first output coil 23 and an excitation coil 22 that have been subjected to adjustment of the number of windings according to Example 7-2 are provided on a tooth 27. In FIG. 29, the region where it is possible to arrange conductive wire that is wound additionally in order to adjust the number of windings in the first output coil 23 is indicated by the diagonal hatching. In the first output coil 23 according to Example 7-2, as illustrated in FIG. 29, the position in the slot where adjustment of the number of windings is possible is limited. Therefore, the range of distribution of the interlinkage magnetic flux is narrow, and the range where adjustment of the number of windings is possible is narrower than in Example 7-1. If the rotation angle error to be reduced is small, then Example 7-2 is sufficient as an option that enables adjustment of the rotation angle error, and the rotation angle error can also be reduced by adjustment of the number of windings based on Example 7-2.

In a rotation angle detector 1 of this kind, by making the numbers of windings of the first output coils 23 wound about the teeth different, it is possible to change the amplitude of the component δc due to adjustment of the number of windings of the first output coils 23, in the 15th-order component of rotation angle error of detecting rotor 3, and therefore it is possible to increase the options that enable adjustment of the 15th-order component of the rotation angle error of the detecting rotor 3, in other words, the shaft angle multiplier component, and hence the rotation angle error of the detecting rotor 3 can be reduced effectively.

Furthermore, since the first and second output coils 23, 24 are provided in a state of covering the outer periphery of the excitation coils 22 and are also provided in a portion of the teeth 27 situated further from the detecting rotor 3 than the excitation coils 22 in the radial direction of the detecting rotor 3, then it is possible to increase the number of windings of each of the first and second output coils 23, 24, and the output voltages of the first and second output coils 23, 24 can be increased without raising the value of the current flowing in the excitation coils 22.

Furthermore, since the excitation coils 22 are provided only in the front end portions of the teeth 27 near to the detecting rotor 3, then similarly to the second embodiment, it is possible to suppress fluctuation in the magnetic flux that is interlinked in the first and second output coils 23, 24, and hence it is possible to reduce fluctuation of the detection accuracy between different rotation angle detectors, when a plurality of rotation angle detectors are manufactured.

Moreover, since the number of windings of the conductive wires of the excitation coils 22 is the same in all of the teeth 27, then even though the conductive wires of the first and second output coils 23, 24 are wound over the outer periphery of the excitation coils 22, the conductive wires of the first and second output coils 23, 24 can be wound regardless of the number of windings of the excitation coils 22, and it is possible to suppress the occurrence of winding deviations in the conductive wires of the first and second output coils 23, 24.

In the example described above, the excitation coils 22 are provided only at a position on the teeth 27 that is near the detecting rotor 3 in the radial direction of the detecting rotor 3, but it is also possible to provide the excitation coils 22 only at a position on the teeth 27 that is distant from the detecting rotor 3 in the radial direction of the detecting rotor 3, and to provide the first or second output coils 23, 24 over the outer periphery of the excitation coils 22 and in a portion of the teeth 27 nearer to the detecting rotor 3 than the excitation coils 22.

Furthermore, in the example given above, the numbers of windings according to the first embodiment were used for the respective numbers of windings of the excitation coils 22, the first output coils 23 and the second output coils 24, but it is also possible to use the numbers of windings according to the second and fourth to sixth embodiments.

Eighth Embodiment

Figure 30:
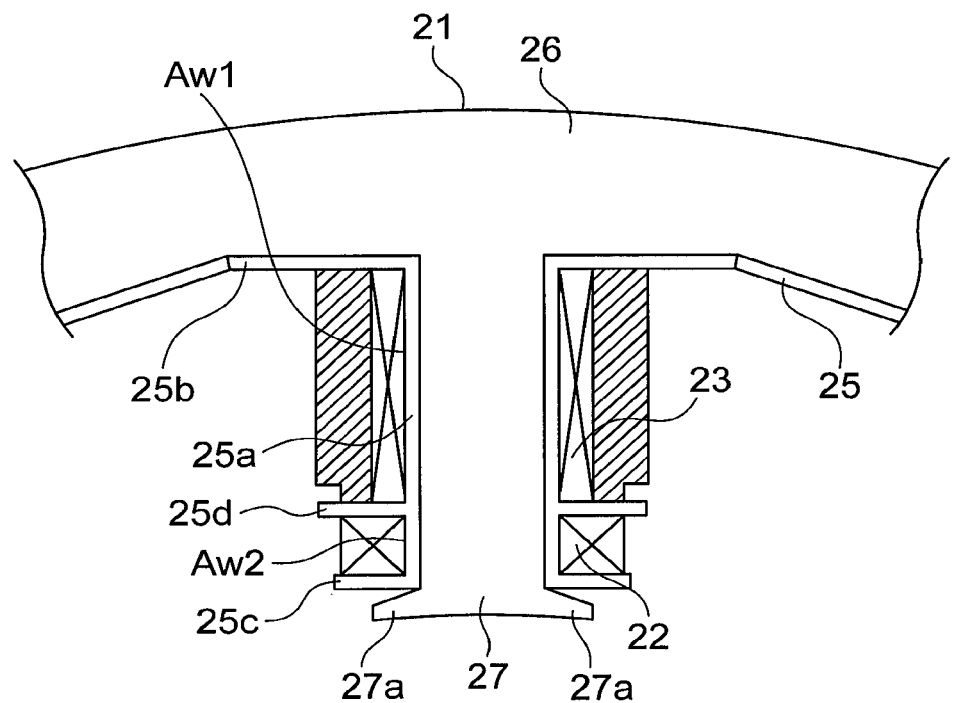
FIG. 30 is an enlarged diagram showing a state where an excitation coil and a first output coil of a rotation angle detector according to an eighth embodiment of the invention are provided on a tooth.

FIG. 30 is an enlarged diagram showing a state where an excitation coil 22 and a first output coil 23 of a rotation angle detector 1 according to an eighth embodiment of the invention are provided on a tooth 27. The configuration of the excitation coil 22 and the second output coil 24 which are provided on the tooth 27 is similar to that in FIG. 30.

The insulating body 25 has a winding core section 25a provided on the side surface of each tooth 27, an outer side insulation section 25b which projects along an inner circumferential surface of the core back 26 from an outside end portion of the winding core section 25a in the radial direction, an inner side insulation section 25c which projects outwards in the circumferential direction of the detecting rotor 3 from an inside end portion of the winding core section 25a in the radial direction, and a partition section 25d which projects outwards in the circumferential direction of the detecting rotor 3 from the winding core section 25a, between the outer side insulation section 25b and the inner side insulation section 25c. In this example, the insulating body 25 is made from a synthetic resin material (for example, 66 nylon (registered trademark) (glass fiber-reinforced resin), or the like).

A first winding region Aw1 is formed between the outer side insulation section 25b and the partition section 25d, and a second winding region Aw2 is formed between the inner side insulation section 25c and the partition section 25d. Furthermore, the first winding region Aw1 is positioned to the outside of the second winding region Aw2 in the radial direction of the detecting rotor 3. An excitation coil 22 is provided in the second winding region Aw2 and a first or second output coil 23, 24 is provided in the first winding region Aw1. Consequently, the first and second output coils 23, 24 and the excitation coil 22 are separated in the radial direction of the detecting rotor 3 by the partition section 25d. The remaining configuration is similar to the third embodiment.

In the present embodiment, Example 8-1 which has the same numbers of windings as Example 1-1 illustrated in FIG. 9 and Example 8-2 which has the same numbers of windings as Example 1-2 illustrated in FIG. 11 are given as specific examples of the numbers of windings of the excitation coils 22, the first output coils 23 and the second output coils 24.

FIG. 30 shows a state where a first output coil 23 and an excitation coil 22 that have been subjected to adjustment of the number of windings according to Example 8-1 are provided on a tooth 27. Furthermore, in FIG. 30, the region where it is possible to arrange conductive wire that is wound additionally in order to adjust the number of windings in the first output coil 23 is indicated by the diagonal hatching. In the first output coil 23 according to Example 8-1, as illustrated in FIG. 30, it is possible to achieve a broad region in the slot where adjustment of the number of windings is possible. Therefore, the range of the distribution of the interlinkage magnetic flux is large, and hence the range in which the number of windings can be adjusted is large and the options that enable adjustment of the rotation angle error are increased.

Figure 31:
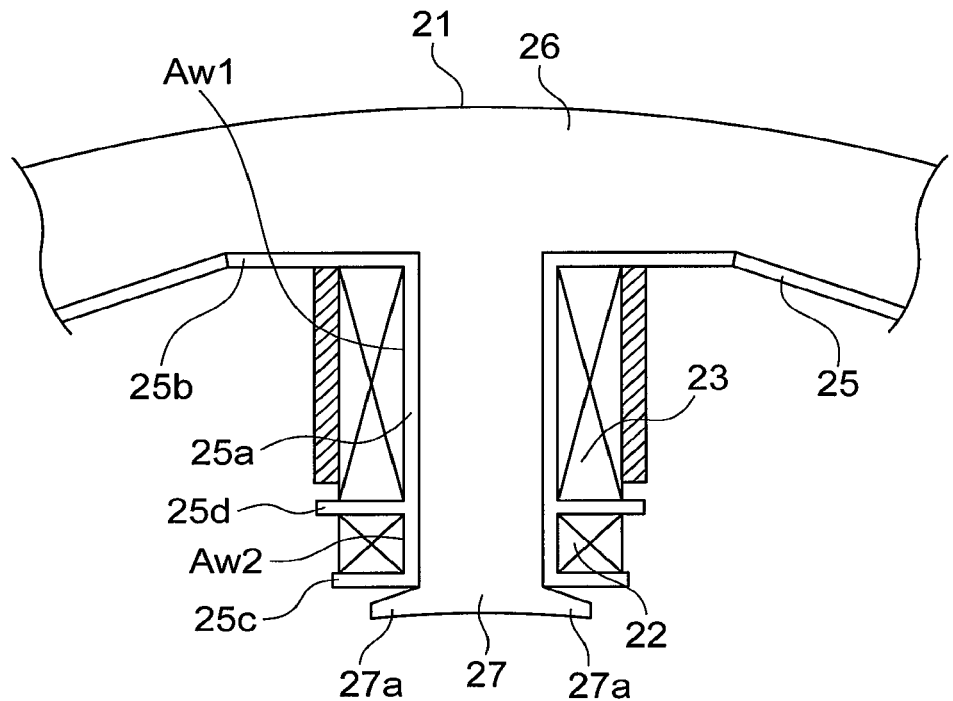
FIG. 31 shows an enlarged diagram where a first output coil and an excitation coil that have been subjected to adjustment of the number of windings according to Example 8-2 are provided on a tooth.

FIG. 31 shows an enlarged diagram where a first output coil 23 and an excitation coil 22 that have been subjected to adjustment of the number of windings according to Example 8-2 are provided on a tooth 27. In FIG. 31, the region where it is possible to arrange conductive wire that is wound additionally in order to adjust the number of windings in the first output coil 23 is indicated by the diagonal hatching. In the first output coil 23 according to Example 8-2, as illustrated in FIG. 31, the position in the slot where adjustment of the number of windings is possible is limited. Therefore, the range of distribution of the interlinkage magnetic flux is narrow, and the range where adjustment of the number of windings is possible is narrower than in Example 8-1. If the rotation angle error to be reduced is small, then Example 8-2 is sufficient as an option that enables adjustment of the rotation angle error, and the rotation angle error can also be reduced by adjustment of the number of windings based on Example 8-2.

In a rotation angle detector 1 of this kind, by making the numbers of windings of the first output coils 23 wound about the teeth different, it is possible to change the amplitude of the component δc due to adjustment of the number of windings of the first output coils 23, in the 15th-order component of rotation angle error of detecting rotor 3, and therefore it is possible to increase the options that enable adjustment of the 15th-order component of the rotation angle error of the detecting rotor 3, in other words, the shaft angle multiplier component, and the rotation angle error of the detecting rotor 3 can be reduced effectively.

Furthermore, since the insulating body 25 has a partition section 25d which separates the first and second output coils 23, 24 and the excitation coil 22 in the radial direction of the detecting rotor 3, then it is possible to readily ensure an insulated state between the first and second output coils 23, 24 and the excitation coil 22.

Furthermore, by using the partition section 25d as a reference, it is possible to position the first and second output coils 23, 24 and the excitation coil 22 more reliably. Consequently, even if the conductive wires are wound on the teeth 37 by an automatic winding machine, it is possible to arrange the first and second output coils 23, 24 and the excitation coils 22 more accurately and reliably in the slots 28, in a separated fashion in the radial direction of the detecting rotor 3, and hence the positions of the excitation coils 22 and the first and second output coils 23, 24 can be determined more accurately than in the case of the third embodiment. Consequently, it is possible to lower the manufacturing costs of the rotation angle detector 1, as well as being able to reduce winding deviations of the conductive wires of the excitation coils 22 and the first and second output coils 23, 24 and thus achieving improved detection accuracy.

The partition section 25d may be formed as a portion of the detecting stator core 21 which is configured by stacking silicon steel plates. When forming the same, from the viewpoint of preventing leaking magnetic flux, it is desirable to configure the partition section 25d from a non-magnetic body.

Furthermore, in the example described above, the excitation coils 22 are provided only at a position on the teeth 27 that is near the detecting rotor 3 in the radial direction of the detecting rotor 3, but it is also possible to provide the excitation coils 22 only at a position on the teeth 27 that is distant from the detecting rotor 3 in the radial direction of the detecting rotor 3, and to provide the first or second output coils 23, 24 over the outer periphery of the excitation coils 22 and in a portion of the teeth 27 near to the detecting rotor 3. In other words, the excitation coil 22 may be provided in the first winding region Aw1, and the first or second output coil 23, 24 may be provided in the second winding region Aw2.

Furthermore, in the example given above, the numbers of windings according to the first embodiment were used for the respective numbers of windings of the excitation coils 22, the first output coils 23 and the second output coils 24, but it is also possible to use the numbers of windings according to the second and fourth to sixth embodiments.

Ninth Embodiment

Figure 32:
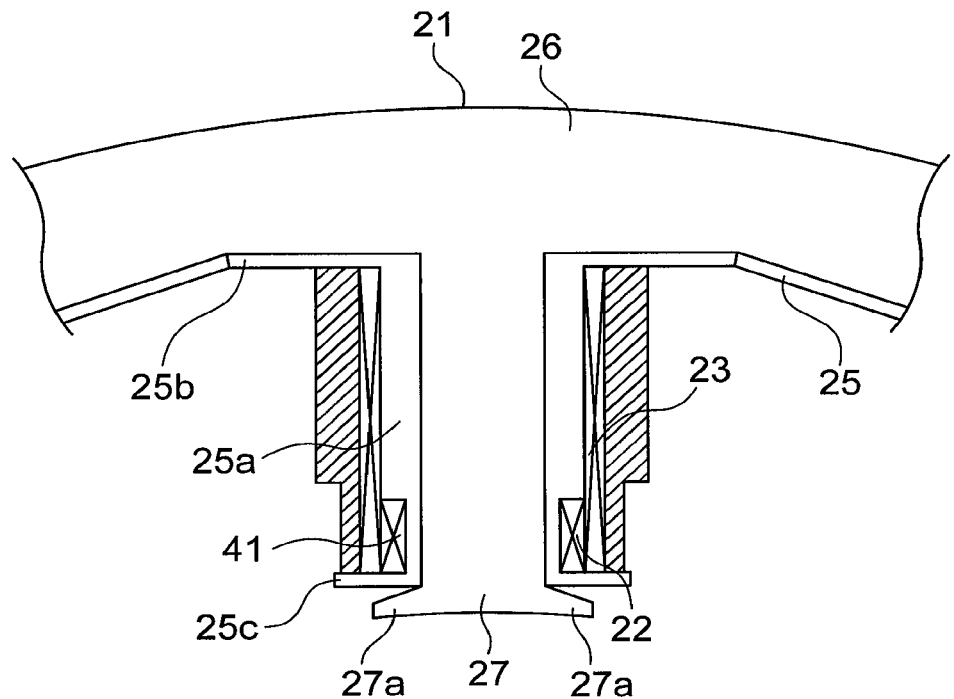
FIG. 32 is an enlarged diagram showing a state where an excitation coil and a first output coil of a rotation angle detector according to a ninth embodiment of the invention are provided on a tooth.

FIG. 32 is an enlarged diagram showing a state where an excitation coil 22 and a first output coil 23 of a rotation angle detector 1 according to a ninth embodiment of the invention are provided on a tooth 27. The configuration of the excitation coil 22 and the second output coil 24 which are provided on the tooth 27 is similar to that in FIG. 32.

A recess section 41 into which the excitation coil 22 is fitted is provided on one portion of the outer peripheral surface of the winding core section 25a. The recess section 41 is provided only in a position on the winding core section 25a near the detecting rotor 3 in the radial direction of the detecting rotor 3 (in other words, a position corresponding to the front end section of the tooth 27). In this example, the whole of the excitation coil 22 is accommodated in the recess section 41. Furthermore, in this example, the thickness of the excitation coil 22 matches the depth of the recess section 41, and the excitation coil 22 is accommodated in the recess section 41. The remaining configuration is similar to the seventh embodiment.

In the present embodiment, Example 9-1 which has the same numbers of windings as Example 1-1 illustrated in FIG. 9 and Example 9-2 which has the same numbers of windings as Example 1-2 illustrated in FIG. 11 are given as specific examples of the numbers of windings of the excitation coils 22, the first output coils 23 and the second output coils 24.

FIG. 32 shows a state where a first output coil 23 and an excitation coil 22 that have been subjected to adjustment of the number of windings according to Example 9-1 are provided on a tooth 27. Furthermore, in FIG. 32, the region where it is possible to arrange conductive wire that is wound additionally in order to adjust the number of windings in the first output coil 23 is indicated by the diagonal hatching. In the first output coil 23 according to Example 9-1, as illustrated in FIG. 32, it is possible to achieve a broad region in the slot where adjustment of the number of windings is possible. Therefore, the range of the distribution of the interlinkage magnetic flux is large, and hence the range in which the number of windings can be adjusted is large and the options that enable adjustment of the rotation angle error are increased.

Figure 33:
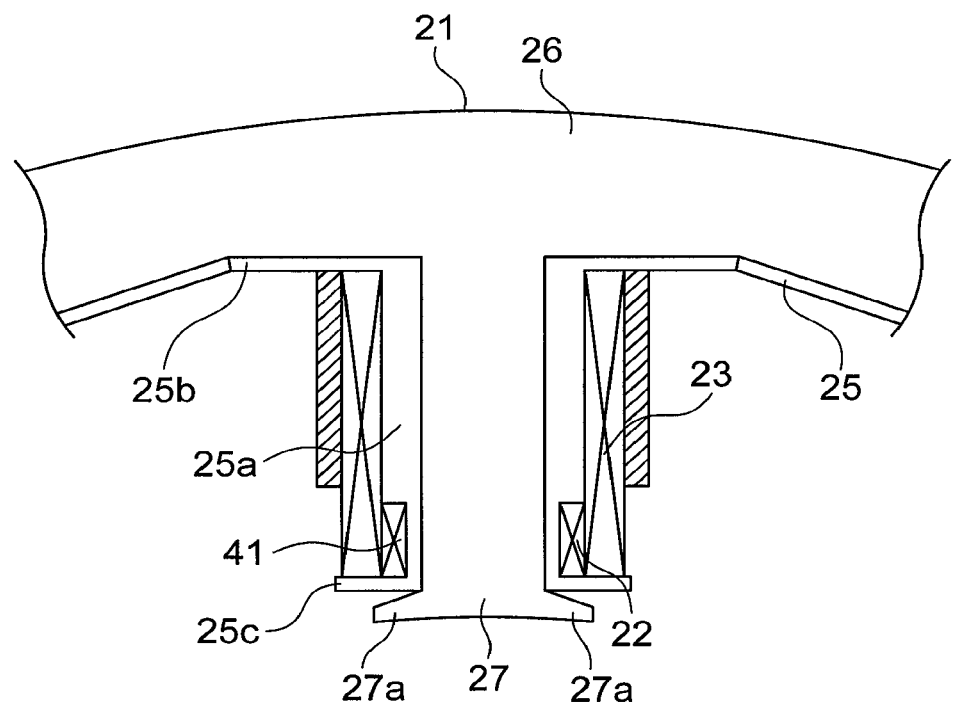
FIG. 33 shows an enlarged diagram where a first output coil and an excitation coil that have been subjected to adjustment of the number of windings according to Example 9-2 are provided on a tooth.

FIG. 33 shows an enlarged diagram where a first output coil 23 and an excitation coil 22 that have been subjected to adjustment of the number of windings according to Example 9-2 are provided on a tooth 27. In FIG. 33, the region for arranging conductive wire that is wound additionally in order to adjust the number of windings in the first output coil 23 is indicated by the diagonal hatching. In the first output coil 23 according to Example 9-2, as illustrated in FIG. 33, the position in the slot where adjustment of the number of windings is possible is limited. Therefore, the range of distribution of the interlinkage magnetic flux is narrow, and the range where adjustment of the number of windings is possible is narrower than in Example 9-1. If the rotation angle error to be reduced is small, then Example 9-2 is sufficient as an option that enables adjustment of the rotation angle error, and the rotation angle error can also be reduced by adjustment of the number of windings based on Example 9-2.

In a rotation angle detector 1 of this kind, by making the numbers of windings of the first output coils 23 wound about the teeth different, it is possible to change the amplitude of the component δc due to adjustment of the number of windings of the first output coils 23, in the 15th-order component of rotation angle error of detecting rotor 3, and therefore it is possible to increase the options that enable adjustment of the 15th-order component of the rotation angle error of the detecting rotor 3, in other words, the shaft angle multiplier component, and the rotation angle error of the detecting rotor 3 can be reduced effectively.

Furthermore, since a recess section 41 in which the excitation coil 22 is fitted is formed in one portion of the outer circumferential surface of the winding core section 25a, then it is possible to position the excitation coil 22 more accurately and easily with respect to the tooth 27, and fluctuation in the position of the excitation coil 22 occurring between different teeth 27 or different rotation angle detectors 1 can be suppressed. Furthermore, when the conductive wires of the first or second output coil 23, 24 are wound about the outer periphery of the excitation coil 22, it is possible to suppress the occurrence of winding deviations in the conductive wires of the first or second output coil 23, 24. Therefore, further improvement in the detection accuracy of the rotation angle detector 1 can be achieved.

In the example described above, the whole of the excitation coil 22 is accommodated in the recess section 41, but provided that the excitation coil 22 is fitted in the recess section 41, the positioning of the excitation coil 22 can be carried out more accurately and easily, and therefore it is sufficient if at least a portion of the excitation coil 22 is accommodated in the recess section 41.

Furthermore, in the example described above, a recess section 41 is provided at a position near the detecting rotor 3 in the winding core section 25a, but the position of the recess section 41 is not limited to this, and it is also possible, for example, to provide the recess section 41 at a position in the winding core section 25a that is distant from the detecting rotor 3 in the radial direction of the detecting rotor 3.

Furthermore, in the example given above, the numbers of windings according to the first embodiment were used for the respective numbers of windings of the excitation coils 22, the first output coils 23 and the second output coils 24, but it is also possible to use the numbers of windings according to the second and fourth to sixth embodiments.

Tenth Embodiment

FIG. 34 is a table illustrating, as Example 10-1, the number of salient poles 31 (shaft angle multiplier), the number of teeth 27, the spatial order of the excitation coils 22 and the spatial order of the first and second output coils 23, 24 of the rotation angle detector 1 in FIG. 3. FIG. 34 also depicts the number of teeth 27, the spatial order of the excitation coils 22, and the spatial order of the first and second output coils 23, 24 for Examples 10-2 and 10-3, which are further examples in which the number of salient poles 31 (shaft angle multiplier) are changed in the first embodiment, as well as Example 10-1.

Here, if the spatial order of the error corresponding to the coefficient r or s of the angle $\theta_s$ of the detecting stator 2 included in the phase components of the fourth, fifth, sixth and seventh terms of Equation (10), is taken as $\delta=|M-|M\pm N||$ and $\varepsilon=|\delta-M|=||M-|M\pm N||-M|$, then the spatial order δ of the error is the spatial order identified by the first term of Equation (1) and Equation (4), and the spatial order ε of the error is the spatial order identified by the second term of Equation (1) and Equation (4).

When the values of the spatial orders δ and ε of the error are the values indicated above, then the angle error $e(\theta_r)$ of the rotation angle detector increases due to the occurrence of orders of angle error, such as r, s, N±r or N±s, in accordance with Equation (14). Consequently, it is possible to suppress increase in the angle error by setting the number of salient poles M of the excitation coils 22 (in other words, the number 2M of teeth 27 in the detecting stator 2) and the number of salient poles 31 of the detecting rotor 3 (in other word, the shaft angle multiplier) N, in such a manner that the spatial orders δ and ε of the error do not become the spatial orders of the noise that is expected during use of the rotation angle detector 1.

In Example 10-1, the shaft angle multiplier N in FIG. 34 is 15, the spatial order M of the excitation coils 22 (in other words, the number equivalent to half the number of teeth 27) is 9, and the spatial order |M±N| of the first and second output coils 23, 24 is 24 or 6 (24 is equivalent to 6, because |18−24|=6). Therefore, in Example 10-1, the spatial order $\delta=|M-|M\pm N||$ of the error detected by the first and second output coils 23, 24 is 15 and 3, and the spatial order $\varepsilon=|\delta-M|$ of the error in detecting the spatial order δ is 6. In other words, in Example 10-1, the spatial orders of the error δ and ε are set to values other than 1, 2 and 4.

In Example 10-1, since the spatial order δ of the error is 15 and 3, and the spatial order ε of the error in detecting the spatial order δ is 6, then the first-order, second-order and fourth-order spatial orders of the error, which are low-order components of the spatial orders of the error, are not picked up by the first and second output coils 23, 24. Here, the first-order spatial order of the error is envisaged as being the eccentricity of the detecting stator 2 or detecting rotor 3, for example, and the second-order spatial order of the error is envisaged as being elliptical deformation, or magnetic anisotropy, or a combination thereof, of the detecting stator 2 or detecting rotor 3, for example. Furthermore, the fourth-order spatial order of the error is envisaged as being quadrilateral deformation, or magnetic anisotropy, or a combination thereof, of the detecting stator 2 or the detecting rotor 3, for example. In Example 10-1, these first-order, second-order and fourth-order error components are not picked up by the first and second output coils 23, 24, and therefore it is possible to reduce the angle error of the rotation angle detector 1 with respect to noise, such as eccentricity, elliptical deformation, quadrilateral deformation, magnetic anisotropy, etc. of the detecting stator 2 or the detecting rotor 3.

Furthermore, in Example 10-2 in FIG. 34, the shaft angle multiplier N is 24, the spatial order M of the excitation coils 22 is 9 and the spatial order |M±N| of the first and second output coils 23, 24 is 33 or 15 (both 33 and 15 are equivalent to 3). Therefore, in Example 10-2, the spatial order $\delta=|M-|M\pm N||$ of the error detected by the first and second output coils 23, 24 is 24 and 6, and the spatial order ε=|δ−M| of the error in detecting the spatial order δ is 15 and 3. In other words, in Example 10-2, the spatial orders of the error δ and ε are set to values other than 1, 2 and 4.

In Example 10-2, similarly to Example 10-1, these first-order, second-order and fourth-order error components are not picked up by the first and second output coils 23, 24, and therefore it is possible to reduce the angle error of the rotation angle detector 1 with respect to noise, such as eccentricity, elliptical deformation, quadrilateral deformation, magnetic anisotropy, etc. of the detecting stator 2 or the detecting rotor 3.

Furthermore, in Example 10-3 in FIG. 34, the shaft angle multiplier N is 30, the spatial order M of the excitation coils 22 is 9 and the spatial order |M±N| of the first and second output coils 23, 24 is 39 or 21 (both 39 and 21 are equivalent to 3). Therefore, in Example 10-3, the spatial order δ=|M−|M±N|| of the error detected by the first and second output coils 23, 23 is 30 and 12, and the spatial order ε=|δ−M| of the error in detecting the spatial order δ is 21 and 3. In other words, in Example 10-3, the spatial orders of the error δ and ε are set to values other than 1, 2 and 4.

In Example 10-3, similarly to Example 10-1, these first-order, second-order and fourth-order error components are not picked up by the first and second output coils 23, 24, and therefore it is possible to reduce the angle error of the rotation angle detector 1 with respect to noise, such as eccentricity, elliptical deformation, quadrilateral deformation, magnetic anisotropy, etc. of the detecting stator 2 or the detecting rotor 3.

In the present embodiment, the number of windings based on the first, second and fourth to sixth embodiments are used respectively for the number of windings of the first and second output coils 23, 24 in Example 10-1, Example 10-2 and Example 10-3.

In a rotation angle detector 1 of this kind, when M is the number of pole pairs of the excitation coils 22 and N is the number of salient poles 31 of the detecting rotor 3 (the shaft angle multiplier), then since the spatial distribution of the numbers of windings of the first and second output coils 23, 24 is the sum of a function expressed by a sine wave of spatial order |M±N| and a function expressed by a sine wave of spatial order |M−|M±N||, and is obtained by a function in which the amplitude of the sine wave of spatial order |M±N| and the amplitude of the sine wave of spatial order |M−|M±N|| are equal, and since the spatial order δ of the error expressed by |M−|M±N|| and the spatial order ε of the error expressed by |δ−M| are values other than 1 and 2, then it is possible to prevent detection of the error components of the first-order and second-order by the first and second output coils 23, 24. Consequently, it is possible to reduce the angle error of the rotation angle detector 1 with respect to noise, such as eccentricity, elliptical deformation and magnetic anisotropy, etc. of the detecting stator 2 or detecting rotor 3, and increase in the detection error can be suppressed. Furthermore, since the excitation coils 22 are wound respectively about each of the teeth 27, then it is possible to achieve a maximum value of the spatial order (number of pole pairs) M of the excitation coils 22, in relation to the number of teeth 27 of the detecting stator 2 (in other words, 2M). Consequently, it is possible to suppress leaking, between the teeth 27, of the magnetic flux generated by the magnetomotive force of the excitation coils 22, and the output of the rotation angle detector 1 can be improved. Therefore, in the rotary electrical machine 101 which uses the rotation angle detector 1, it is possible to improve the accuracy in relation to control of the position and speed of the rotor 103.

Furthermore, since the spatial orders δ and ε of the error are not 1 and 2, and are also values other than 4, then it is possible to reduce the angle error of the rotation angle detector 1 in respect of noise caused by quadrilateral deformation, in addition to eccentricity, elliptical deformation and magnetic anisotropy, etc. of the detecting stator 2 or the detecting rotor 3.

Moreover, since a pair of projections 37a which project in the circumferential direction of the detecting rotor 3 are provided on the front end portion of the teeth 27, then the interlinkage magnetic flux in the first and second output coils 23, 24 is increased, and the values of the output voltages of the first and second output coils 23, 24 can be raised without increasing the value of the current flowing in the excitation coils 22.

Eleventh Embodiment

FIG. 35 is a table illustrating, as Example 11-1, the number of salient poles 31 (shaft angle multiplier), the number of teeth 27, the spatial order of the excitation coils 22 and the spatial order of the first and second output coils 23, 24 of the rotation angle detector 1 according to an eleventh embodiment of this invention. FIG. 35 also depicts the number of teeth 27, the spatial order of the excitation coils 22, and the spatial order of the first and second output coils 23, 24 for Examples 11-2 and 11-3, which are further examples in which the number of salient poles 31 (shaft angle multiplier) are changed in the eleventh embodiment, as well as Example 11-1.

In the eleventh embodiment, the number of teeth 27 aligned at even intervals in the circumferential direction is 30 teeth, in each of Example 11-1 to Example 11-3. In Example 11-1 of the eleventh embodiment, the shaft angle multiplier N in FIG. 35 is 20, the spatial order M of the excitation coils 22 (in other words, the number equivalent to half the number of teeth 27) is 15, and the spatial order |M±N| of the first and second output coils 23, 24 is 35 or 5 (here, 35 is equivalent to 5). Therefore, in Example 11-1, the spatial order δ=|M−|M±N|| of the error detected by the first and second output coils 23, 24 is 20 and 10, and the spatial order ε=|δ−M| of the error in detecting the spatial order δ is 5. In other words, in Example 11-1, the spatial orders of the error δ and ε are set to values other than 1, 2, 3 and 4.

Hence, in Example 11-1, since the spatial order δ of the error is 20 and 10, and the spatial order ε of the error in detecting the spatial order δ is 5, then the first-order, second-order, third-order and fourth-order spatial orders of the error, which are low-order components of the spatial orders of the error, are not picked up by the first and second output coils 23, 24. Consequently, in Example 11-1, because these first-order, second-order, third-order and fourth-order error components are not picked up by the first and second output coils 23, 24, then it is possible to reduce the angle error of the rotation angle detector 1 with respect to noise, such as eccentricity, elliptical deformation, triangular deformation, quadrilateral deformation, magnetic anisotropy, etc. of the detecting stator 2 or the detecting rotor 3.

Furthermore, in Example 11-2 in FIG. 35, the shaft angle multiplier N is 10, the spatial order M of the excitation coils 22 is 15 and the spatial order |M±N| of the first and second output coils 23, 24 is 25 or 5 (25 is equivalent to 5). Therefore, in Example 11-2, the spatial order δ=|M−|M±N|| of the error detected by the first and second output coils 23, 24 is 10, and the spatial order ε=|δ−M| of the error in detecting the spatial order δ is 5. In other words, in Example 11-2 also, the spatial orders of the error δ and ε are set to values other than 1, 2, 3 and 4.

Furthermore, in Example 11-3 in FIG. 35, the shaft angle multiplier N is 24, the spatial order M of the excitation coils 22 is 15 and the spatial order |M±N| of the first and second output coils 23, 24 is 39 or 9 (39 is equivalent to 9). Therefore, in Example 11-3, the spatial order δ=|M−|M±N|| of the error detected by the first and second output coils 23, 24 is 24 and 6, and the spatial order ε=|δ−M| of the error in detecting the spatial order δ is 9. In other words, in Example 11-3 also, the spatial orders of the error δ and ε are set to values other than 1, 2, 3 and 4.

Consequently, in Example 11-2 and 11-3, similarly to Example 11-1, these first-order, second-order, third-order and fourth-order error components are not picked up by the first and second output coils 23, 24, and therefore it is possible to reduce the angle error of the rotation angle detector 1 with respect to noise, such as eccentricity, elliptical deformation, triangular deformation, quadrilateral deformation, magnetic anisotropy, etc. of the detecting stator 2 or the detecting rotor 3.

In the present embodiment, at least one of the first and second output coils 23, 24 in Example 11-1, Example 11-2 and Example 11-3 have two or more different numbers of windings. Furthermore, in the present embodiment, the numbers of windings of the first and second output coils 23, 24 are adjusted in accordance with the rules in the first, second and fourth to sixth embodiments, from a reference state in which the spatial distribution of the numbers of windings of the first output coils 23 and the second output coils 24 is obtained by the sum of a function expressed by a sine wave of spatial order |M±N| and a function expressed by a sine wave of spatial order |M-|M±N|| having an amplitude equal to the amplitude of the sine wave of spatial order |M±N|.

In a rotation angle detector 1 of this kind, since the spatial order δ of the error expressed by |M−|M±N|| and the spatial order of the error expressed by |δ−M| are values other than 1, 2, 3 and 4, then it is possible to prevent detection of the first-order, second-order, third-order and fourth-order error components, by the first and second output coils 23, 24. Consequently, it is possible to reduce the angle error of the rotation angle detector 1 with respect to noise, such as eccentricity, elliptical deformation, triangular deformation, quadrilateral deformation and magnetic anisotropy, etc. of the detecting stator 2 or detecting rotor 3, and increase in the detection error can be suppressed. Furthermore, since the excitation coils 22 are wound respectively about each of the teeth 27, then it is possible to achieve a maximum value of the spatial order (number of pole pairs) M of the excitation coils 22, in relation to the number of teeth 27 of the detecting stator 2 (in other words, 2M). Consequently, it is possible to suppress leaking, between the teeth 27, of the magnetic flux generated by the magnetomotive force of the excitation coils 22, and the output of the rotation angle detector 1 can be improved. Therefore, in the rotary electrical machine 101 which uses the rotation angle detector 1, it is possible to improve the accuracy in relation to control of the position and speed of the rotor 103.

Figure 36:
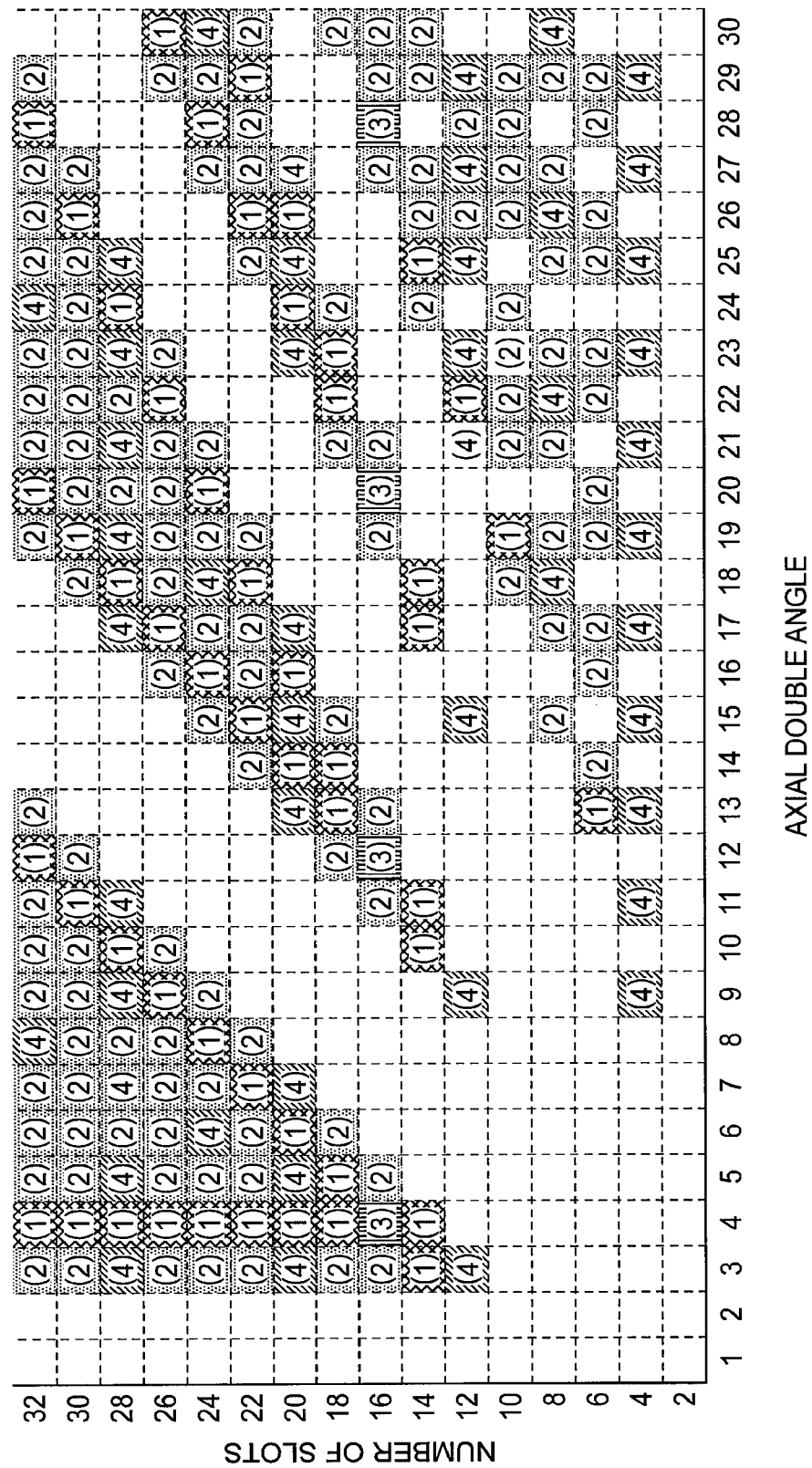
FIG. 36 is a graph illustrating combinations of shaft angle multipliers and numbers of slots which includes the shaft angle multiplier and the number of slots of the tenth and eleventh embodiments of the invention.

FIG. 36 is a graph illustrating combinations of shaft angle multipliers and numbers of slots which includes the shaft angle multiplier and the number of slots of the tenth and eleventh embodiments of the invention. In FIG. 36, the combinations of the shaft angle multiplier and the number of slots are indicated separately for each of the following cases (1) to (4). Furthermore, numbers (1) to (4) in FIG. 36 correspond respectively to the following cases (1) to (4).

(1) A combination of the shaft angle multiplier and the number of slots which avoids the spatial order of first-order and second-order error components and in which there are teeth 27 in the detecting stator 2 about which the first and second output coils 23, 24 are not wound (2) A combination of the shaft angle multiplier and the number of slots which avoids the spatial order of first-order, second-order and fourth-order error components and in which there are teeth 27 in the detecting stator 2 about which the first and second output coils 23, 24 are not wound (3) A combination of the shaft angle multiplier and the number of slots which avoids the spatial order of first-order and second-order error components and in which there are no teeth 27 in the detecting stator 2 about which the first and second output coils 23, 24 are not wound (4) A combination of the shaft angle multiplier and the number of slots which avoids the spatial order of first-order, second-order and fourth-order error components and in which there are no teeth 27 in the detecting stator 2 about which the first and second output coils 23, 24 are not wound In the combinations of shaft angle multiplier and number of slots in (1) and (2) above, since there are teeth 27 about which no first and second output coils 23, 24 are wound, then it is possible to improve the efficiency of winding work when winding the output coils onto mutually adjacent teeth 27, and the space can be used for connection of output wires and the efficiency of the connection work can be improved. Furthermore, since the diameter of the conductive wires of the output coils which are wound about mutually adjacent teeth 27 can be increased, then the coils become less liable to disconnection and the efficiency of winding work can be further improved. Furthermore, since there are teeth 27 about which the first and second output coils 23, 24 are not wound, then it is possible to reduce the amount of copper and the resistance in the output coils as a whole. Moreover, since the resistance of the output coils is reduced, then it is possible to reduce the copper loss arising in the first and second output coils 23, 24, and the reliability of the rotation angle detector 1 can also be improved.

Twelfth Embodiment

Figure 37:
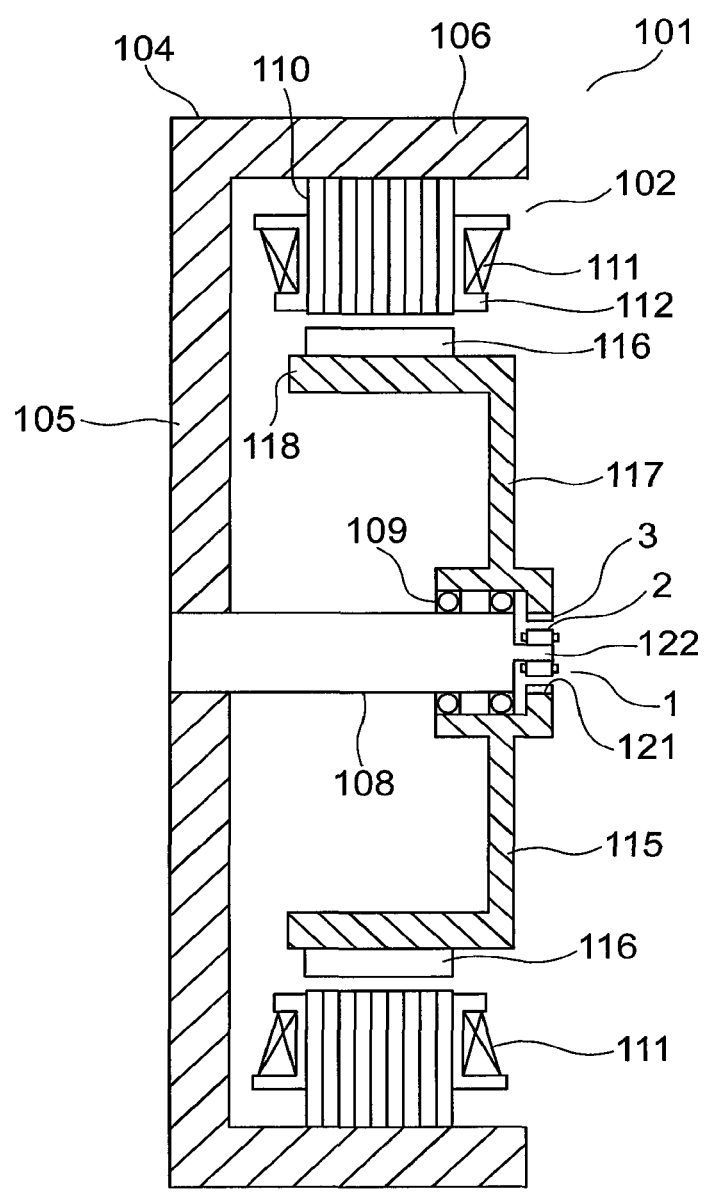
FIG. 37 is a vertical cross-sectional diagram showing a rotary electrical machine according to a twelfth embodiment of this invention.

FIG. 37 is a vertical cross-sectional diagram showing a rotary electrical machine 101 according to a twelfth embodiment of this invention. The rotor yoke 115 has a rotor yoke main body 117 to which a bearing 109 is attached, and a cylindrical rotor cylinder section 118 which is fixed to the outer peripheral section of the rotor yoke main body 117 and is disposed coaxially with the a support shaft 108. A through hole 121 is provided in the central portion of the rotor yoke main body 117. A detector shaft 122 which reaches inside the through hole 121 is provided coaxially with the support shaft 108 in the front end portion of the support shaft 108. The outer diameter of the detector shaft 122 is smaller than the outer diameter of the support shaft 108.

A rotation angle detector 1 which detects the rotation angle of the rotor 103 is provided inside the through hole 121 of the rotor yoke main body 117. The rotation angle detector 1 has a detecting stator 2 which is fixed to the detector shaft 122 and a detecting rotor 3 which is a magnetic body that faces the detecting stator 2 in the radial direction and is capable of rotating with respect to the detecting stator 2. In this example, the shape of the detecting rotor 3 is a circular ring shape, and the detecting stator 2 is disposed to the inside of the detecting rotor 3 in the radial direction. Furthermore, in this example, the detecting rotor 3 is fixed inside the through hole 121 in the rotor yoke main body 117, in such a manner that the detecting rotor 3 rotates in an integrated fashion with the rotor yoke main body 117.

The remaining configuration of the rotary electrical machine 101 is similar to the first embodiment.

Figure 38:
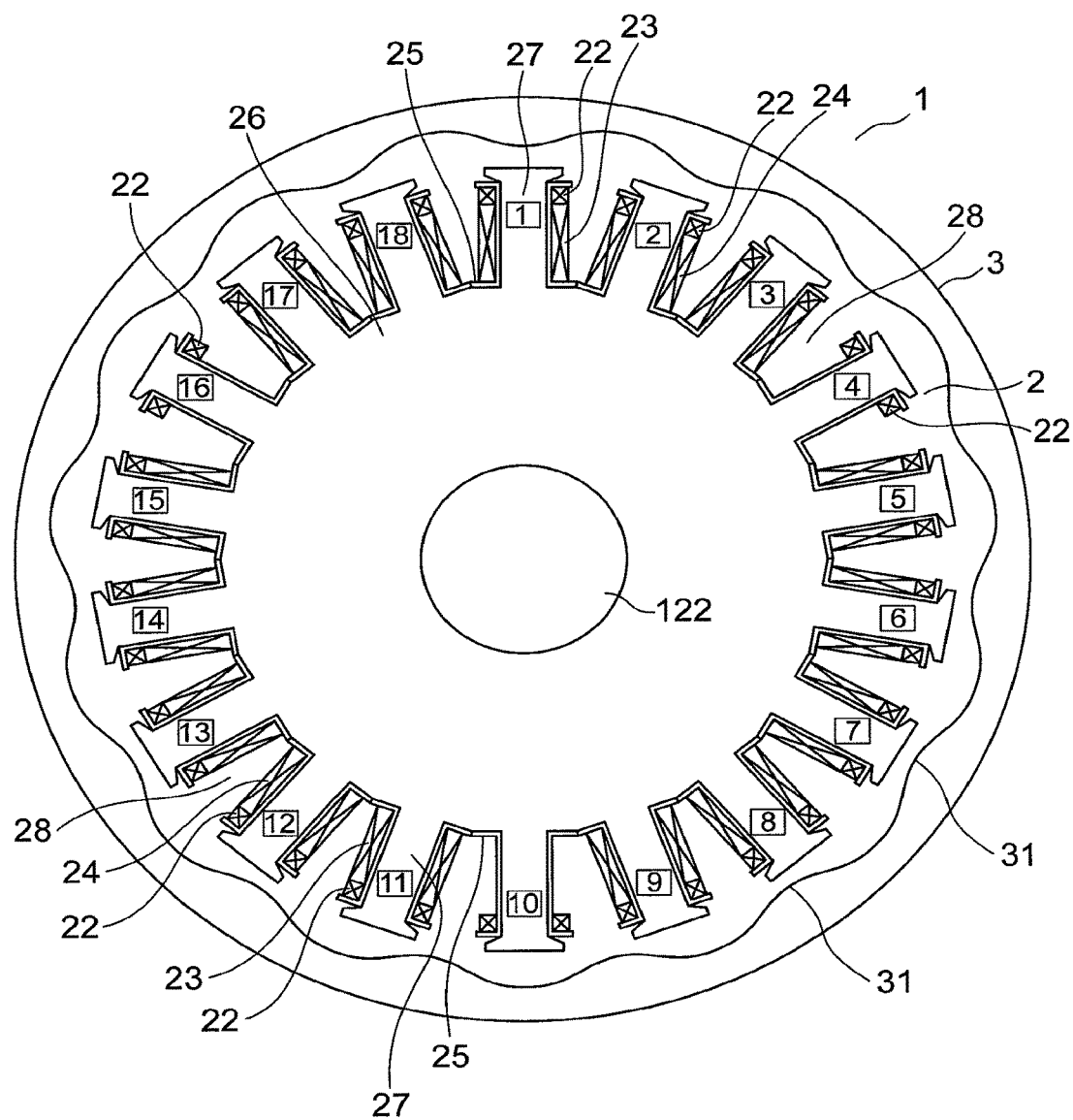
FIG. 38 is a cross-sectional diagram showing the rotation angle detector in FIG. 37.

FIG. 38 is a cross-sectional diagram showing the rotation angle detector 1 in FIG. 37. The detecting stator 2 has a detecting stator core 21, which is a magnetic body, a plurality of excitation coils 22, a plurality of first output coils 23 and a plurality of second output coils 24, which are provided respectively on the detecting stator core 21, and insulating bodies 25 which are provided on the detecting stator core 21 and are interposed between the excitation coils 22, the first output coils 23, and the second output coils 24, and the detecting stator core 21. The state of insulation between the detecting stator core 21 and the excitation coils 22, the first output coils 23 and the second output coils 24 is maintained by the insulating bodies 25.

The detecting stator core 21 has a core back 26 of which a central portion is fitted (fixed) to the detector shaft 122, and a plurality of teeth 27 which project respectively in an inward radial direction from the core back 26 and are arranged in the circumferential direction of the detecting stator core 21. In this example, 18 teeth 27 are arranged at even intervals apart in the circumferential direction of the detecting stator core 21.

The excitation coils 22 are wound respectively about each of the teeth 27. The excitation coils 22 are electrically connected to each other in series.

The first output coils (COS coils) 23 and second output coils (SIN coils) 24 are output coils of mutually different phases. The first output coils 23 are electrically connected to each other in series and the second output coils 24 are electrically connected to each other in series. Furthermore, the first output coils 23 and the second output coils 24 are respectively wound about mutually different teeth 27, while avoiding winding of output coils 23, 24 of the same phase about two teeth 27 which are adjacent to each other in the circumferential direction of the detecting stator core 21. In this example, the first output coils 23 are wound respectively about a plurality of teeth 27 selected in alternation in the circumferential direction, from among the plurality of teeth 27, and the second output coils 24 are wound respectively about the plurality of teeth 27 which are not the teeth 27 about which the first output coils 23 are wound.

The excitation coil 22 and the first output coil 23 provided on the same tooth 27 are aligned in the radial direction of the detecting rotor 3. Furthermore, the excitation coil 22 is provided at a position nearer to the detecting rotor 3 than the first output coil 23 in the radial direction of the detecting rotor 3. In other words, the conductive wire of the excitation coil 22 is wound about the front end portion of the tooth 27 near the detecting rotor 3, and the conductive wire of the first output coil 23 is wound about the portion of the tooth 27 that is nearer to the core back 26 than the excitation coil 22.

The first output coils 23 provided on the other teeth 27 are similarly wound to the inside of the excitation coil 22 in the radial direction of the detecting rotor 3. Furthermore, the second output coils 24 provided on each of the teeth 27 are similarly wound to the inside of the excitation coil 22 in the radial direction of the detecting rotor 3.

The detecting rotor 3 has a plurality of salient poles 31 which are arranged in the circumferential direction of the detecting rotor 3. Furthermore, the detecting rotor 3 is rotatable with respect to the detecting stator 2 with the salient poles 31 facing the outer circumferential surface of the detecting stator 2 in the radial direction. When the detecting rotor 3 rotates with respect to the detecting stator 2, the pulsation of the permeance between the detecting rotor 3 and the detecting stator 2 changes in a sinusoidal fashion due to the presence of the salient poles 31.

A magnetomotive force is generated in the excitation coils 22 by the supply of an AC current to the excitation coils 22. Consequently, a magnetic flux passing through the detecting rotor 3 and the detecting stator core 21 is generated. A voltage is generated in the first and second output coils 23, 24 due to this magnetic flux interlinking with the first and second output coils 23, 24. Since the permeance between the detecting rotor 3 and the detecting stator 2 changes in a sinusoidal fashion in accordance with the rotation angle of the detecting rotor 3, then the rotation angle of the detecting rotor 3 is detected by measuring the voltages output respectively from the first output coils 23 and the second output coils 24. The remaining configuration is similar to the second embodiment.

In other words, the twelfth embodiment is similar to the second embodiment, expect for the fact that the detecting stator 2 is situated to the inside of the detecting rotor 3 in the radial direction and the excitation coils 22 are provided on the outside of the first and second output coils 23, 24 in the radial direction.

Even if the detecting stator 2 is provided on the inside of the detecting rotor 3 in the radial direction in this way, it is possible to achieve similar beneficial effects to the second embodiment.

Furthermore, since the teeth 27 project in the outward radial direction from the core back 26, then it is possible to increase the opening width of the slots 28 which are formed between the teeth 27, compared to the first embodiment, and the work of winding the conductive wires of the excitation coils 22, the first output coils 23 and the second output coils 24 about the teeth 27 can be carried out easily.

Moreover, since the detecting rotor 3 is fixed to the rotor yoke main body 117, then there is no need to adopt a structure for passing the detector shaft 119 through the inside of a hollow support shaft 108 as in the first embodiment, and hence the structure of the rotary electrical machine 101 can be simplified. Therefore, it is possible to achieve reduced costs.

Thirteenth Embodiment

The rotation angle detector 1 and rotary electrical machine 101 according to the first to twelfth embodiments may be used in an elevator hoisting machine.

Figure 39:
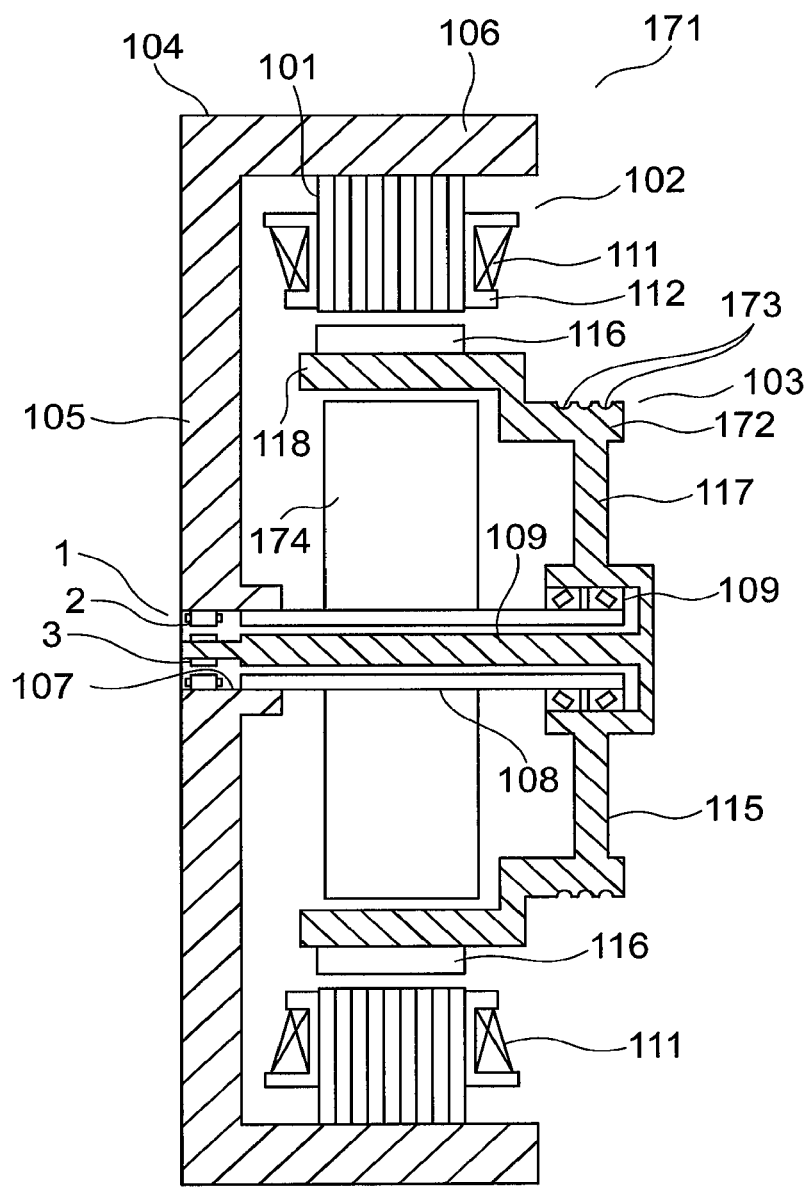
FIG. 39 is a vertical cross-sectional diagram illustrating an elevator hoisting machine to which the rotation angle detector and the rotary electrical machine according to the thirteenth embodiment of the invention are applied.

More specifically, FIG. 39 is a vertical cross-sectional diagram illustrating an elevator hoisting machine to which the rotation angle detector 1 and the rotary electrical machine 101 according to the thirteenth embodiment of the invention are applied. In FIG. 39, the elevator hoisting machine has a rotation angle detector 1 similar to that of the first embodiment, and a motor 171, which is a rotary electrical machine, and a drive sheave 172 which is caused to rotate by the drive force of the motor 171.

The drive sheave 172 is supported rotatably on the support shaft 108 via the bearing 109. The drive sheave 172 is formed in an integrated fashion with the rotor yoke 115. In this example, the material constituting the drive sheave 172 and the rotor yoke 115 is taken to be cast iron. The drive sheave 172 is provided at a position outside the range of the stator 102, in the axial direction of the support shaft 108. The drive sheave 172 and the rotor 103 are caused to rotate in an integrated fashion about the axis of the support shaft 108, by passing current through the stator coil 111. A plurality of main-rope grooves 173 are provided in the outer circumferential surface of the drive sheave 172, following the circumferential direction of the drive sheave 172.

A plurality of main ropes from which a car and a counterweight (neither illustrated) are suspended is wound about the drive sheave 172 along the main-rope grooves 173. The car and counterweight are caused to ascend and descend inside the elevator shaft by rotation of the drive sheave 172.

A brake device 174 which applies a braking force to the drive sheave 172 and the rotor 103 is provided on the inner side of the rotor cylinder section 118. The brake device 174 has a brake shoe (not illustrated) which can be displaced in the radial direction of the rotor 103 with respect to the rotor cylinder section 118. The brake device 174 applies a braking force to the drive sheave 172 and the rotor 103 by causing the brake shoe to contact the inner circumferential surface of the rotor cylinder section 118, and releases the braking force on the drive sheave 172 and the rotor 103 by separating the brake shoe from the rotor cylinder section 118.

In the elevator hoisting machine of this kind, since the rotary electrical machine 101 according to the first embodiment is used as the motor 171, and the rotation angle detector 1 according to the first embodiment is used in the motor 171, then it is possible to obtain similar effects to the first embodiment. In other words, it is possible to obtain an elevator hoisting machine whereby the accuracy of control of the position and speed of the rotor 103 can be raised, and pulsations in the torque can be diminished.

In the example given above, a rotary electrical machine 101 similar to the first embodiment is taken to be the motor 171 of a hoist device, but a rotary electrical machine 101 using a rotation angle detector 1 similar to any one of the second to twelfth embodiments may also be used as the motor 171 of a hoist device.

Furthermore, in the first to twelfth embodiments, this invention is applied to an inner rotor-type rotary electrical machine in which an annular stator 102 surrounds the outer periphery of the rotor 103, but the invention may also be applied to an outer rotor-type rotary electrical machine in which an annular rotor 103 surrounds the outer periphery of the stator 102.

The invention claimed is:

1. A rotation angle detector, comprising:
   a detecting stator including a detecting stator core, a plurality of excitation coils, a plurality of first output coils, and a plurality of second output coils, which are provided respectively on the detecting stator core; and
   a detecting rotor including a plurality of salient poles arranged in a circumferential direction of the rotor and configured to rotate with respect to the detecting stator while the salient poles face the detecting stator in a radial direction of the rotor; wherein
   the first output coils and the second output coils are output coils of mutually different phases;
   the detecting stator core includes a plurality of teeth arranged in the circumferential direction;
   the excitation coils are respectively wound about the teeth;
   the first output coils and the second output coils are wound about mutually different teeth so that winding of output coils of the same phase is avoided in two teeth that are mutually adjacent in the circumferential direction;
   a number of pole pairs of the excitation coils is set to M, which is an integer no less than 1;
   a number of salient poles is set to N, which is an integer no less than 1; and
   when a reference state is a state wherein the plurality of first output coils include at least a first output coil having the number of windings of Ai, which is an integer no less than 1, and a first output coil having the number of windings of Aj, which is an integer no less than 0 that is smaller than Ai, and wherein the plurality of second output coils include at least a second output coil having the number of windings of Bk, which is an integer no less than 1, and a second output coil having the number of windings of Bm, which is an integer no less than 0 that is smaller than Bk, and moreover wherein a spatial distribution of the numbers of windings of the first output coils and the second output coils is obtained by a sum of a function expressed by a sine wave of spatial order |M±N| and a function expressed by a sine wave of spatial order |M−|M±N|| having an amplitude equal to an amplitude of the sine wave of spatial order |M±N|, and when a is the integer no less than 1 and b is the integer no less than 1, then
   at least one configuration is provided from among:
   a configuration in which the numbers of windings of the first and second output coils are respectively the same numbers of windings as in the reference state, with the exception that the first output coils are wound by increasing or decreasing the number of windings by a such that the number of windings is not set to a number less than or equal to 0 without changing relative magnitudes of the number of windings on the teeth wherein the number of windings is Ai and the number of windings on the teeth wherein the number of windings is Aj, in the teeth wherein the first output coils having the number of windings of Ai or Aj are wound in the reference state; and
   a configuration in which the numbers of windings of the first and second output coils are respectively the same numbers of windings as in the reference state, with the exception that the second output coils are wound by increasing or decreasing the number of windings by b such that the number of windings is not set to a number less than or equal to 0 without changing relative magnitudes of the number of windings on the teeth wherein the number of windings is Bk and the number of windings on the teeth wherein the number of windings is Bm in the teeth wherein the second output coils having the number of windings of Bk or Bm are wound in the reference state.

2. The rotation angle detector according to claim 1, provided with at least one configuration from among:
   a configuration in which Aj is the smallest number of windings among the respective numbers of windings of the plurality of first output coils in the reference state, and
   a configuration in which Bm is the smallest number of windings among the respective numbers of windings of the plurality of second output coils in the reference state.

3. The rotation angle detector according to claim 1, provided with at least one configuration from among:
   a configuration in which a first output coil having the number of windings of Ai±a or Aj±a is only wound about any one of the plurality of teeth; and
   a configuration in which a second output coil having the number of windings of Bk±b or Bm±b is only wound about any one of the plurality of teeth.

4. The rotation angle detector according to claim 1, provided with at least one configuration from among:
   a configuration in which a relationship $a/Ai \leq 2\%$ is established; and
   a configuration in which a relationship $b/Bk \leq 2\%$ is established.

5. The rotation angle detector according to claim 1, wherein
the spatial order δ of error expressed by |M−|M±N|| and the spatial order ε of error expressed by |δ−M| are values other than 1 and 2.

6. The rotation angle detector according to claim 5, wherein the number of teeth is set to 2M.

7. The rotation angle detector according to claim 5, wherein the spatial orders δ and ε of the errors are also values other than 4.

8. The rotation angle detector according to claim 5, wherein
the number of the pole pairs M of the excitation coils is 9; and
the number N of the salient poles is 15, 24 or 30.

9. The rotation angle detector according to claim 5, wherein
the number of the pole pairs M of the excitation coils is 15; and
the number N of the salient poles is 10, 20 or 24.

10. A rotation angle detector, comprising:
a detecting stator including a detecting stator core, a plurality of excitation coils, a plurality of first output coils, and a plurality of second output coils, which are provided respectively on the detecting stator core; and
a detecting rotor including a plurality of salient poles arranged in a circumferential direction of the rotor and configured to rotate with respect to the detecting stator while the salient poles face the detecting stator in a radial direction of the rotor; wherein
the first output coils and the second output coils are output coils of mutually different phases;
the detecting stator core includes a plurality of teeth arranged in the circumferential direction;
the excitation coils are respectively wound about the teeth;
the first output coils and the second output coils are wound about mutually different teeth so that winding of output coils of the same phase is avoided in two teeth that are in the circumferential direction;
a number of pole pairs of the excitation coils is set to M, which is an integer no less than 1;
a number of salient poles is set to N, which is an integer no less than 1; and
when a reference state is a state wherein the plurality of first output coils include at least a first output coil having the number of windings of Ai, which is an integer no less than 1, and a first output coil having the number of windings of Aj, which is an integer no less than 1 that is smaller than Ai, and wherein the plurality of second output coils include at least a second output coil having the number of windings of Bk, which is an integer no less than 1, and a second output coil having the number of windings of Bm, which is an integer no less than 1 that is smaller than Bk, and moreover wherein a spatial distribution of the numbers of windings of the first output coils and the second output coils is obtained by a sum of a function expressed by a sine wave of spatial order |M±N| and a function expressed by a sine wave of spatial order |M−|M±N|| having an amplitude equal to an amplitude of the sine wave of spatial order |M±N|, and when a is an integer no less than 1 that is smaller than Ai and b is an integer no less than 1 that is smaller than Bm; then
at least one configuration is provided with from among:
a configuration in which the numbers of windings of the first and second output coils are respectively the same numbers of windings as in the reference state, with the exception that a first output coil having the number of windings of Ai±a which is greater than Aj is wound about at least any of the teeth wherein a first output coil having the number of windings of Ai is wound in the reference state, or a first output coil having the number of windings of Aj±a which is smaller than Ai is wound about at least any of the teeth wherein a first output coil having the number of windings of Aj is wound in the reference state; and
a configuration in which the numbers of windings of the first and second output coils are respectively the same numbers of windings as in the reference state, with the exception that a second output coil having the number of windings of Bk±b which is greater than Bm is wound about at least any of the teeth wherein a second output coil having the number of windings of Bk is wound in the reference state, or a second output coil having the number of windings of Bm±b which is smaller than Bk is wound about at least any of the teeth wherein a second output coil having the number of windings of Bm is wound in the reference state.

11. The rotation angle detector according to claim 10, provided with at least one configuration from among:
a configuration in which Aj is the smallest number of windings among the respective numbers of windings of the plurality of first output coils in the reference state, and
a configuration in which Bm is the smallest number of windings among the respective numbers of windings of the plurality of second output coils in the reference state.

12. The rotation angle detector according to claim 10, provided with at least one configuration from among:
a configuration in which a first output coil having the number of windings of Ai±a or Aj±a is only wound about any one of the plurality of teeth; and
a configuration in which a second output coil having the number of windings of Bk±b or Bm±b is only wound about any one of the plurality of teeth.

13. The rotation angle detector according to claim 10, wherein the spatial order δ of error expressed by |M−|M±N|| and the spatial orders ε of error expressed by |δ−M| are values other than 1 and 2.

14. A rotation angle detector, comprising:
a detecting stator including a detecting stator core, a plurality of excitation coils, a plurality of first output coils, and a plurality second output coils, which are provided respectively on the detecting stator core; and
a detecting rotor including a plurality of salient poles arranged in a circumferential direction of the rotor and configured to rotate with respect to the detecting stator while the salient poles face the detecting stator in a radial direction of the rotor; wherein
the first output coils and the second output coils are output coils of mutually different phases;
the detecting stator core includes a plurality of teeth arranged in the circumferential direction;
the excitation coils are respectively wound about the teeth;
the first output coils and the second output coils are wound about mutually different teeth so that winding of output coils of the same phase is avoided in two teeth that are mutually adjacent in the circumferential direction;
a number of pole pairs of the excitation coils is M, which is an integer no less than 1;

a number of salient poles is set to N, which is an integer no less than 1; and when a reference state is a state wherein the plurality of first output coils include at least a first output coil having the number of windings of Ai, which is an integer no less than 1, and a first output coil having the number of windings of Aj, which is an integer that is smaller than Ai, and wherein the plurality of second output coils include at least a second output coil having the number of windings of Bk, which is an integer no less than 1, and a second output coil having the number of windings of Bm, which is an integer that is smaller than Bk, and moreover wherein a spatial distribution of the numbers of windings of the first output coils and the second output coils is obtained by a sum of a function expressed by a sine wave of spatial order |M±N| and a function expressed by a sine wave of spatial order |M−|±N|| having an amplitude equal to an amplitude of the sine wave of spatial order |M±N|; then at least one configuration is provided from among:

a configuration in which the numbers of windings of the first and second output coils are respectively the same numbers of windings as in the reference state, with the exception that a first output coil having the number of windings of a, which is an integer no less than 1, is wound about at least any of the teeth wherein a first output coil having the number of windings of Aj =0 is wound in the reference state; and a configuration in which the numbers of windings of the first and second output coils are respectively the same numbers of windings as in the reference state, with the exception that a second output coil having the number of windings of b, which is an integer no less than 1, is wound about at least any of the teeth wherein a second output coil having the number of windings of Bm=0 is wound in the reference state.

15. The rotation angle detector according to claim 14, wherein the spatial order δ of error expressed by |M−|M±N|| and the spatial order ε of error expressed by |δ−M| are values other than 1 and 2.

16. A rotary electrical machine, comprising:

a stator;

a rotor which rotates with respect to the stator; and the rotation angle detector according to claim 1, in which the detecting rotor rotates integrally with the rotor.

17. An elevator hoisting machine, comprising:

a motor which is a rotary electrical machine according to claim 16; and a drive sheave which is caused to rotate by a drive force of the motor.

* * * * *